US007340433B1

United States Patent
Kay et al.

(10) Patent No.: US 7,340,433 B1
(45) Date of Patent: Mar. 4, 2008

(54) SYSTEM AND METHOD OF TRANSACTION SETTLEMENT USING TRADE CREDIT

(75) Inventors: Alan Kay, Hanley Castle (GB); Roy Hatfield, London (GB); David Stone, Umberleigh (GB)

(73) Assignee: Orbian Management Limited, London (GB)

( * ) Notice: Subject to any disclaimer, the term of this patent is extended or adjusted under 35 U.S.C. 154(b) by 1561 days.

(21) Appl. No.: 09/626,838

(22) Filed: Jul. 27, 2000

Related U.S. Application Data

(60) Provisional application No. 60/146,760, filed on Jul. 30, 1999, provisional application No. 60/193,075, filed on Mar. 28, 2000.

(51) Int. Cl.
    G06Q 40/06 (2006.01)
(52) U.S. Cl. .......................................... 705/38; 705/35
(58) Field of Classification Search ................... 705/35, 705/37, 39, 65, 66, 69, 76, 26, 38
    See application file for complete search history.

(56) References Cited

U.S. PATENT DOCUMENTS

| 5,583,760 | A  |   | 12/1996 | Klesse .......................... 395/238 |
| 5,677,955 | A  |   | 10/1997 | Doggett et al. ................ 380/24 |
| 5,694,552 | A  |   | 12/1997 | Aharoni ....................... 395/237 |
| 5,732,400 | A  |   | 3/1998  | Mandler et al. ............... 705/26 |
| 6,267,292 | B1 | * | 7/2001  | Walker et al. ............... 235/379 |
| 6,338,050 | B1 | * | 1/2002  | Conklin et al. ............... 705/80 |

FOREIGN PATENT DOCUMENTS

| GB | 2066540    | * | 12/1979 |
| WO | WO 92/04679 |   | 3/1992  |
| WO | WO 97/30407 |   | 8/1997  |
| WO | WO 00/52555 |   | 9/2000  |

OTHER PUBLICATIONS

"New Uses Make Smart Cards the Intelligent Choice", Bank Network News. Chicago: Jun. 11, 1993. vol. 12, Iss.2; p. 2.*
International Search Report on International Application No. PCT/IB00/01056, dated Mar. 15, 2001 (mailing date).
"Invoiceless Trading System," Copyright 2000 Fast 101 Pty Ltd, Printed Jul. 10, 2000.
The TAD Program, Copyright 2000 Actrade Capital, Inc. Vendor Financing, Printed Jul. 10, 2000.
Web page entitled "tapX, the assured payment exchange", Printed Apr. 26, 2001.

* cited by examiner

Primary Examiner—Lalita M. Hamilton
(74) Attorney, Agent, or Firm—Kilpatrick Stockton LLP

(57) ABSTRACT

A method and system for settling a transaction with trade credit value which makes use of computer hardware and software, allows Members of a trade credit settlement system to transfer electronic instruments, called trade credits, in exchange for goods and services. These trade credits are effectively electronic bills of exchange that are divisible, transferable, discountable, continuously available and have been credit-enhanced to A1/P1 status. Sponsors facilitate the system by registering buyers and suppliers as Members in the system and offering them operational accounts and drawdown accounts with authorized lines of credit. A Member-buyer approves the purchase invoice of a Member-supplier and authorizes the Sponsor to transfer trade credit value from the Member-buyer's operational and/or drawdown account into the operational account of the Member-supplier. The trade credit value received by the Member-supplier can be held in the Member-supplier's operational account until it matures, or discount it to cash before it matures, or transfer it to other Members for the purchase of goods or services.

78 Claims, 12 Drawing Sheets

LOGICAL ARCHITECTURE

SYSTEM AND METHOD OF TRANSACTION SETTLEMENT USING TRADE CREDIT

CROSS REFERENCE TO RELATED APPLICATIONS

This application claims the benefit of applicant's co-pending applications having U.S. Ser. No. 60/146,760 filed Jul. 30, 1999 and U.S. Ser. No. 60/193,075 filed Mar. 28, 2000, incorporated herein by this reference.

FIELD OF THE INVENTION

The present invention relates generally to the field of transaction settlements and more particularly to a system and method for settlement of a transaction using trade credit.

BACKGROUND OF THE INVENTION

Currently, a significant issue in the business sector is the problem of late payments between customers and suppliers. While legislation has been enacted from time to time, for example, in the U.K. and in Europe, there has been no legislation that is reckoned to solve the problem. An ideal solution to the problem would give commercial benefits both to the customer and the supplier. Such a solution should work for both customers and suppliers, as against a system or any sort of arrangement which might meet with or involve, for example, the supplier complaining about the customer or demanding financial compensation from the customer. Typically, if the customer pays earlier than the agreed invoice settlement date, then liquidity decreases for the customer, and the supplier has benefited. Conversely, when the customer pays later than the agreed settlement date, then the customer's liquidity increases and the supplier's liquidity decreases. Any solution to the late payments problem must be mutually attractive to both customers and suppliers and provide an answer to the conundrum of how to improve the liquidity of both the supplier and the customer.

Attempts to address the problem of late payments have been made in the world of paper. The essence of such a paper-based system, for example, in Spain, is that when a Spanish supplier sends goods through to its customer and subsequently sends the invoice, then along with the invoice is sent another paper instrument which is similar to a promissory note. This paper instrument is a very simple form of bill of exchange, which is accepted by the customer for the value of the invoice and is sent back to the supplier. It is for the amount of the invoice and is normally expressed as maturing in a predetermined period, such as 90 days. The paper instrument then goes into circulation as a paper instrument from the supplier, for example, to the supplier's own supplier. In other words, the supplier can pass it on to its own supplier as means of settlement of indebtedness, so it moves as an instrument of value.

As the instrument in the example is paper, it is not divisible. More importantly, as it flows through the business community, each recipient has to form a judgment as to the credit worthiness of this particular note, and some, of course, go into default. The way the instrument is processed is that when it reaches maturity, then the holder for value at that time presents it via the holder's own bank. Thus, the instrument finds its way back to the banker of the issuer, which is then either paid, or it goes into a default mode, or is protested under Spanish law. However, such paper instruments have a number of problems associated with their use, such as difficulties in transferability. They are not deliverable, and they are not really in any sense fungible, mainly because they are a wholly disparate credit family.

SUMMARY OF THE INVENTION

It is a feature and advantage of the present invention to provide a system and method of trade credit settlement which dramatically lowers the cost of additional working capital for both buyers and suppliers who are registered as trading members (also referred to herein as "TMs," "members," or "Members,") of a trade credit settlement system (also referred to herein is "Orbian system").

It is another feature and advantage of the present invention to provide a system and method of trade credit settlement that enables deferred cash settlement of trade debt, while simultaneously improving supplier liquidity.

It is an additional feature and advantage of the present invention to provide a system and method of trade credit settlement which enables one hundred percent access of the income from a sales invoice immediately following buyer approval of the invoice.

It is a further feature and advantage of the present invention to provide a system and method of trade credit settlement which assures a rapid, low cost settlement between buyers and suppliers.

It is still another feature and advantage of the present invention to provide a system and method of trade credit settlement which assures a substantial reduction in back-office processes and costs.

It is still another feature and advantage of the present invention to provide a system and method of trade credit settlement which affords a profitability increase to both buyer and supplier.

It is still an additional feature and advantage of the present invention to provide a system and method of trade credit settlement that enables improved trading terms and relationships between buyers and suppliers.

It is yet a further feature and advantage of the present invention that it permits Members to receive and pay value by means of an electronic promissory obligation known as a trade credit (also referred to herein as "TC," "Orbian Credit," or "OC"), which can have individual and various periods to the date of maturity to cash, which has an investment grade rating, without cost or with only nominal cost to the holder for value and regardless of the credit standing of that holder.

It is a further feature and advantage of the present invention to permit any pair of Members of the trade credit settlement system to negotiate and agree to extend their mutual terms of trade and both still gain financial advantages by using the settlement system.

It is yet another feature and advantage of the present invention to enable a Member to issue trade credits with various maturity dates against trade credits which it has received, all of which trade credits normally having wholly disparate maturity dates and values, whilst compensating or charging the Member for the time value effect of those disparities.

It is a still further feature and advantage of the present invention to provide a system and method of trade credit settlement that reduces constraints on business expansion imposed by cash flow restrictions.

It is yet another feature and advantage of the present invention to provide a system and method of trade credit settlement which complies with late payment legislation, while improving the liquidity and/or cash flow of both the buyer and the supplier.

It is yet an additional feature and advantage of the present invention to provide a system and method of trade credit settlement which affords access to low cost international trade and foreign exchange settlement.

It is another feature and advantage of the present invention to provide a system and method of trade credit settlement which enables buyers to settle trade indebtedness to suppliers as late as possible while maintaining supplies, improves the liquidity of both buyers and their suppliers, takes account of the time value of disparate maturity dates of trade credits receivable and issued, makes provision for compensation and charging Members for the time value effect of disparate maturity dates, eliminates governmental and supplier pressure on buyers to pay earlier while complying with the law, and lowers the cost of business finance for both buyers and suppliers.

It is a further feature and advantage of the present invention to provide a system and method of trade credit settlement which affords buyers and suppliers simple and secure payment procedures and more efficient foreign exchange settlement services, while allowing buyers and suppliers to retain, or minimize change to, existing accounting and control systems.

It is yet another feature and advantage of the present invention to provide a system and method of trade credit settlement which assures suppliers of early and certain payments without discounts and eliminates the risk of upsetting customers when chasing payment or statutory interest.

It is still another feature and advantage of the present invention to provide a system and method of trade credit settlement which reduces cash requirements for suppliers' working capital and reduces credit control costs and risks to suppliers.

It is a still further feature and advantage of the present invention to provide a system and method of trade credit settlement which makes use of a new instrument that provides a very low cost source of business finance for any Member of the settlement system eligible to borrow cash in the world of cash.

It is yet another feature and advantage of the present invention to provide a system and method of trade credit settlement which effects a major reduction in back office cost in the accounts payable and accounts receivable sector for any Member of the settlement system by making effective use of the new instrument and the settlement system.

It is an additional feature and advantage of the present invention to provide a system and method of trade credit settlement which assures providers of trade credit, discounting services and of foreign exchange settlement services of full and timely settlement by the instructing Member of its obligations, even if that Member is unknown to them.

It is another feature and advantage of the present invention to provide a system and method of trade credit settlement which allows the additional cash made available to individual Members to flow throughout the business system by essentially liquidating assets, which are currently held in illiquid form on the balance sheet.

It is yet another feature and advantage of the present invention to provide a system and method of trade credit settlement in which the accounts receivable that are now locked up as assets on the balance sheet are turned into a liquid form without resorting to factoring and without the cost of factoring in the world of money.

It is still another feature and advantage of the present invention to provide a system and method of trade credit settlement in which the instrument used in the system is a hybrid instrument which falls partially in the world of banking and finance and partially also in the world of insurance, but which is not a money-based instrument.

To achieve the stated and other features, advantages and objects, an embodiment of the present invention provides a system and method of trade credit settlement using, for example, computer hardware and software, which allows Members of the trade credit settlement system to transfer electronic instruments, which are called trade credits, in settlement for the provision of goods and/or services. These trade credits are effectively electronic bills of exchange that are divisible, transferable, discountable, continuously available and have been credit-enhanced to investment grade status. The trade credit settlement system includes marketing members (also referred to herein as "MMs" or "Sponsors"), and a trade credit discount corporation (also referred to herein as "TCDC" or "Orbian Finance Limited"). Sponsors facilitate the system by registering buyers and suppliers as Members in the system and offering them operational accounts (also referred to herein as "Active Accounts") and drawdown accounts (also referred to herein as "Reserve Accounts") with authorized lines of credit. After Members are registered in the trade credit settlement system, they may purchase goods and services using trade credits. A Member buyer approves a purchase invoice sent by a Member-supplier. Once the purchase invoice is approved, the Member-buyer authorizes the Sponsor to transfer value in the form of a trade credit from its operational and/or drawdown account into the operational account of the Member-supplier. The trade credit received by the Member-supplier may be used in different ways. It may be held in the Member's operational account until it matures; it may be submitted to Orbian Finance Limited and discounted to cash before it matures; or it may be transferred to other Members for the purchase of goods or services.

In an embodiment of the present invention, trade credit value in the form of trade credits is stored in an account for a first user or Member of the trade credit settlement system. When the first user as a Member-buyer wishes to settle a transaction with a second user as a Member-supplier, the first user requests the trade credit settlement system to issue trade credits against the trade credits stored in the first user's account. When the request is received from the first user to transfer a pre-determined amount of the trade credit value from its account to an account of the second user in settlement of the transaction, the trade credit settlement system confirms the availability of the requested amount of trade credit value in the first user's account and, if available, transfers the requested amount of trade credit value from the first user's account to the second user's account. The second user can use the transferred trade credit value in one or more of at least three ways. For example, the second user can use the transferred trade credit value in settlement of another transaction for the second user as Member-buyer, or the second user can discount the transferred trade credit for cash before its maturity, or the second user can hold the transferred trade credit value through to its maturity.

The account in which the trade credit value is stored for the first user is referred to as an operational account, which is established for the first user in the trade credit settlement system when the first user is allowed to register for membership in the trade credit settlement system. The first user's registration for membership in the trade credit settlement system requires approval of a sponsor-member of the trade credit settlement system. Sponsor-members are allowed to register for sponsor-membership in the trade credit settlement system provided they meet certain joining rules and are recognized as a valid trading entity by the trade credit settlement system. The trade credit value is stored in the form of a trade credit which is a form of an electronic promissory obligation and has one or more of the attributes of being divisible, continuously available, transferable, discountable, credit enhanced, and investment grade trade credit value.

In an embodiment of the present invention, in order to settle the transaction with the second user as Member-supplier, the first user issues a request to the trade credit settlement system to transfer a pre-determined amount of trade credit value from one or both of the operational account of the first user and a drawdown account of the first user to an operational account of the second user. The drawdown account is established for the first user only in connection with an operational account of the user which was established in connection with the user's membership in the trade credit settlement system, and the drawdown account is linked to the operational account. Establishing the drawdown account for the first user also requires the approval of the first user's request for the drawdown account by a sponsor-member of the trade credit settlement system.

Confirming the availability of the requested amount of trade credit value in the first user's account for the requested transfer includes, for example, confirming the availability of the requested amount in one or both of the first user's operational account and drawdown account. The trade credit settlement system checks the first user's operational account, and if required and available, the trade credit settlement system also checks the first user's drawdown account. If there is sufficient trade credit value in the first user's operational account, the trade credit settlement system transfers the requested amount from the first user's operational account. If there is insufficient trade credit value in the first user's operational account, the trade credit settlement system checks the first user's linked drawdown account, and if there is a sufficient line of credit marked on the drawdown account, the trade settlement system transfers the trade credit value in whole or in part from the first user's drawdown account. Thus, the trade credit settlement system transfers the requested amount of trade credit value from the operational account of the first user and, if required and available, from the drawdown account of the first user, to the operational account of the second user.

In an embodiment of the present invention, the requested amount of trade credit value is transferred from the operational account of the first user, for example, by issuing the requested amount of trade credit value to the operational account of the second user and canceling trade credit value in the operational account of the first user having a present value equal to a present value of the issued trade credit value. The operational account for the second user is established in the same manner as the first user's operational account, and for example, by the second user registering for membership in the trade credit settlement system. If it is necessary to transfer trade credit value from the drawdown account of the first user, the requested amount of trade credit value is issued to the operation account of the first user and an offsetting amount of trade credit value is issued to the operational account of the second user. The second user can use the transferred amount of trade credit value in settlement of another transaction for the second user by liquidating the trade credit value to a credit on the second user's operational account, or in discounting for cash before a pre-defined maturity of the trade credit value by liquidating the trade credit value for cash at a pre-determined discount rate prior to the pre-defined maturity, or holding through to the pre-defined maturity of the trade credit value, at which time the trade credit settlement system debits a predesignated account of the first user for the balance due on the trade credit value at the pre-defined maturity.

An embodiment of the present invention provides a financing and payment method incorporating a new use of at least one trade credit, which is utilized by a Buyer, a Seller, and a Financial Intermediary. The Buyer, the Seller, and the Financial Intermediary conclude a membership agreement which defines rights and obligations of each party to the other that include the use of at least one trade credit. The Buyer enters an agreement for a transaction with the Seller, and the transaction agreement can be optionally modified to extend payment terms of the transaction agreement through negotiation between the Buyer and the Seller. In response to a request for the Buyer, a trade credit is issued to the Seller in payment of the transaction, the trade credit having payment terms according to one of the transaction agreement and the modification of the transaction agreement. Simultaneously, an obligation by the Buyer to pay an amount equal to the transaction payment is accepted. The Seller is allowed to realize payment of the trade credit by presenting the trade credit for immediate payment of its face amount, less a discount amount, or receiving the face value of the trade credit at maturity.

In an embodiment of the present invention, the Buyer's simultaneously accepted obligation of the buyer to pay an amount equal to the transaction payment can also include an obligation to pay a cost determined by a credit-worthiness of the Buyer. Further, in allowing the Seller to realize payment of the trade credit by presenting the trade credit for immediate payment of its face amount, less a discount amount, the discount amount can be based on an investment grade rating of the trade credit. In an embodiment of the present invention, the Financial Intermediary provides an Active and a Reserve Account for the Buyer, the Active Account showing current trade credits receivable, as well as transaction details and history, including fees and charges, and the Reserve Account showing current trade credits payable, as well as credit available to be issued, and transaction details and history, including fees and charges. In addition, the Financial Intermediary provides an Active and a Reserve Account for the Seller, the Active Account likewise showing current trade credits receivable, as well as transaction details and history, including fees and charges, and the Reserve Account showing current trade credits payable, as well as credit available to be issued, and transaction details and history, including fees and charges. Further, a Sponsor, as a further intermediary, works with the Financial Intermediary to introduce parties to enter membership agreements.

In an embodiment of the present invention, the main fee that the Financial Intermediary charges is based on the credit worthiness of the Buyer. The likelihood of an investment grade buyer defaulting on a short term obligation is so small that the Financial Intermediary is able to charge fees substantially lower than for example the rates made available by factors or banks which are based on the cost of money.

Additional objects, advantages and novel features of the invention will be set forth in part in the description which follows, and in part will become more apparent to those skilled in the art upon examination of the following, or may be learned by practice of the invention.

DETAILED DESCRIPTION

Figure 1:
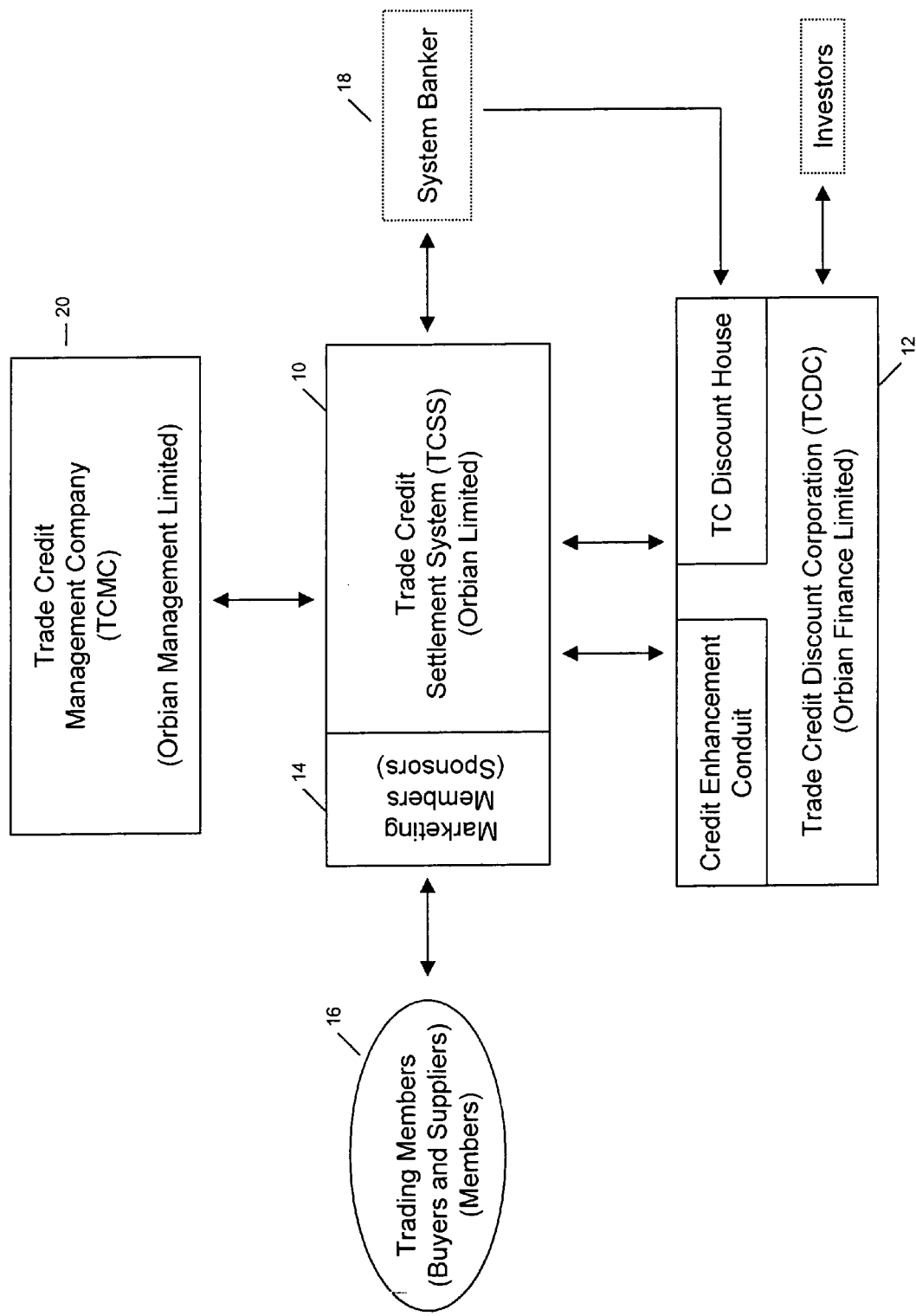
FIG. 1 is a schematic diagram which illustrates an example overview of key components and the flow of information between the key components for an embodiment of the present invention.

Referring now in detail to an embodiment of the invention, an example of which is illustrated in the accompanying drawings, FIG. 1 is a schematic diagram which illustrates an example overview of key components and the flow of information between the key components for an embodiment of the present invention. The settlement system for an embodiment of the present invention utilizes, for example, an electronic instrument which is divisible, is easily used as the credit basis for the issuance of a new instrument, and which eliminates the credit risks from the point of view of a holder for value. The new instrument is the Orbian Credit (also referred to as "OC" or "trade credit" or "TC") which is effectively a credit enhanced electronic bill of exchange with a number of attributes. For example, the OC is investment grade rated, divisible, used as the credit basis for the issuance of a new OC, held to maturity, or discounted for cash before maturity. Referring to FIG. 1, an embodiment of the present invention includes a number of functionalities, such as the trade credit settlement system functionality (Orbian Limited) 10, which is effectively a registration with the trade credit system functionality of one or more legal entities who have agreed and have been authorized to provide the requisite marketing member functionality to trading members, a trade credit discount corporation functionality (Orbian Finance Limited) 12, the marketing member functionality (Sponsors) 14, and the trading member functionality (Members) 16. The trade credit settlement system functionality (Orbian Limited) 10 includes, for example, appointing Sponsors 14, confirming registrations of Members 16, storing value in a trade credit mode on behalf of Members 16, and transferring value in the trade credit mode acting on authenticated and executable instructions from Members 16. The trade credit settlement system functionality (Orbian Limited) 10 also includes interfacing, for example, with Sponsors 14, with strategic Members 16, with a system bank 18, with foreign exchange services, and with a certificate authority.

The trade credit discount corporation functionality (Orbian Finance Limited) 12 for an embodiment of the present invention includes, for example, undertaking and managing risk, establishing drawdown accounts for investment grade Sponsors 14 (wholesale lines of credit) and investment grade Members 16, discounting OCs, and cash management. The trade credit discount corporation functionality 12 also includes interfacing, for example, with regulators, with rating agencies, with corporate paper markets, and with the trade credit insurance and reinsurance industries. The primary Sponsor functionality 14 includes, for example, promoting Sponsor services, recruiting, servicing and retaining Members 16, offering drawdown accounts with authorized lines of credit to Members 16, and offering operational accounts to Members 16 upon which to receive and issue OCs. The primary Member functionality 16 includes, for example, operating drawdown accounts (if eligible), operating operational accounts (regardless of credit standing), setting Member to Member settlement system trading terms (both as a buyer and as a supplier), obtaining integrated foreign exchange services, and obtaining integrated trade credit discounting services. It is to be recognized that the use of terms herein, such as Orbian Management Limited, Orbian Limited, and Orbian Finance Limited, is for convenience in identifying particular functionality and is not intended to limit performance of a particular functionality to a particular type of entity. It is also to be recognized that use of terms, such as Primary Orbian Credit and Orbian Credit, is likewise for convenience in identifying particular functionality and is not intended to limit performance of a particular functionality to a particular instrument. For example, an embodiment of the present invention makes use of either an Orbian Credit alone or both an Orbian Credit and a Primary Orbian Credit.

Figure 2:
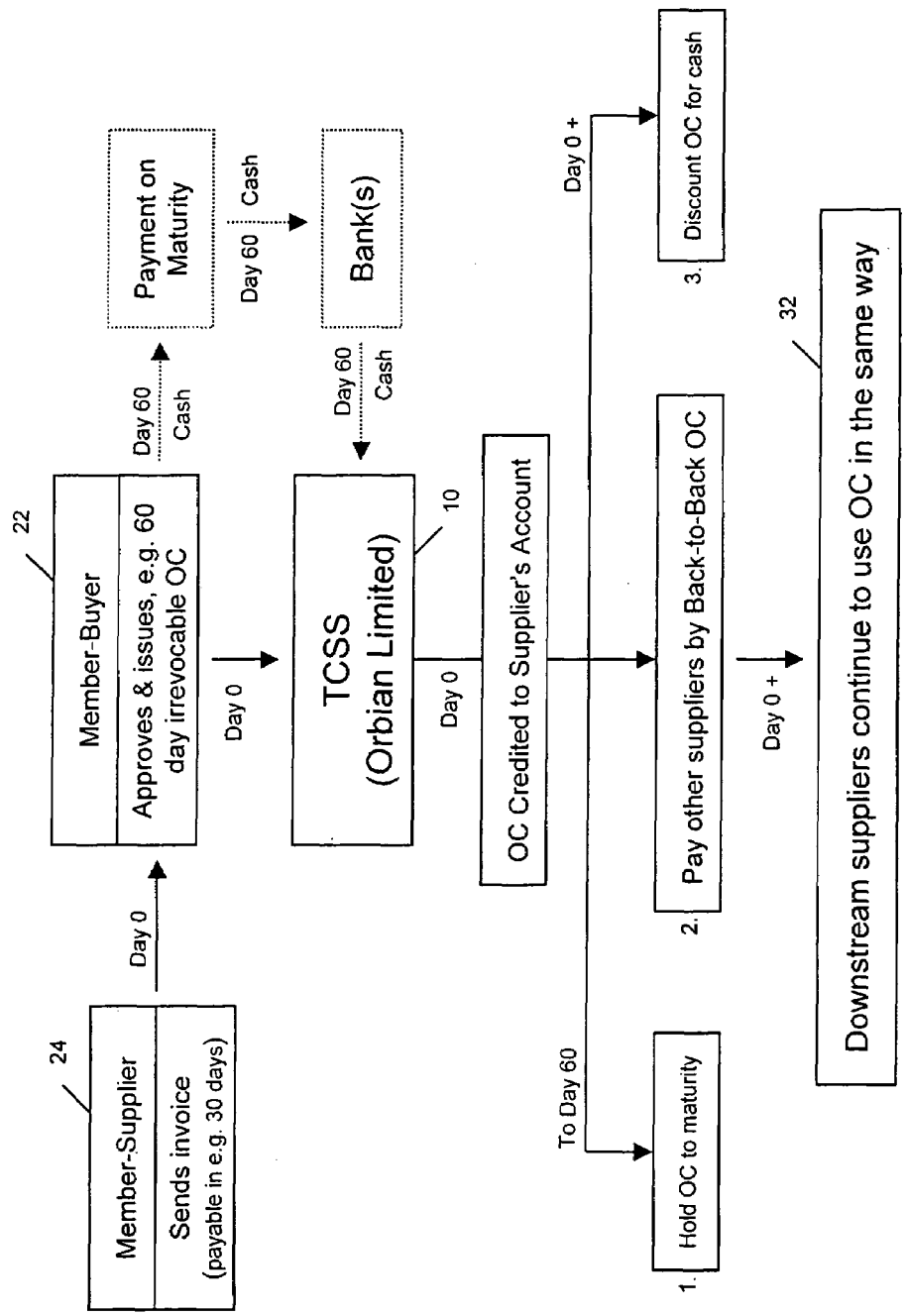
FIG. 2 is a schematic diagram which shows an overview example of the operation of the trade credit settlement system for an embodiment of the present invention.

FIG. 2 is a schematic diagram which shows an overview example of the operation of the trade credit settlement system for an embodiment of the present invention. An incorporated or unincorporated business may join the settlement system as a Member 16 through a registered Sponsor 14. The Member 16 may act as a Member-buyer 22 or Member-supplier 24 or in both capacities. The Member-buyer 22 approves a purchase invoice and authorizes payment by the settlement system (Orbian Limited) 10 on an agreed future date. Settlement is effected by the Member-buyer 22 issuing an OC drawn, for example, against OCs receivable from its own customers, held on its operational account, or against an approved OC line of credit, maintained on its drawdown account, directly or indirectly covered by investment grade rated credit enhancement arranged by the Sponsor 14 with the trade credit discount system functionality (Orbian Finance Limited) 12. Where the drawdown account is held by an investment grade Member 16, the line of credit and the related charging terms are set directly by the trade credit discount system functionality (Orbian Finance Limited) 12. Where the drawdown account is held by a Member 16 which is not investment grade, the line of credit and the related charging terms are set by the Sponsor 14 against a wholesale line of credit managed and charged for by the Sponsor 14 which has been authorized by the trade credit discount system functionality (Orbian Finance Limited) 12. The Member-supplier 24 uses all or part of the receivable OC, for example, to pay other downline suppliers by issuing OCs, to obtain cash by discounting the OC before maturity, or the Member-supplier 24 may hold the OC until it matures.

As an example of the operation of the system and method for an embodiment of the present invention, assume the Member-buyer 22, such as a substantial store group in the U.K. with an AA rating which has annual purchases, for example, of about twelve billion pounds sterling worth of inventory. Assume such a store group normally pays cash at about day 30. The OC gives the store group the ability, instead of issuing cash at day 30, to issue the OC within a day or two of the receipt of the goods, which matures, for example, on day 60. This means that the cash that the store group Member-buyer 22 normally puts out at day 30 is deployed at day 60. Thus, the store group Member-buyer 22 has remaining in its bank at least one billion pounds sterling, at a cost, not of borrowing the one billion pounds sterling, for example, at five percent interest per annum, but more likely about one quarter percent per annum, which is the likely credit enhancement insurance payable to cover against the risk of default of the AA rated store group.

Referring again to the example of the store group Member-buyer 22, a Member-supplier 24 for the store group, instead of waiting for cash for day 30, has an investment grade value in instruments in the supplier's operational account is available to the Member-supplier 24 to use in one of three ways. For example, the Member-supplier 24 can discount for cash before maturity at the cost appropriate to an investment grade rated trade bill and not related to the holder's credit standing, or the Member-supplier 24 can utilize the receivable(s) back-to-back to issue a new investment grade rated OC payable to the supplier's own suppliers on the back of the receivable, or the Member-supplier 24 can hold it through to value date at maturity on the sixtieth day. A party that discounts for cash is very similar to accepting a bill of exchange, and the line comes against it from a banker's point of view, which chose to hold the bill through to maturity and then collect the cash. The instrument is capable of flowing through a number of levels in the supply chain right down to the sole trader, providing the relevant parties in that chain are members of the settlement system (Orbian Limited) 10. The instrument has no life outside the settlement system. It also means, of course, that as the trade credit value transfers further down the supply chain, there is no additional risk being created, so that the credit standing of the investment grade obligation is retained right way through the supply chain without additional risk to the system.

Value within the system for an embodiment of the present invention can only be created by an investment grade entity which has joined as a Member 16. Alternatively, there is another concept of Sponsors 14, that are allowed a line of credit in their own right and are allowed to utilize that line of credit by permitting other Members 16 to issue OCs drawn against that Sponsor's line of credit to other Members 16. The risk judgment from the aspect of the settlement system functionality (Orbian Limited) 10 and/or the trade credit discount system functionality (Orbian Finance Limited) 12 is only taken at the beginning of the value chain at an investment grade level, and the instrument and the value can pass through electronically from hand to hand without any new default risk arising. A significant development sought by others is trying to see a way of having what one might call corporate currency. The OC for an embodiment of the present invention is not corporate currency. The nearest instrument is a bill of exchange. The difficulty has always been how to arrange that and take account of the differing actual or perceived credit statuses of the individual members of such a system, which is exactly the same problem as the paper situation in Spain. This problem is most acute where one does not know the issuer.

An embodiment of the present invention arrives at taking the settlement system risk judgment only on investment grade entities, which is a very limited number of organizations in the world. Such organizations number only in the thousands rather than millions, and there are in fact two types of investment grade entities. There is the entity of the type referred to in the foregoing example, such as a large store group, which is seen as taking a line of credit for its own use as a business and using it to pay its suppliers. There is also another type of role in the business, which is referred to as the Sponsor 14. The Sponsor 14 is required, in order that a Member 16 can join the settlement system. A Member 16 has to join through a Sponsor 14 acting as an intermediary, which can be a bank, insurance broker, trade association, and a wide variety of other entities, acting alone or in association with others. These are entities which have access to significant corporate client bases.

In the system and method for an embodiment of the present invention, a line of credit can only be granted to an investment grade entity. However, a bank, for example, can apply to be a Sponsor 14 and can also apply for what is referred to as a wholesale line of credit, or bulk line of credit, in its own name. An entity, such as a large international bank, can apply, for example, for a 500 million pounds Sterling line, and it can retail portions of that line, at its discretion, to its own banking customers. A small entity, such as a small manufacturing company can then negotiate with the bank for a line of credit, for example, of 100,000 pounds Sterling. The small manufacturing company can then operate in the sense as if it is an investment grade entity, but it is actually using the credit standing of the bank, and the bank takes direct responsibility for any default by the small company.

The system and method for an embodiment of the present invention has the immediate advantage, for example, that any business which is able to borrow money, such as a small company that is capable of getting a money loan, can also apply through a Sponsor 14 on the system for a line of credit expressed in OC form and gain the seriously discounted cost against the cost of a money loan. Another advantage, expressed in terms of the small company and a base rate, for example, of five percent per annum, is that the small company would be borrowing, for example, cash at eight percent per annum, which is three percent over base. In an embodiment of the present invention, it is likely that the small company could get the line of credit at around three percent as against eight percent, getting the advantage of roughly eliminating the base cost of money from their financing.

Companies can join and be welcomed onto the system for an embodiment of the present invention, and as long as they do not want a line of credit in their own right, they can simply receive value and transfer value on an operational account, on a back-to-back basis. They need have no credit standing whatsoever or they can have a low credit standing, and they can still be acceptable Members 16 of the system as long as they are using it for back-to-back transfers, and, in fact, they are receiving payments in investment grade quality value and are passing on investment grade quality value to their own suppliers. The system for an embodiment of the present invention brings enormous advantages to smaller companies, particularly going back to the initial issue of solving the late payment problem. The benefit to small companies of being able to release the liquidity trapped in their accounts receivable at a very early date, as opposed to having to wait perhaps 30, 60, or 90 days and more, is thus worth an enormous amount to them.

The system and method for an embodiment of the present invention envisages, for example, two types of accounts which have parallels in the world of cash. One such account is referred to as the drawdown account. This is the account to which a line of credit has been authorized and against which transfers of value are made from the drawdown account to the operational account. The operational account is the account on which the paying Member 16 receives value from other Members, and from which the paying Member 16 transfers value to other Members. In the world of cash, in U.K. terms, the drawdown account is similar to a loan account, and the operational account is similar to a current account. A current account is comparable in the U.S. to a checking account, and the drawdown account is comparable in the U.S. to a type of line of credit facility.

Another aspect of the system and method for an embodiment of the present invention sets up a system, physically or logically, for each of the currencies that are to be carried on the system. It is possible to transfer value out of a Euro trade credit mode, for example, into a U.S. dollar trade credit mode via a third-party foreign exchange (FX) house. It is also possible to transfer value out of the Euro mode into cash currency such as bolivars or any other currency by requesting a foreign exchange house to do the conversion. The instrument for an embodiment of the present invention is not money. Nor is the instrument intended to replace money, so it should not be seen to be any sort of money instrument or money equivalent. Rather, the instrument fits in with the concepts of the bill of exchange, but based on contract law. Therefore, an embodiment of the present invention involves setting up contractual relationships between Members 16 of the settlement system, and the same with Sponsors 14 of the settlement system, as well as contractual relationships between the Member 16 and the Sponsor 14, which reflect how the system operates and what the house rules are.

Compared with conventional cash flow in which companies currently operate, using the settlement system for an embodiment of the present invention provides a company with a significant increase in net profit before tax. For a large company, this means use of the settlement system can generate additional liquidity, for example, of hundreds of millions of dollars at very low cost. A way of expressing the benefit of use of the system is that if a company put the whole of its customers and suppliers in the system, then the additional liquidity released is the difference between the company's present accounts receivable total and their accounts payable total. That is without obtaining additional benefits from a line of credit on the drawdown account, but merely using the speeded up transfer of value between buyer and supplier.

An additional aspect of use of the system and method for an embodiment of the present invention is in the public sector or government. For example, the biggest single purchaser of goods and services in the U.K. economy is the government. The additional liquidity that the settlement system for an embodiment of the present invention could create for the British government is billions of pounds Sterling. The same is true for other countries, including, for example, the U.S. An additional aspect of use of the settlement system for an embodiment of the present invention is the consumer sector. For example, an embodiment of the present invention has a serious relevance in both corporate and consumer cards. Further, there are quite a number of other instruments which can be created on the back of this aspect. For instance, the model and idea of long term OCs for an embodiment of the present invention is applicable in the savings market, pensions, social security payments, mortgages, leases, and the like.

In yet a further instance, relevant in particular to international trade finance, the transfer of value by trade credit for an embodiment of the present invention can be made conditional in a like manner to a conditional letter of credit created in the world of money. A further such instance, comparable to factoring in the world of cash, bridging liquidity can be provided to a Member-supplier 24 covering the period between the date of issue of its sales invoice to the date when the Member-buyer 22 effects settlement by trade credit. In other words, the concept for an embodiment of the present invention can be applied in many different commercial environments.

A Member 16 joins the Orbian system for an embodiment of the present invention by making application to a Sponsor 14. The Member 16 may apply to more than one Sponsor 14 and can pick the one that was most attractive to the Member 16 because of service or charges or any other reason. Upon joining, the Member 16 is entitled to get, subject to relatively minor due diligence, an operational account. On the operational account, the Member 16 is able to receive payment by OC, and to the extent that the Member 16 has received OCs from others, it can use that value in OCs and transfer it other Members 16 or discount to cash. The balance on the operational account is not allowed to fall below zero. The Member 16 may hold drawdown accounts and operational accounts with more than one Sponsor 14, much as a business may have a relationship with more than one bank.

In an embodiment of the present invention, the lowest level of operational facility is the operational account. The next level is the Member 16 applying for a line of credit. If the Member 16 is investment grade, then through the introduction of a Sponsor 14, the Member 16 can in fact apply for a line of credit to be granted by the trade credit discount system (also known as Orbian Finance Limited) 12. Orbian Finance Limited 12 makes a judgment as to whether the Member 16 is eligible to have the line of credit, what the level of risk is, and what to charge. If the Member 16 is not investment grade, then the Member 16 is not able to apply directly to Orbian Finance Limited 12. However, such a Member 16 is able to apply to its Sponsor 14 for a drawdown account and for the line of credit to be marked on that account. As mentioned earlier, the Sponsor 14 may be a large banking entity, for example, with a 500 million pounds Sterling line of credit, and the Member 16 may be a small company applying, for example, for a line of 100,000 pounds Sterling. The banking entity makes a judgment of the reasonableness of the risk what to charge, and the Member's line is part of the bank's line of credit obtained from Orbian Finance Limited 12.

In operation of the Orbian system for an embodiment of the present invention, the Member 16 goes up on its own accounting system or a browser based interface or another form of software application and ascertains what it has in the way of receivables credited on its operational account(s). If it owns a drawdown account, the Member 16 also determines what it has in the way of available unutilized line of credit on its drawdown account. The Member 16 creates and issues instructions to move value from its operational account (plus its drawdown account if available and required) to the operational account of another Member 16 to whom it wants to pass value. Those instructions are received then by the settlement system (also known as the Orbian system) 10 for essential or processing capability, and a judgment call is made as to whether or not the Member 16 has enough capacity to issue all the requested OCs. The first call is whether there is enough capacity in OCs received onto the Member's operational account. It not, then a second call is whether there is enough available capacity in the linked drawdown account to move a balancing amount to the operational account. That exercise or computation takes account of all the charges that are due as a consequence of executing the Member's instructions and seeks to collect those charges at the same time as execution of the instructions.

In an embodiment of the present invention, there is no dwell time between executing the instructions the Member 16 places and the levying of the charges. At the same time, the core functionality for an embodiment of the present invention also addresses the fact that there is eventually a difference in the timed value of money in the sense that the receivables have varying maturity dates. The effective payables also have varying maturity dates, and they will not match either necessarily by date and almost certainly not by value. The core functionality for an embodiment of the present invention deals with the time value of money aspect by either charging an interest rate or crediting an interest rate to take account of the mismatched maturity dates. When an obligation created on a drawdown account matures, an aspect of the settlement system calls for the cash that is due, and that cash comes into the system flows. When an OC held as a trade credit receivable reaches its maturity date, it ceases to be a liability of the settlement system, and the system instructs the banker to move cash from the float to meet those maturities. Those movements or instructions take place by conventional cash movement procedures in the regular banking system.

Another aspect of the system and method for an embodiment of the present invention is, for example, a trade credit management company (also referred to herein as "Orbian Management Limited") 20. The primary objective of Orbian Management Limited 20, for example, is a development role to develop an efficient, reliable and secure means by which the Orbian settlement system 10 and Orbian Finance Limited 12 can operate for and on behalf of settlement system Members 16. The management company 20 has all the operational management capability and runs the business of the settlement system, which is effectively the central switch that comprises the core functionality for an embodiment of the present invention.

The Sponsors 14 and the Members 16 actually have their contractual relationships with the settlement system 10 for an embodiment of the present invention. Investment grade Sponsors 14 or Members 16 have a line of credit directly. There is a contract between either the Sponsors 14 and Members 16 and Orbian Finance Limited 12 that is related to the drawdown account aspect. Orbian Finance Limited 12 has, for example, a role of credit enhancement, which is the risk carrying role, and also the capability to discount to cash, so it offers a discounting capability. Once Orbian Finance Limited 12 sets the initial standard or capability for both credit enhancement and discounting, there may be other companies, such as other banks or similar financial institutions who may wish to offer services that may even become part of the settlement system, but they may do it alone as well. The credit enhancement capabilities are extended as the market demands.

In addition to those core organizational entities, another aspect for an embodiment of the present invention is, for example, a marketing company with responsibility for the management of the major Sponsor relationships. For instance, if a major financial institution in the U.S., such as a bank, becomes a Sponsor 14, then the marketing company manages that relationship. Likewise, if a major financial institution, such as a bank, becomes a Sponsor 14 in the U.K. or Germany, the relationships are managed through the marketing company. Further, an embodiment of the present invention, includes, for example, external relationships with foreign exchange houses in particular cities, taking the role as a lead foreign exchange house, as well as with a financial institution, such as a bank, for the role as the system banker 18, essentially interfaced with the cash world.

The settlement system for an embodiment of the present invention makes use of what is referred to as the "A to B algorithm" to access a database either directly or through third party software and determines what OCs have been received by a Member "A" and also goes off and finds out what capacity there is on a drawdown account. The system then goes into a mathematical routine which decides whether value can be moved to a Member "B" and to any number of Members "B" and also determines the transaction charges. It also determines what charges or credits are required to compensate for the time value effect of disparate OC maturity dates. In the event that a transfer of value is both required and permissible against a line of credit on a drawdown account to an operational account, the mathematical routine also determines what is the least amount of the transfer and with what maturity date to yield the lowest cost solution for the Member "A." If the system executes the order to move value from Member "A" to Member "B," then it reduces the value held by Member "A" and/or increases the borrowing of Member "A" against a drawdown account, and it puts value into the ownership of Member "B" or any number of Members "B." In other words, there is a type of custodial register role within the settlement system, in effect, to assure that the system knows what are the respective assets and liabilities of the various Members "A" and "B."

The core functionality for an embodiment of the present invention, also referred to as the "A to B core," has other functionality surrounding it which enables the provision of compatible transaction journals for receipt and processing on the accounting back-office systems of relevant Sponsors 14, Members 16, discounting entities, foreign exchange entities and banking entities, as well as by the settlement system functionality 10, the management company functionality 20 and the trade credit discount corporation functionality 12. Other functionality surrounding the A to B core, for example, enables the businesses of the settlement system 10 and Orbian Finance Limited 12 to work, to do mainly with housekeeping, but also to deal with the interfaces with the external world, including, the service provider of money for use in the banking and the foreign exchange side. An embodiment of the present invention includes a core process which is a servant role of the settlement system and Orbian Finance Limited 12, as well as the bank 18 and the foreign exchange house. The core process takes an instruction and carries out all of the executed consequences of the instruction and, as a result of that, updates the position of the related third parties.

In the registration process for an embodiment of the present invention, a Member 16 may access the system at a terminal over a network using, for example, a browser interface, or may deal face-to-face with a Sponsor 14, just as an insurance broker sells insurance, with the Sponsor 14 completing the application for the prospective Member 16. However, in most cases, the Member 16 accesses the system, for example, through a browser without human interface. If a Sponsor 14 is involved with the Member 16, the Sponsor 14 may be at a terminal accessing the system live, or it does not necessarily have to be live. The system can be promoted, for example, on the Worldwide Web, so that prospective members can find out about the system and progress, for example, from looking at a settlement system home page to selecting a Sponsor 14 and then going to a dialogue, preferably electronic, with a Sponsor 14, with a view to joining as a Member 16. The actual value transfer process involves the use, for example, of browser technology. The user aspects include technology, such as a Web Browser, an electronic data interchange ("EDI") or other message switching systems to pass the instructions through in standard format, some of which are existing and some of which are special to the settlement system, to pass electronic instructions into the center for processing interface.

An important aspect of the system for an embodiment of the present invention is the realization of a way of taking and carrying the risk at the very top of the value chain and enabling an instrument that is traded and that actually passes through the value chain without regard to the credit standing of the actual holder for the times of the value that arrives in their hands. The system for an embodiment of the present invention eliminates the need to make any credit judgment call on any of the Members 16, except effectively the investment grade Members 16. Obviously, a system for settlement which is only between investment grade entities is not really a solution. In an embodiment of the present solution, an investment grade Sponsor 14 can obtain a wholesale line of credit and at its judgment, risk and fee rate, apply part of that line of credit to the drawdown account of its non-investment grade customer-Member. This enables the benefits of the drawdown account to work all the way through, for example, to the sole trader, and also potentially into the hands of the consumer.

In a consumer aspect of an embodiment of the present invention, major store groups already issue credit cards to their customers. For example, a particular store group may have five or six million cards in distribution throughout the nation. Such a store group can issue what, in terms of an embodiment of the present invention, is effectively a trade credit card. The store group can load onto that card to the customer, effectively, trade credit, which is the store group's own line of credit that it can then hand on to its own customers. Customers then come into the store group's stores and effectively buy merchandise using the store group's own credit capability. What the customer thinks is cash is actually the store group's credit, and the store group gets a double benefit. In other words, the store group gets its benefit twice over by lending the trade credit to a customer, charging an interest rate on the balance on that trade credit account, and then using the trade credit. When a customer comes in and uses the card, for example, to buy some shirts, the customer pays in trade credit, and the store group uses trade credits to pay the shirt supplier. Therefore, instead of using a line of credit to pay the shirt supplier direct, the store group can use the value coming in from the customer to pass it through. In effect, the system for an embodiment of the present invention provides an income from lending with no cash flow out, which is value to the customer, and also the benefits the store group in delaying cash outlay to its supplier.

Continuing with the same example, the spread between the cost to the store group and the interest on the credit card may be the difference between a quarter of a percent per annum cost to the store group and five to fifteen percent per annum charge to the customer. The system for an embodiment of the present invention gives the store group the advantage to play it two ways. The store group does not have to change the rate on the customer's card, but it is not actually dealing in the world of cash, or it is passing on some of that value and thereby getting a competitive advantage as a store group. It is a serious difference between the world of money card and the traded credit card in the example. As this applies to any card issuer, because instead of funding the card with cash, it is funded in the same method, so the cost of money is broadly eliminated from the cost of the card itself from the point of view of the provider.

In a commercial context for an embodiment of the present invention, if a company is going to have, for example, an acquisition or new venture or new development that it wants to fund, under the rules within the company as they stand at the moment, they see their twenty or twenty-five percent return on capital for any new venture or new project. In this particular case, the company could actually take out the cost of money. Thus, twenty percent in the current world in the account environment may now come down to fifteen percent within this new world environment that is created by an embodiment of the present invention, in terms of the money cost involved. It is entirely possible for the company to create, for example, a new division which requires basically obtaining supplies from other parties and to provide most of the finance.

The Orbian system for an embodiment of the present invention provides an innovative solution to problems associated with the present state of financing of commerce and includes the creation of the new financial obligation referred to as the OC, which is irrevocable, divisible, transferable, and globally accessible. The Orbian system also creates a market infrastructure for settlement of OCs, credit enhances the portfolio of OCs to investment grade and guarantees discounting of OCs to cash at any time. In effect, the OC is an 'electronic bill of exchange.' The Orbian system provides a solution to the problem of late payment, improves corporate liquidity, creates access to very low cost business finance, while simultaneously reducing back-office costs. The Orbian system provides an alternative method of effecting value transfers between buyers and suppliers with applications in the commercial, industrial, retail, financial, consumer and public sectors. The Orbian system is an electronic financial system by which to effect settlement of most commercial transactions. It operates in parallel with conventional money while also being fully interchangeable. Businesses throughout the supply chain, including SMEs, whether or not of good credit standing, benefit from the Orbian system, which makes electronic commerce attractive and accessible to all and makes available a low-cost, real-time settlement system to all companies globally.

The functionality of Orbian Limited 10 for an embodiment of the present invention includes, for example, appointment of Sponsors 14 and confirmation of registrations of OCs. Orbian Limited 10 interfaces with Sponsors 14, strategic Members 16 (with Sponsor 14), the system bank 18, FX services, and certificate authority. In addition, Orbian Limited 10 stores value in the OC mode on behalf of Members 16 and transfers value in the OC mode acting on authenticated and executable instructions from Members 16 (A to B). Orbian Finance Limited 12 functionality includes, for example, undertaking and managing risk, establishing drawdown accounts for investment grade Sponsors 14 (wholesale lines of credit) and investment grade OCs, discounting OCs, and cash management. Orbian Finance Limited 12 interfaces with regulators, rating agencies, CP markets, and trade credit insurance and reinsurance industries. The Sponsor 14 may comprise one or more legal entities which collectively hold a Sponsor registration, and all such entities must be a Member 16. A Member 16 may participate in more than one Sponsor registration. Within each Sponsor registration, one Member 16 is designated as Managing Agent with responsibility for the management and conduct of its Sponsor registration. The primary Sponsor functions include, for example, promoting Sponsor services and recruiting, servicing, and retaining Members 16. Sponsor functionality also includes the ability to offer drawdown accounts to Members 16 and the ability to offer operational accounts to Members 16.

The primary functions of a Member 16 for an embodiment of the present invention include, for example, operating drawdown account(s) if eligible and operating operational account(s) regardless of credit standing, subject to being a recognized trading entity. Additional Member functionality includes setting Member to Member Orbian Limited trading terms (both as a buyer and as a seller), obtaining integrated FX services, and obtaining integrated OC discounting services. Both buyer and supplier must be Orbian Limited Members 16. The Member 16 can only join Orbian Limited 10 through a registered Sponsor 14. The Sponsor registration may be a single or multiple corporate entity including banks, insurance companies and brokers, trade associations, software houses, EDI/electronic commerce service providers, and the like. The buyer approves purchase invoice(s) and authorizes payment by Orbian Limited 10 on an agreed future date. The buyer issues an OC in settlement drawn against either OCs receivable from its own customers or an approved OC line of credit covered by investment grade rated credit enhancement arranged by the Sponsor 14 through Orbian Limited 10 for a low credit risk premium, payable by the buyer. The supplier uses all or part of receivable OCs to pay other downline suppliers by OC, to obtain cash before the maturity date by discounting the OC, or holds the OC until it matures.

Orbian Management Limited 20 for an embodiment of the present invention is the entity which provides Orbian Limited 10 with all its required functional capability. Orbian Limited 10 is the global switch enabling accredited Members 16 to move value from one Member 16 to another (A to B). All Sponsors 14 and Members 16 are members of Orbian Limited 10. Orbian Finance Limited 12 is the special purpose entity which is responsible for creating and credit enhancing lines of credit on Orbian Limited 10 for investment grade Members 16 and also provides a discounting service for OCs and makes a market in electronic OC paper. Orbian Limited 10 enables a member company or business to apply for an Orbian Limited line of credit at a cost which will typically be from two tenths percent up to four percent per annum. The funds can be utilized for any business requirement where value needs to be transferred from A to B. By offering access to significantly lower cost finance without traditional shareholder or director guarantees or other collateral, most businesses will have a strong incentive to join Orbian Limited 10. Orbian Limited 10 substantially reduces the need for conventional banking transactions in connection with sales and purchases, as buyers and sellers settle their indebtedness directly via Orbian Limited 10. However, the banker to Orbian Limited 10 and other member banks of Orbian Limited 10 own the substantial cash collection payment business generated by OCs on maturity.

An important aspect of the Orbian system for an embodiment of the present invention is that the buyer effects payment of supplier indebtedness through Orbian Limited 10 by authorizing an electronic OC in favor of the supplier to mature at an agreed future date, such as 75 days from invoice date. It is to the buyer's advantage to issue the OC at the earliest possible date, while obtaining a corresponding postponement of the maturity date. By this means, the supplier gains access to 100% of its sales income very much earlier than under a cash based settlement system. Where the OC is issued by the buyer against its own OCs receivable, it is in effect using its additional OC based liquidity to fund its own suppliers. This has the effect of likewise postponing cash outflow to its own suppliers. Orbian Limited 10 unlocks the trade debt asset throughout the value chain.

Where the OCs for an embodiment of the present invention are issued against a facility on an OC drawdown account, then actual cash is only paid out by the buyer when the POC obligation becomes payable on its maturity date. For example, instead of paying trade creditors using cash on day 30, the balancing OC can be issued on day 5 to be paid, for example, on day 60. Orbian Limited 10 has a predetermined maximum maturity term, for example, of 180 days. The additional liquidity thus obtained will typically cost, for example, from two tenths percent to four percent per annum. For example, an enterprise, such as Tesco, by delaying cash payment to its suppliers by 30 days, gains over one billion pounds sterling additional cash at a cost of around one quarter percent per annum. The supplier, on receipt of a OC, may use up to the value of its OC(s) receivable to issue further single or multiple OCs to its suppliers, or it can discount all or part of the OC(s) at prime rates regardless of its own credit standing. In the event of a Member 16 receiving value from its own customer, for example, on day 3, it is able to extend its own outgoings and thereby improve its own liquidity, and this applies throughout the supply chain.

Any Member 16 for an embodiment of the present invention, whether acting as a buyer or a supplier, may apply for an agreed credit facility on an OC drawdown account. All creditworthy Members 16 have access to cheaper business finance than is currently available from traditional sources, thus obtaining reduced costs, improved liquidity and higher profit margins. Issued OCs are underpinned by an equivalent value of investment grade rated OCs collectable by Orbian Limited 10. Orbian Limited lines of credit are negotiated by the Member 16 with its Sponsor(s) 14. The margins on OC denominated credit facilities and products are expected to be higher than on their cash-based equivalents. Orbian Limited 10 makes use of banking services, such as cash collection on maturity of an OC issued by a Member-buyer 22 to Orbian Limited 10 against an OC line of credit, cash payment when an OC issued by Orbian Limited 10 on behalf of a Member-buyer 22 reaches its maturity date when the cash equivalent is paid to the Member's bank, discounting of OCs all or in part for cash, Orbian Limited float management, and FX services. There is no limit to the number of times or levels through which the value of the OC may pass while maintaining the investment grade status of the OC. All OCs are automatically fungible as Orbian Limited 10 provides an automatic interest adjustment for mismatched OC maturity dates.

There are a number of revenue opportunities associated with the method and system for an embodiment of the present in invention. Some of these are generated directly, while others are received indirectly as commission from Orbian Finance Limited 12, discount houses and FX trading houses. The main income streams, which are generated in OC mode at the time of the transaction, include drawdown issuance (value related CE fees), operational account issuance (value related fees and transaction charges), operational account receipt (value related fees and transaction charges), OC to FX OC FX transactions (value related fees and transaction charges), and OC to FX Cash FX transactions (value related fees and transaction charges). Additional revenue opportunities include discounting OCs for cash and OC to OC maturity date matching. Other sources of revenue include share of interest spread from the cash float, interest on maturity matching, commission from CE fees, FX fees, and discounting fees, sale of software, and archive reports.

The extent of trade credit enjoyed by the public sector is unknown but is unlikely to be less than two months on average. By adopting the Orbian system as a means of payment, the public sector would obtain a further deferral of the cash funding of purchases amounting to at least one, and potentially three months, additional credit, while greatly improving the liquidity of its suppliers. This would reduce the cash funding requirement for public expenditure by billions of pounds sterling, with marked social and economic benefits throughout the supply chain. Similar levels of benefit are likely to be achieved by the public sector in all other countries throughout the world.

The Orbian system for an embodiment of the present invention has many commercial, consumer and public sector applications, each of which makes use of the Orbian Limited A to B service. Commercial applications include, for example, OC direct debits and credits, OC standing value movement instructions, www micro-payments, corporate credit cards, OC financed factoring services, and secured and unsecured commercial OC 'loans'. Additional commercial applications include conditional OCs and OC bills of exchange, promissory notes, and letters of credit, FX netting including emerging markets (especially covering political risk), EDI and electronic commerce services (transmission of invoices and/or invoice summaries awaiting OC settlement), creation of a new global business web, web advertising and promotion by and for Members 16 including hot links to Members' web pages, hot links to Member services such as FX and discounting, and associated services for Orbian Limited Members 16, such as travel, legal, insurance, preferred rate products, and the like.

Consumer applications of the method and system for an embodiment of the present invention include, for example, OC direct debit and credits, OC standing value movement instructions, www micro-payments, credit cards and OC store cards, consumer income management enabling the deferral of the cash funding of payroll costs, house building and mortgage finance, and pensions and savings. Public sector applications include public sector revenue expenditure deferral including social security and health service, public sector capital expenditure, development grants and loans for both the public and private sectors, public finance initiative, overseas aid, and VAT, sales tax, and other taxation collection services.

The Orbian system for an embodiment of the present invention includes a number of basic relationships. For example, all Members 16 must join Orbian Limited 10 through a Sponsor 14. Orbian Limited 10 is responsible for supporting Sponsors 14, and Sponsors 14 are responsible for supporting their Members 16. OC value is created through the authorized use of the drawdown account, and the POCs issued against the drawdown account, including credit advancement fees, must never exceed the drawdown limit. OC value is moved from Member to Member on their respective operational accounts. An operational account must never go overdrawn (a balance less than zero). A Sponsor 14 may comprise a registration of more than one entity, and each such entity must also be a Member 16. A Sponsor 14 must be able to offer all of its Members 16 a drawdown account if eligible. A Member 16 may have more than one Sponsor 14, may have more than one drawdown account with one or more Sponsors 14, and may have more than one operational account with one or more Sponsors 14, and the drawdown account may be linked to more than one operational account.

The Orbian system for an embodiment of the present invention involves a number of transaction types, such as a standard scenario, discounting for cash, FX OC issuance, and FX cash remittance. In the standard scenario, the OC can be used for any value movement purpose. The basic transaction type in the A to B value movement process can take the form of either an OC issued against the line of credit created by the drawdown account which is a commitment by the Member 16 to pay Orbian Limited 10 on an agreed future date against which Orbian Limited 10 issues value to the Member counterparty, which is the POC, or one issued within the operational account against OCs receivable, effectively on a 'back-to-back' basis, which is simply the OC. In the standard scenario, the A to B instruction is created by the Member 16 approving an invoice or credit note for settlement, executing an accounts payable payment run, and entering one or more payment instructions by a browser, primarily for the very small business or for larger non-standard payments. Required processes which create a standard A to B instruction along with an associated action instruction include, for example, discounting, OC to FX OC, and OC to FX cash.

In the discounting for cash transaction type, in terms of impact on transaction volume, discounting involves the issue of an OC by the Member 16 to the discounter's OC account. Prior to issue, Orbian Limited 10 computes on behalf of the discounter the required OC value to service the cash advance and charges. Otherwise, the transaction is similar to a standard OC issuance. The higher the proportion of OCs converted to cash, the lower the proportion of OC value transmitted downline. Thus a higher proportion of discounting reduces transaction volume pressure. The FX OC issuance transaction type is a sub-type of A to B instruction which enables a Member 16 to move OC value between any pair of operational Orbian Limited currencies. The FX process and associated risks are carried by the third party FX house. The FX transaction involves the issue of a OC by the Member 16 to the FX trading house's OC account. Prior to issue, Orbian Limited 10 computes on behalf of the FX trading house the required OC value to service the FX transaction and charges. On execution, the FX house issues, from its own account, an FX OC to the Member payee. Execution follows the standard A to B process. The FX cash remittance transaction type is a sub-type of A to B instruction which is the same as the discounting except that the remittance to the payee's bank account is made in the designated FX currency and not the Member's base currency.

An embodiment of the present invention includes a number of products, such as a Sponsor product, a Member product, an OC server account product, an Orbian Limited home page product, and a Orbian Finance Limited product. The Sponsor 14 is the conduit between the Member 16 and Orbian Limited 10. The Sponsor 14 product provides all the necessary functionality to enable the Sponsor 14, both client-site and on the server, to interface with Orbian Limited 10 and its Member clients. All Members 16 must join Orbian Limited 10 through a Sponsor 14, and all Sponsors 14 must be a Member 16 with at least one operational account. The Member 16 is any party who has joined Orbian Limited 10 through a Sponsor 14 and who wishes to use the system to store OC value or transfer it in OC mode only to another Member 16. The Member product supplies this functionality, as required both on the client-site and on the server. A Member 16 may maintain relationships with more than one Sponsor 14 and may maintain multiple drawdown and operational accounts.

The Drawdown Account for an embodiment of the present invention holds and manages the Member's line of credit on Orbian Limited 10. It is drawn down and charged for as required against an established limit. It is analogous in banking parlance to a loan account. The operational account is used by the Member 16 to receive, hold and make OC transfers of value. It is never allowed to become overdrawn. It is analogous in banking parlance to a current account. The OC account server product is the core engine which drives Orbian Limited 10 and therefore provides the central storage and transfer of value functionality A to B. In addition, it provides all the interfaces with external services such as discounting and FX.

The Orbian Limited home page for an embodiment of the present invention covers, for example, in the appropriate languages for the countries in which the service is available, a welcome to Orbian Limited 10; promotional material, such as benefits and services; a tour of Orbian Limited 10; a link to an Orbian Limited demonstrator, such as how to transfer value to another Member 16; and costs, such as the cost of joining as a Member 16. Other costs are set out as part of the Sponsor/Member software. In addition, the Orbian Limited home page covers a list of appropriate Sponsors 14 through whom a prospective Member 16 might apply, an invitation to apply to become a Member 16, an application for Membership, and collection of prospective Member's particulars. The Orbian Limited home page includes an invitation to apply to become a Member 16. It states that approval of the application is at the absolute discretion of the Sponsor 14. The prospective Member 16 is offered a list of current Sponsors 14 in the form of list boxes grouping Sponsors 14, for example, by banks, insurance brokers, trade associations, electronic commerce providers, and other registered Sponsors. The Orbian Limited home page provides hot links to Sponsors' Web pages where offerings can be viewed, and the prospect is invited to select one Sponsor 14.

The Member home page for an embodiment of the present invention has links, for example, to account management, including reports and maintenance of Member particulars and account particulars, value transfers, discounting services, FX services and Orbian Limited messaging. The reports include, for example, summary of accounts, operational account summary, operational account statement, issuance account statement, balance reports, operational account, issuance account, cash management report, transaction details, the Member's tariff details, trading links and terms, and special reports. The value transfers include, for example, manual issuance (same currency) and batch issuance (same currency), including CSV defined format, banks' automated clearing systems (BACS) (and/or BACS equivalent), and EDI (same currency, discounting, and FX), and excess issuance. FX services include, for example, OC to FX OC (manual issuance, CSV defined format, BACS and/or BACS equivalent, and EDI) and OC to FX cash (manual issuance, CSV defined format, BACS and/or BACS equivalent, and EDI).

An embodiment of the present invention provides a 'palletized' business solution, including a suite of 'palletized' product modules which, in combination, provide an integrated Orbian system business solution. This enables a prospective Sponsor 14 or Member 16 to acquire all the necessary functionality to enable them to fulfill their respective roles as Members 16 of Orbian Limited 10. The pallets are designed such that a Sponsor 14 or Member 16 may select individual products or modules from the pallet as required. It is the responsibility of Orbian Limited 10 to ensure modular inter-operability and that the selection enables effective functionality. A Sponsor pallet is supplied on a franchise basis, the Sponsor 14 being subject to contracted quantified quality objectives (QQOs). The products or 'modules' which comprise the content of the Sponsor pallet include computer hardware and software. The hardware for the Sponsor 14 is of sufficient size, robustness and scalability to meet Orbian Limited's exacting requirements. While it is the Sponsors decision as to hardware supplier and configuration, the Sponsor pallet offers a recommended and fully operational hardware solution. The palletized software for Sponsors 14 includes various functionality and can be divided, for example, into pilot and operational modes.

In an embodiment of the present invention, pilot software provides functionality, for example, for create, read, update delete (CRUD) Sponsor and authorized staff profiles and security data, run and maintain, and administer the Orbian system pilot, CRUD pilot Member accounts on the Orbian system pilot and the entry of Member profile data, advise, and troubleshoot problems experienced by pilot Members 16 using the Orbian system pilot, and interface between the Sponsor's own functionality and its selected Member product. Operational software includes functionality, for example, to administer the transition of a pilot Member 16 from the pilot service to the operational service, CRUD Member details, such as change of address, contact details, and name, CRUD and advise Sponsor trading terms, credit terms, tariffs and rates with Orbian Limited 10 and outline framework of Sponsor's onward terms to its Members 16, CRUD employee permissions for Orbian Limited access within the Sponsor organization, administer the notification of invalid Member attempted usage, and produce paper-based statements for Members 16 at Sponsor's discretion and cost.

The operational software for an embodiment of the present invention includes functionality, for example, to administer and notify Members' status, such as defaults occurring on their drawdown account, obtain the Orbian Limited operational service, CRUD its client Members' drawdown accounts, access a flexible electronic charges notification and billing service, provide functionality for the Sponsor help desk/call center either directly or through an approved third party service provider, provide information to the Sponsor management comprising all OC based income and expense activity including income analysis and reconciliation, and structured interfaces with the Sponsor's existing back-office systems, where required and practicable. The operational software also includes functionality to provide operational information to the Sponsor 14, such as client Member activity reports and status, commission reports, sales contact priorities, restricted one-off query capability, market analysis and trend analysis reports, FX rate and activity reports, audit reports on malicious acts, falsification attempts, security breaches and the like, and reports on scheduled and unscheduled Orbian Limited maintenance and backup and recovery activity. Other functionality provided by the operational software includes, for example, archiving, backup and recovery facilities and interface between the Sponsor's own functionality and its selected Member product.

In an embodiment of the present invention, the Sponsors' electronic collateral aspects include, for example, Orbian Limited Sponsor and Member benefit statements, a Sponsor benefits modeling tool, a Member benefits modeling tool, case studies, product synopsis, a Sponsor user manual, Orbian Limited to Sponsor tariff structures and tariffs, Sponsor to Member tariff structures and pricing modeling tool, and standard contract terms and conditions for Orbian Limited to Sponsor, Orbian Limited to Member, and Sponsor to Member. Service access for the Sponsor 14 includes, for example, access to Orbian Limited internet features and benefits materials, Orbian Limited Internet sales web-site giving help on handling objections and technical queries, telephone access to the Orbian Limited Sponsor help desk during its normal business hours for assisting its contracted Members 16, unlimited multi-user demonstration copy of the Orbian Limited Member software and unlimited browser access to the Orbian Limited demonstration web-site, browser access to the Orbian Limited technical support web site, and Browser access to the Orbian Limited case study library.

The Sponsor registration includes an investment grade entity so that it can offer drawdown accounts to non-investment grade Members 16. Investment grade Members 16 are eligible to apply, via the Sponsor 14 for a drawdown account direct with Orbian Finance Limited 12. The Sponsor's access to the relevant account details mirrors those of a banker to its own customer's account records. A close/suspend drawdown account function is relevant where a Sponsor 14 has a 'wholesale' drawdown account with permission to sub-divide and allocate portions of the facility to subordinate 'retail' drawdown accounts held by its client Members 16. Each drawdown on a subordinate Member's account results in a matching entry on the Sponsor's linked drawdown account.

The Member pallet for an embodiment of the present invention is configured and supplied by the Sponsor 14 in accordance with the Member's requirements. Under the terms of the Sponsor's franchise agreement, the Member's selected pallet must conform with minimum QQOs. The hardware for the Member 16 (if required) likely varies in size from a mainframe down to a web-phone according to the size and complexity of the business. The palletized software for Members 16 includes functionality that can be divided between pilot and operational modes. Pilot Member software includes functionality, for example, for CRUD Member and authorized staff profiles and security data, run and maintain, and administer the Orbian system pilot, CRUD pilot Member accounts on the Orbian system pilot and the entry of Member profile data, advise, and troubleshoot problems experienced by pilot Members using the Orbian system pilot, and interface between the Member's own functionality and its selected Member product.

In an embodiment of the present invention, the Operational software for Members 16 includes functionality, for example, to administer the transition of a pilot Member from the pilot to the operational service, CRUD Member details, such as change of address, contact details, name, and the like, CRUD and advise Member to Member trading terms and maturity date terms, CRUD tariffs and rates with Orbian Limited 10, CRUD user access permissions, Member produced secure paper-based statements and reports, access to a flexible electronic charges notification and billing service, and provide functionality to access the Sponsor help desk/call center. Operational software also includes functionality for structured interfaces with the Member's existing back-office systems where required and practicable, receive and handle the notification of invalid Member user attempted usage, establish employee permissions for Orbian Limited access within the Member organization, obtain Member trading partner status items, such as Orbian Limited defaults, provide functionality to discount OCs for cash, utilize Orbian Limited linked FX services, access a flexible electronic charges notification and billing service, and provide information to the Member management comprising all OC based receipts and payments including OC liquidity management.

In addition, the Member software for an embodiment of the present invention includes functionality to provide status information to the management of the Member 16, such as Member trading partner activity status and terms, mismatched trading terms reports, summary of accounts, balance reports, cash management reports, transaction details, value transfer reports, discounting services used and available, FX services used and available, details of trading terms and tariffs applied, restricted one-off report capability, audit Orbian Limited charges, troubleshoot any Orbian Limited service, data handling or charging reconciliation problems experienced by Member user personnel, obtain audit reports on malicious acts, falsification attempts, security breaches and the like, and obtain reports on scheduled and unscheduled Orbian Limited maintenance and backup and recovery activity.

Further operational Member software functionality for an embodiment of the present invention includes, for example, archiving, backup and recovery facilities and use of operational account(s), such as prepare and submit OC based payment instructions taking account of maturity implications, procedures to block OC receivables for holding to maturity, browser based interface for statements status inquiries and the like, browser based interface for reconciliation, browser based interface for balance analysis, such as maturity date impact on OCs receivable, EDI/Orbian Limited based interface remittance advice, interface for operational and drawdown accounts to proprietary accounting systems, interface to proprietary accounting systems to handle notification/acceptance of Orbian Limited charges and interest payments, BACS style interface for notifying OC based payment instructions to Orbian Limited 10, Web based interface for reconciliation of operational account, and receive and handle the report of total Orbian Limited transactions in the period.

Other operational Member software functionality for an embodiment of the present invention includes, for example, use of drawdown account(s), such as obtaining reports on web based interface for drawdown account, web based interface for reconciliation of drawdown account, browser based interface for statements, status inquiries and the like, and browser based interface for balance analysis, such as cash flow impact of the OC payable maturity dates. The Members' collateral based service components for an embodiment of the present invention include, for example, Member benefit statements, Member benefits modeling tool, case studies, product synopsis, Member user manual, Sponsor to Member tariff structures, and standard contract terms and conditions for Orbian Limited to Member and Sponsor to Member. Service access for Members 16 include, for example, access to Orbian Limited browser features and benefits materials, Orbian Limited browser sales web site giving help on handling objections from prospective customer and supplier Members 16 and technical queries, telephone access to the Sponsor help desk during its normal business hours, unlimited browser access to the Orbian Limited demonstration web site, browser access to the Orbian Limited technical support web site, and browser access to the Orbian Limited case study library. The permissions required by users within a Member 16 correspond closely to permissions provided to a bank customer.

In an embodiment of the present invention, objects include, for example, POC, OC, parties, relationships, volumes, transaction flows, scalability, performance requirements, date control, pricing model, charge types, supplier invoice approval, other income, profit model, cost model, gross profit, reporting/inquiries, Orbian Limited messaging, security, macro controls, system controls, system management, statistics, discounter hand-off inquiry, FX trading house hand-off inquiry, and Orbian Finance Limited discounter hand-off inquiry. Other objects include, for example, Member profiles, currencies, corporate structure profile, user profile, audit log/transaction replay, access/activity logs, currency pages, cancel transaction, bank holidays, maker/checker on maintenance functions, database purging, archiving, money laundering, system links, Internet, external trading communities, and exclusions.

The POC for an embodiment of the present invention is an irrevocable undertaking by an authorized Member 16 to pay a fixed amount of cash to Orbian Limited 10 on a specific future date. As all the credit standings of the POC issuing Members 16 are not equal, each POC issuing Member 16 is required to obtain credit enhancement under Orbian Limited rules. An authorized issuer of POCs is a Member 16 in one of a category of an investment grade rated entity, an Orbian Limited approved, shadow-rated, investment grade entity, or an approved and authorized Member customer or client of a Sponsor 14 in either of the other two categories. Subject to status, all Members 16 are eligible to apply for a drawdown account. The authorized Member 16 is allowed to issue POCs up to a finite, reviewable limit at the cost of credit enhancement. POCs are issued in favor of Orbian Finance Limited 12 and are applied by Orbian Finance Limited 12 as collateral for authorizing Orbian Limited 10 to issue to specific Members 16 a corresponding amount of OCs back-to-back (B2B) against the POC receivable. The OC is raised automatically once the related POCs have been authorized.

The OC for an embodiment of the present invention is an electronic transfer of value issued by one Member 16 in favor of another Member 16 in settlement of their mutual indebtedness. The Member 16 can issue OCs at any time up to the total of its OC receivables, less charges levied on a payee Member 16 on receipt of the OC. There is no additional credit risk as the OCs issued are collateralized by the OC receivables. In turn, the OC receivables are covered by the underlying OCs awaiting maturity and the mature OC cash float. While no credit enhancement fee is charged, transmission of the OC incurs a Orbian Limited transaction fee (and optionally, a value related fee to cover system and other risks involved). To the extent that OC receivables are less than the required OC payables, the excess OCs can be issued, subject to status, against an OC issued by that Member 16 in favor of the Orbian Limited 10 or against any available free balance on the Member's drawdown account. The OC issuer category includes any registered Orbian Limited Member 16. A Member 16 may issue OCs at any time, provided it has a sufficient number of OC receivables to cover the OC issuance and charges, or if the OC receivables are insufficient, it has the authorization and capacity to issue a covering POC.

The parties for an embodiment of the present invention include, Orbian Limited 10, Members 16, Sponsors 14, Orbian Management Limited 20, Orbian Finance Limited 12, discounters, FX trading houses, FX SPV, the system banker 18, a system administrator (SA), and Member administrator. Orbian Limited 10 is a global service permitting the secure, electronic settlement of trade indebtedness between its Members 16. Eligible Members 16 of Orbian Limited 10 also benefit from a new source of very low cost business finance. The Member 16 is a business entity authorized to receive and make payments in OCs and, where eligible, to issue POCs to increase its OC issuance capacity. The Sponsor 14 is a specialized Member 16 offering a manual or electronic interface between another Member 16 and Orbian Limited 10. The Sponsor 14 manages the registration of the Member 16 and the setting-up of the POC and/or OC account(s) for its customers. All Sponsors 14 may offer their Member clients/customers access to a line of credit of which they also will carry an authorized portion of the default risk. This is effected by the authorized Sponsor 14 obtaining, subdividing and retailing its own wholesale facility on terms to be agree with Orbian Finance Limited 12. Alternatively, where criteria relating to the investment grade status of a Member 16 are met, the Sponsor 14 can negotiate and obtain for its client customer a POC facility direct from Orbian Finance Limited 12.

In an embodiment of the present invention, Orbian Management Limited 20 provides all operational and management services to Orbian Limited 10 and certain services to Orbian Finance Limited 12. The credit standing of the issuers of POCs potentially range from highly secure investment grade rated corporations to non-rated, relatively small businesses. Orbian Finance Limited 12 is an independent corporate operation responsible for arranging credit enhancement for a pool of obligations made only by investment grade Sponsors 14 and Members 16. A discounter is a specialized Member 16 offering to discount OCs for cash on standard discounting terms. The discounter can also provide Members 16 with OC discounting/deposit in OC mode, netting and funding (when required) OC maturity date mismatches.

In an embodiment of the present invention, an FX trading house is a specialized Member 16 providing foreign exchange services to Members 16 with settlement in OCs issued by the Member 16 in favor of the FX Member 16. In the early stages, linked FX services are provided by a particular bank. The FX instruction can be implemented in both OC to FX OC and OC to FX cash mode. FX transactions where a Member 16 is issuing an OC in one currency to effect payment by OC in another currency offers the opportunity of netting these transactions. As the rate for each FX transaction of this type is set in real time, such netting carries an element of risk. The FX SPV aggregates the net running position. Either at the expiry of predefined and variable time periods or as and when prudent, the FX SPV passes the net position in the currency pair to the FX trading house for real time settlement.

The system banker 18 for an embodiment of the present invention provides global cash management and treasury services to Orbian Limited 10. The SA refers to the Orbian Limited user with the global responsibility for maintaining the system. The SA adds Members 16, Sponsors 14, FX trading houses, discounters, sets up trading relationships, Orbian Limited 10 and credit enhancement parameters, and the like. The SA includes Orbian Limited staff authorized to carry out relevant functions. Members 16 includes Sponsors 14, and the Member administrator for the Member/Sponsor 14 is responsible for maintaining its own profiles and the internal availability of the system within the Member/Sponsor 14, such as user authorizations and the like.

In an embodiment of the present invention, the relationships between Members 16 and linked services are defined by an entry in the relevant relationship table(s), such as Orbian Limited 10 to many Members 16, Member 16 to many of the Member's authorized users, many Members 16 to many Members 16 (pre-authorization of trading links, limits and terms only), many Members 16 to one or more Sponsors 14 (account set-up, credit limit approval, commission terms), Member 16 to many drawdown accounts, and Member 16 to many operational accounts. Other relevant relationship tables include Member's drawdown account(s) to one or many operational accounts, many risk sharing Sponsors 14 to Orbian Finance Limited 12, Orbian Limited 10 to many Sponsors 14, Orbian Limited 10 to discounter(s), Orbian Limited 10 to FX trading house(s), Orbian Limited 10 to system banker 18, and Orbian Limited 10 to Orbian Finance Limited 12. A corporate group holds many drawdown accounts and operational accounts at various levels of the organization. The system permits any combination of grouping for reporting purposes and for controlling the permitted transfer of value between accounts.

In an embodiment of the present invention, transaction volume is the predominant factor in determining system capacity. Most transactions are generated by the Members 16 effecting settlement and obtaining reports on their accounts. When a payer transmits value to a payee, only the payer Member 16 needs to be in communication with Orbian Limited 10 at the time of effecting settlement. The payee, which may be in a different time zone, is never required to be on-line at the time the value transfer is effected. In consequence, Member-buyers 22 can effect settlement to a Member-supplier 24 without involving the supplier. This feature of the Orbian system eliminates the classic exchange/dealing problem of simultaneously connecting both parties in order to effect settlement. It also means that Orbian Limited 10 can offer global, 'real-time' settlement without regard to time zones and local banking holidays. As a consequence, while processing is simplified, ease of use by the Member 16 is much improved over conventional settlement systems.

The impact of transaction growth of the Orbian system for an embodiment of the present invention on required processing capacity can be predicted or controlled to an extent, for example, by pre-launch response, rate of OC facility growth, rate of Sponsor recruitment, division of functions and records, activation of currencies, activation of countries, and activation of Member roles. It is a fundamental rule that there are no Member house accounts. Every Member 16 is required to join through a Sponsor 14. This subdivides the manual and system workload of joining Members since membership processing and membership records for Members 16 can be grouped by Sponsor 14. The rate of joining of Sponsors 14 is thus a controlling factor on transaction growth. The product and service advantages of the Orbian system are such that customer demand may build extremely rapidly. Thus rapid scalability of the system is of paramount importance. Trade settlement between Members 16 falls into natural mutual trading grouping, such as currency, country, and Sponsor relationship management, including Membership processing and transaction preparation. The Orbian system architecture provides subdivision of records and functions and also defines the requirement for a buffer queue to smooth transaction flows. If needed, a pro_Record_OC_Queue table eliminates the system burden of both issuing the payment instruction and writing it to the payee's operational account at the same time.

In an embodiment of the present invention, Orbian Limited 10 activates currencies in a rolling program. However, the system requirement for each currency is fundamentally identical with the exception of language labels, number formats and required layout styles. The interface between currencies is effected via the linked FX trading house. An example of active currencies includes Sterling, U.S. Dollar, and Euro. Members 16 are able to join Orbian Limited 10 from anywhere in the world subject to joining restrictions by country set out in a tcss_Country_Active_Transactions table. Members 16 may own and operate an operational account and/or a drawdown account from anywhere in the world, subject only to relevant local foreign exchange regulations.

In an embodiment of the present invention, a Member 16 can operate in any of a number of modes, such as buyer or OC payer only, supplier or OC payee only, or buyer and supplier. The buyer only mode will apply to many retailers where their sales income is received in conventional cash and card payments. However, the introduction of Orbian Limited cards (via third-party card issuers) will substantially expand this category (or cash based settlement) even further. With regard to the supplier only mode, any Member 16 can elect to be paid in OCs and discount its OC receivables into cash. This is the least cost-effective way of benefiting from Orbian Limited Membership. The buyer and supplier mode is the principle way in which Members will use the Orbian system. The Orbian Limited service can be marketed by a wide range of Sponsors 14, such as banks, investment banks, major financial institutions, specialist marketing companies, government departments, insurance brokers, trade associations, specialist IT houses, specialist ERP financial and accounting software houses, accountants, lawyers, large incorporates to their supply chains, management consultancies, and other specialist business advisers and companies with access to significant corporate client bases.

In an embodiment of the present invention, value transfer from Member to Member via Orbian Limited 10 is a real-time, 24 hours per day, 365 day year service. Being a single system with centrally coordinated processing, value transfer is effected as soon as a transaction has been authorized and communicated by the Member 16 and validated by Orbian Limited 10. The system is built in such a way as to conform to established legal and regulatory criteria. Prospective Members 16 and Sponsors 14 obtain initial access to Orbian Limited 10 via the WWW and via the Sponsor's home page. The date control for an embodiment of the present invention includes transaction date, maturity date, settlement date rules, and time zones. The transaction date and time stamp is calculated at GMT. Orbian Limited 10 maintains a tcss_Country_Name table enabling the conversion of the GMT date and time stamp to that of the local time zone of the transaction party or parties, the local date and time translated into local date formats. The transaction date applies to all types of transactions.

In an embodiment of the present invention, the Maturity Date is the date when the system banker 18 receives value in the Orbian Limited POC collections account for the amount of the POC due from the issuing Member 16 to Orbian Finance Limited 12. The Maturity Date is also the date when the system banker 18 initiates payment from the Orbian Limited OC payments account for the matured value of an OC due to the payee Member 16 from Orbian Finance Limited 12. In the event that the computed Maturity Date falls on a non-banking day as determined by the a tcss-Bank-Holidays table, the settlement date is calculated according to predefined settlement date rules. If a POC collection or an OC payment is less than a variable defined minimum value, then the amount collectable or payable is to be rolled over.

In an embodiment of the present invention, the date upon which an instruction is given by Orbian Limited 10 to the system banker 18 to effect a cash transaction on behalf of Orbian Finance Limited 12 is the settlement date. Orbian Limited instructions to the system banker 18 are effected on the relevant settlement date determined as a predetermined GMT time. In consequence, the date when the Orbian Limited cash account shows the transaction depends upon the cash settlement system utilized. Orbian Limited 10 maintains a tcss_Transmission_Delay table giving the time delays relevant to banking clearance system utilized and the currency. All Orbian Limited interest charges and credits at the moment the A to B value movement instruction is executed. The Member 16 is advised of the target date, depending on cash transmission system used, when the cash transaction will be reflected in its bank account. Wherever originated globally, all transactions are logged at GMT which is converted by Orbian Limited 10 to the Member's local date/time.

The Member standard pricing model for an embodiment of the present invention is concerned with providing transaction charges, credit enhancement fees, discounting rates and executable foreign exchange rates. The basic procedure is that the Member standard price is computed for each transaction type. It is then adjusted by rates applied to the Members particular account which are set by the Sponsor 14 responsible for the particular account. The adjusted price is the Member adjusted price. Certain of the rates are sourced from a number of automatic external price feeds which are supplied to Orbian Limited 10. Charge types for an embodiment of the present invention include, for example, POC issuance, OC receipt, and purchase invoice/credit note approval. FX charge types include, for example, FX transactions—OC to FX OC mode and FX transactions—OC to FX Cash mode. Discounting charge types include, for example, discounting OC for cash and OC to OC maturity date matching. A pro_Types_Transaction table holds the definition of all active charges.

The POC for an embodiment of the present invention is only issued by an authorized Member 16 to Orbian Finance Limited 12 as collateral for the issue by Orbian Limited 10 of OCs to other Members 16. Where the Member 16 is investment grade, the CE fee rate for the issuance of the POC is negotiated by the Sponsor 14 with Orbian Finance Limited 12 on behalf of the Member 16. Where the Member 16 is non-investment grade, it is only able to issue POCs by obtaining a retail drawdown account with a Sponsor 14 which is investment grade or whose Sponsor registration includes an investment grade entity. The value related credit enhancement fee is charged on the issuance of a POC. It is calculated on an annual percentage, adjusted by the maturity term of the POC, on the value of each individual POC issued. The CE Fee is set for each individual drawdown account in one of a number of modes, such as Orbian Finance Limited 12 and Sponsor 14 jointly, Sponsor 14 (investment grade), and Sponsor 14 (non-risk bearing). The Orbian Finance Limited and Sponsor jointly mode applies when the Member 16 is investment grade. The drawdown account terms are negotiated by the Member 16 and its Sponsor 14 with Orbian Finance Limited 12 and authorized on the particular drawdown account by Orbian Finance Limited 12. This can apply, for example, to a major retailer being introduced to Orbian Finance Limited 12 by a bank acting in its role as a Sponsor 14.

In the Sponsor (investment grade) mode for an embodiment of the present invention, the Sponsor 14 negotiates a limit on a wholesale drawdown account. The Sponsor 14 is permitted to subdivide the wholesale facility amongst its Members 16. The Sponsor 14 is financially responsible for the Member's use of the subdivided facility, including making arrangements for the collection from the Member 16 of its maturing POC. The Sponsor 14 is also responsible for all action on default. In the Sponsor (non-risk bearing) mode of setting the credit enhancement and terms on a particular OC issuance account is normally used when the Member 16 is not investment grade and when the Sponsor 14 is acting in a broker capacity only. The Sponsor 14 in this category is operating as an agent for the Sponsor 14. This can apply, for example, to one or more leading trade credit insurance brokers.

An embodiment of the present invention involves setting POC issuance tariffs, for example, for Member investment grade and Member non-investment grade. Member investment grade rates are set by Orbian Finance Limited 12, which also manages risk. For Member non-investment grade, the wholesale rate charged to Sponsor 14 is set by Orbian Finance Limited 12, and the Sponsor 14 sets the retail rate charged to the Member 16. Orbian Finance Limited 12 looks to the Sponsor 14 for meeting the Member's POC matured retail obligations and manages the risk in terms of the Sponsor's total exposure and not in terms of the individual Member obligations which are effectively to the Sponsor 14 although disclosed to Orbian Finance Limited 12 as part of overall risk management. Whichever mode is operational, the procedure for setting the terms and rates for a particular drawdown account is the same.

An embodiment of the present invention includes reports, a number of which are restricted in availability to Orbian Limited 10. Subject to permissions, certain reports are also available to the Orbian Limited SA and the Orbian Limited authorized management, including Members 16, Sponsors 14, Orbian Management Limited 20, FX houses, Orbian Finance Limited 12 as discounter and credit enhancer, and the system banker 18. Access by the SA is subject to special multiple permissions for Orbian Limited senior management and board, compliance, rating agency, and regulator.

Reports generated for Orbian Limited/Orbian Management Limited in an embodiment of the present invention for use for screen viewing and printing, including authorized remote access, include transaction details report, potential Member inquiry analysis, market analysis/trend analysis, trading links analysis, Member activity, Sponsor activity, FX rates which shows the FX rate history of any currency processed by Orbian Limited 10, FX activity which report summarizes the utilization of FX services by an individual Member 16 or a group or class of Members 16 by currency, territory, industrial classification, corporate group, discounting rates which shows the interest rate history for each currency discounted by the discounter (including OC maturity matching interest charges and credits), and discounting activity which is a MISS report that summarizes the utilization of discounting services by an individual Member 16 or a group or class of Members 16 by currency, territory, industrial classification, corporate group.

Additional reports generated for Orbian Limited/Orbian Management Limited use for an embodiment of the present invention include revenue summary report which shows the gross and net revenue (after deduction of the Sponsor portion) for each revenue heading for any selected time period and any comparative period with trends, cost summary report which shows the direct costs applicable to each revenue heading (e.g. Sponsor portion of revenue, processing costs) for any selected time period and any comparative period with trend analysis, gross profit report which is an amalgam of the revenue summary and cost summary reports, special reports, and statistical/activity reports.

Commercial applications for an embodiment of the present invention include, for example, OC direct debit, OC direct credit, credit cards, conditional OCs, secured and unsecured commercial OC 'loans', secured and unsecured term/on call facilities, OC bill of exchange/promissory note, OC letters of credit, FX netting in both OC to FX Cash and OC to FX OC modes, and emerging markets netting. Additional commercial applications include, for example, EDI services (especially transmission of invoices/linked data feed of invoices awaiting OC settlement), Web advertising and promotion by and for Members 16, hot links to Members' web pages, hot buttons to Members' linked services such as FX and discounting), and value added services for Orbian Limited Members 16 such as travel, legal, insurance, preferred rate products and services.

Consumer applications for an embodiment of the present invention include, for example, OC direct debit, OC direct credit, credit cards, consumer income management, house building and mortgage finance, and Pensions and Savings. Public Sector Applications for an embodiment of the present invention include, for example, Public sector revenue expenditure including social security and health service, Public sector capital expenditure, Development grants and loans for both the public and private Sectors, UK Public Finance Initiative, Overseas aid, and VAT/sales tax/other taxation collection services.

A Member 16 for an embodiment of the present invention can function as any one or more of Sponsor 14, discounter, FX trading house, Orbian Finance Limited 12 or other credit enhancement service provider, or the system banker 18. The Member 16 can utilize the settlement services of Orbian Limited 10 in any of a number of modes, such as buyer only, supplier only, or buyer and supplier. In addition, a Sponsor-linked financial institution, acting as a Member 16, can offer to discount OCs to cash by instantly crediting the customer's conventional account in its own books. A prospective Member 16 can apply to join Orbian Limited 10 either directly or indirectly through a Sponsor 14. If the initial contact is made direct to Orbian Limited 10, the prospect will be offered a choice of Sponsors 14 which are able to provide relevant services. Orbian Limited 10 may charge the Sponsor 14 for on-screen promotion. Orbian Limited 10 itself will not operate house accounts.

Figure 3:
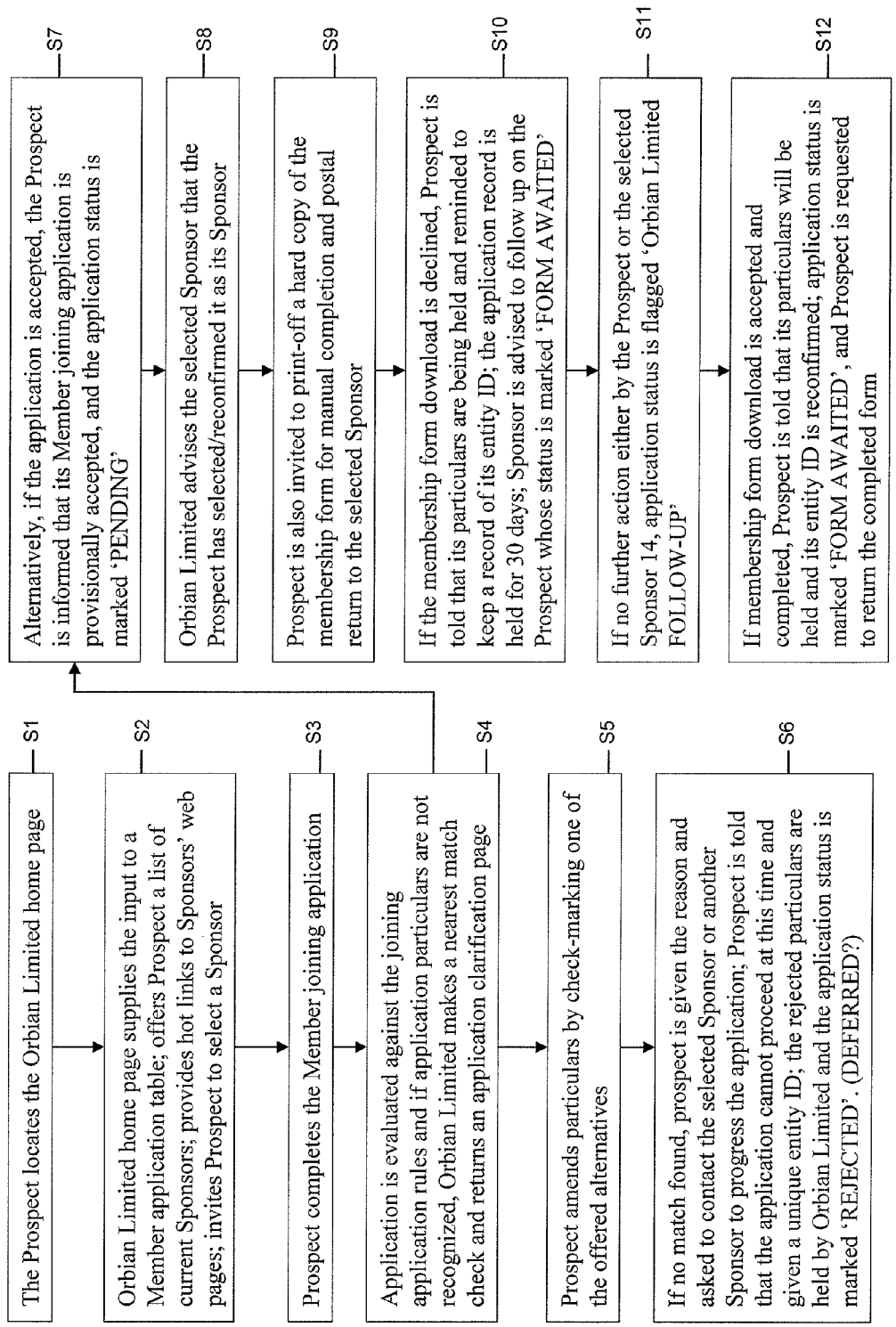
FIG. 3 is a flow chart which illustrates an example of the process of a Member registration for an embodiment of the present invention.

In an embodiment of the present invention, a trading entity anywhere in the world may apply to join Orbian Limited 10 as a Member 16. FIG. 3 is a flow chart which illustrates an example of the process of a Member registration for an embodiment of the present invention. At S1, the prospective Member (Prospect) locates the Orbian Limited home page. The Orbian Limited home page includes an invitation to apply to become a Member 16. It states that approval of the application is at the absolute discretion of the Sponsor 14. At S2, the Orbian Limited home page supplies the input to a Member application table. The Prospect is offered a list of current Sponsors 14 in the form of list boxes grouping Sponsors 14 by banks, insurance brokers, trade associations, electronic commerce providers, and other registered Sponsors. The Orbian Limited home page provides hot links to Sponsors' Web pages where offerings can be viewed. The Prospect is invited to select a Sponsor 14, and at S3, the Prospect completes the Member joining application, providing all the data set out in the tcss_Member_Application table. At S4, the application is evaluated against the joining application rules. If the application particulars are not recognized, at S5, Orbian Limited 10 makes a nearest match check and returns an application clarification page, the content of which is linked to the tcss_Member_Application table and a tcss_Recognized_Trading_Entity table. At S6, the Prospect amends his particulars by check-marking one of the offered alternatives. If no match is found, at S_, the Prospect is given the reason and is asked to contact the selected Sponsor 14 (or another Sponsor 14) to progress the application. The Prospect is told that the application cannot proceed at this time. The Prospect is given a unique entity ID, the rejected particulars are held on the tcss_Member_Application table, and the application status is marked 'REJECTED'.(DEFERRED?)

If the application is accepted, at S7, the Prospect is informed that its Member joining application is provisionally accepted, and the application status is marked 'PENDING'. At S8, Orbian Limited 10 advises the selected Sponsor 14 that the Prospect has selected/reconfirmed it as its Sponsor 14. At S9, the Prospect is also invited to print-off a hard copy of the membership form for manual completion and postal return to the selected Sponsor 14. The form requests appropriate signatures and contains Orbian Limited terms and conditions. It also contains requests for all information equivalent to that required to open a regular bank account. Hard copy return is to cover a requirement for hand-written signatures accepting Orbian Limited terms and conditions. At S10, if the membership form download is declined, the Prospect is told that its particulars are being held. The Prospect is reminded to keep a record of its entity ID. The application record is held for 30 days. The Sponsor 14 is advised to follow up on the Prospect whose status is marked 'FORM AWAITED'. At S1, if there is no further action either by the Prospect or the selected Sponsor 14, the application status is flagged 'Orbian Limited FOLLOW-UP'. At S12, if the membership form download is accepted and completed, the Prospect is told that its particulars will be held and its entity ID is reconfirmed. The application status is marked 'FORM AWAITED', and the Prospect is requested to return the completed form (and the bank account opening equivalent documents) to the address set out on the system printed form. The return address and the contract parties will depend on the Sponsor type.

In an embodiment of the present invention, a tcss_Recognized_Trading_Entity table holds short particulars of all known trading entities in each Orbian Limited active currency area. The table is compiled by direct input from sources, such as rated entity lists from rating agencies, trade credit reference sources, Sponsor client lists, trade association Member lists, company registration sources, Equifax/Yellow Pages directories, telephone directories, and postcode indices. A record in the tcss_Recognized_Trading_Entity table may be compiled from multiple sources. Where an entry is supplied by a Sponsor 14, the record is cross-referenced. The tcs_Recognized_Trading_Entity table is used to compile the master index.

In an embodiment of the present invention, the rules for accepting applications to join Orbian Limited 10 as a Member 16 and to open an operational account include the requirement that the Prospect must be a valid trading entity. If not on the valid trading entity index, then Orbian Limited 10 makes a nearest match check and returns the application clarification page to the Prospect to amend its particulars by check-marking one of the recognized alternatives. Another requirement of the joining application rules is that if the Prospect is not recognized, the application is declined at this time and the particulars are entered into the tcss_Member_Application table and the selected Sponsor(s) 14 are advised of the rejected (deferred?) application and are provided with contact follow-up details. If there is no further action by either the Prospect or the Sponsor within 30 days, the record is flagged for Orbian Limited follow-up. The module permits a Sponsor 14 to ascertain the current status of its client's application to join as a Member 16. It also provides an alert to Orbian Limited 10 and the Sponsor 14 if processing is delayed because of non-receipt by the Sponsor 14 of a hardcopy of application, non-receipt of all the information required for opening a regular bank account, or failure of selected Sponsors 14 to respond. The SA sets performance standards for processing Member applications.

The prospective Member 16 for an embodiment of the present invention has access to web pages, such as the Orbian Limited home page, Member home page, and Member linked pages. The Orbian Limited Home Page is used for Member applications, Member application clarification, and Member application progress. The Member 16 also has access to the Member home page but is accessed only by a Member 16 who has completed access validation procedures via a logon screen utilizing proven secure access software. The home page offers facilities for welcome to Orbian Limited 10, last visited time and date, repeats, Member main particulars, news, and new services, products, and upgrades. The Member home page has links to account management and reports, such as summary of accounts, operational account summary, operational account statement, issuance account statement, and balance reports for operational and issuance account. Other reports to which the Member home page has links include cash management report, transaction details, Member's tariff details, trading links and terms, and special reports. In addition, the Member home page has links to maintenance of Member particulars and maintenance of account particulars, value transfers, discounting services, FX services, and Orbian Limited messaging.

Figure 4:
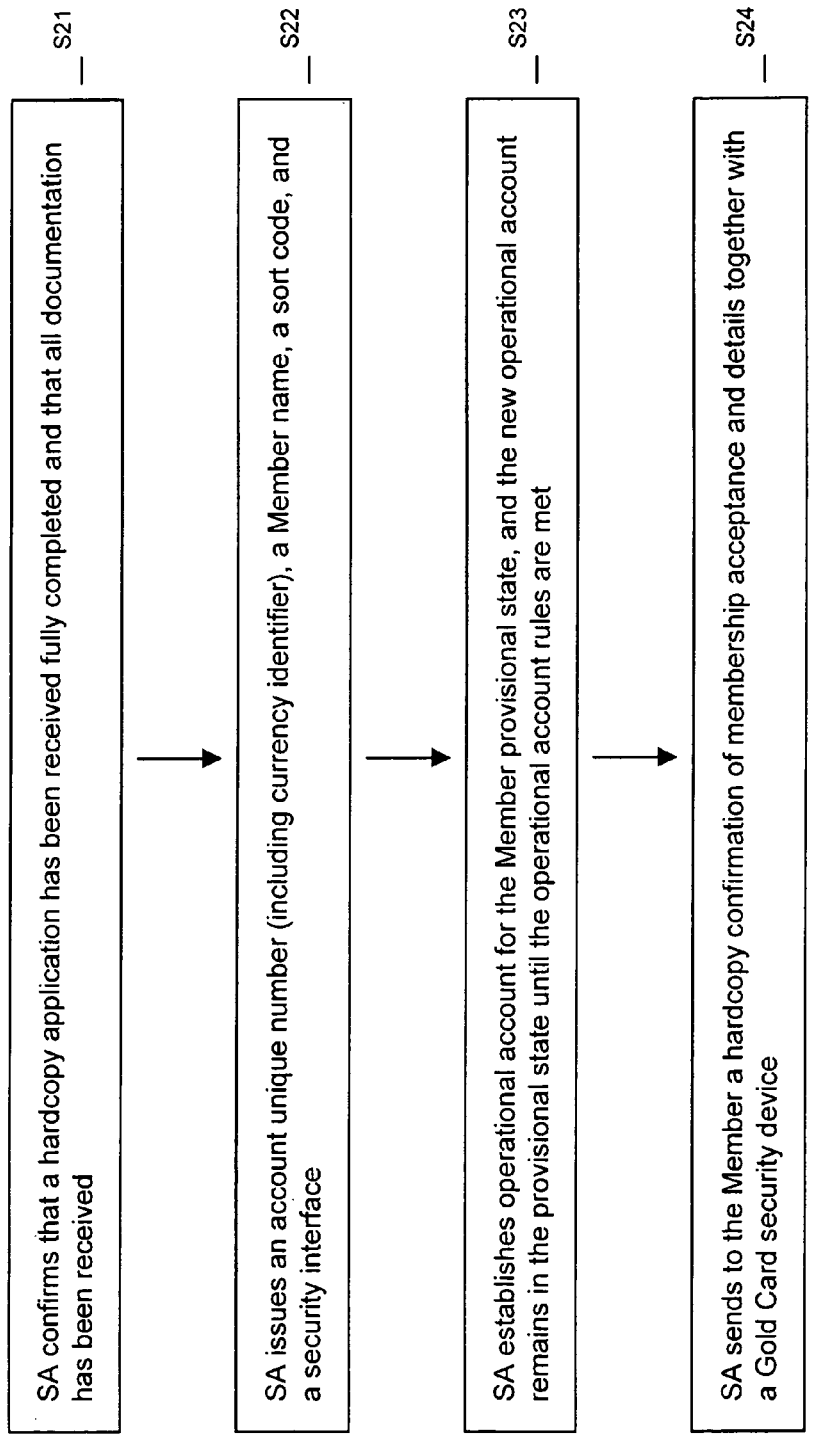
FIG. 4 is a flow chart which illustrates an example of the process of setting up an operational account for an embodiment of the present invention.

The first operational account for an embodiment of the present invention is automatically opened for the each Member 16 on completion of all Member joining procedures. No entity can be an Orbian Limited Member 16 without having an operational account. Thus, the setting up of the operational account is the final part of the joining procedure. FIG. 4 is a flow chart which illustrates an example of the process of setting up an operational account for an embodiment of the present invention. At S21, the SA confirms that a hardcopy application has been received fully completed and that all bank account equivalent documentation has been received. At S22, the SA issues an account unique number (including currency identifier), a Member name, a sort code, and a security interface (to be changed by the Member 16 before the account can be opened). At S23, the SA establishes the operational account for the Member provisional state, and the new operational account remains in the provisional state until the operational account rules are met. At S24, the SA sends to the Member 16 a hardcopy confirmation of membership acceptance and details together with a Gold Card security device.

Figure 5:
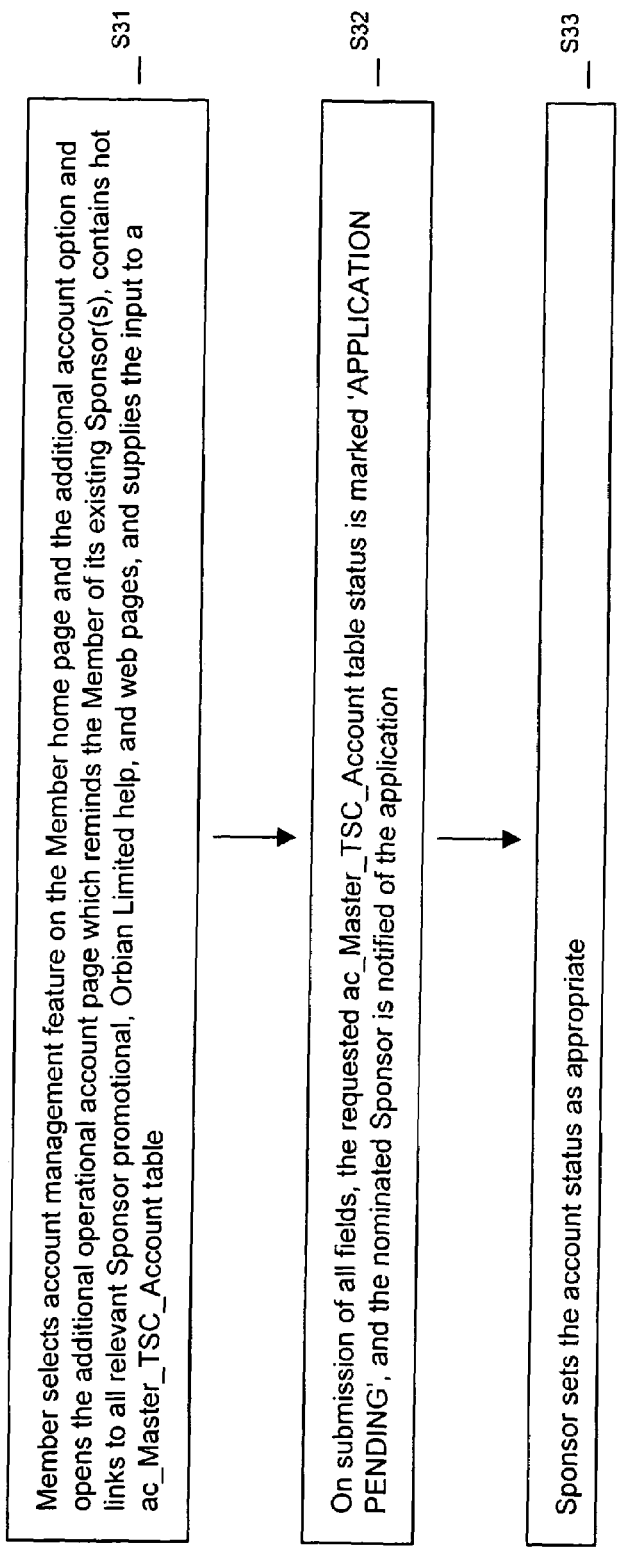
FIG. 5 is a flow chart which shows an example of the process of opening additional operational accounts for an embodiment of the present invention.

In an embodiment of the present invention, additional operational accounts may be opened in the same currency with either the same or another Sponsor 14. FIG. 5 is a flow chart which shows an example of the process of opening additional operational accounts for an embodiment of the present invention. At S31, the Member 16 selects the account management feature on the Member home page and the additional account option. This opens the additional operational account page which reminds the Member 16 of its existing Sponsor(s), contains hot links to all relevant Sponsor promotional, Orbian Limited help, and web pages, and supplies the input to a ac_Master_TSC_Account table. At S32, on submission of all fields, the requested ac_Master_TSC_Account table status is marked 'APPLICATION PENDING'. At S33, the nominated Sponsor 14 is notified of the application and sets the account status as appropriate. It is a commercial decision whether to set maximum dormancy periods for a drawdown or operational account. Alternatively, a fee can be charged for holding an account open when dormant. A Member 16 may open an operational account in any other Orbian Limited processed currency. The application follows the same procedure as that for opening an additional account in the same currency.

The rules that apply to the setting-up and opening of an operational account for an embodiment of the present invention include, for example, that the account owner must be a Member of Orbian Limited 10 in one of the membership classes as Member 16, Sponsor 14, discounter, FX trading house, Orbian Finance Limited 12 or other credit enhancement SPV, or system banker 18. An operational account may only be opened if all joining and activation procedures are completed. Any Member 16 may have more than one operational account within any one Orbian Limited processed currency. Each such account functions as if it were separately owned. A Member 16 may own operational accounts managed through more than one Sponsor 14. Any Member 16 may open operational accounts in more than one Orbian Limited processed currency. Multiple drawdown accounts and/or operational accounts are cross-linked by an ac-Index-Accounts table which holds details of all currency drawdown and operational accounts by Member 16.

Figure 6:
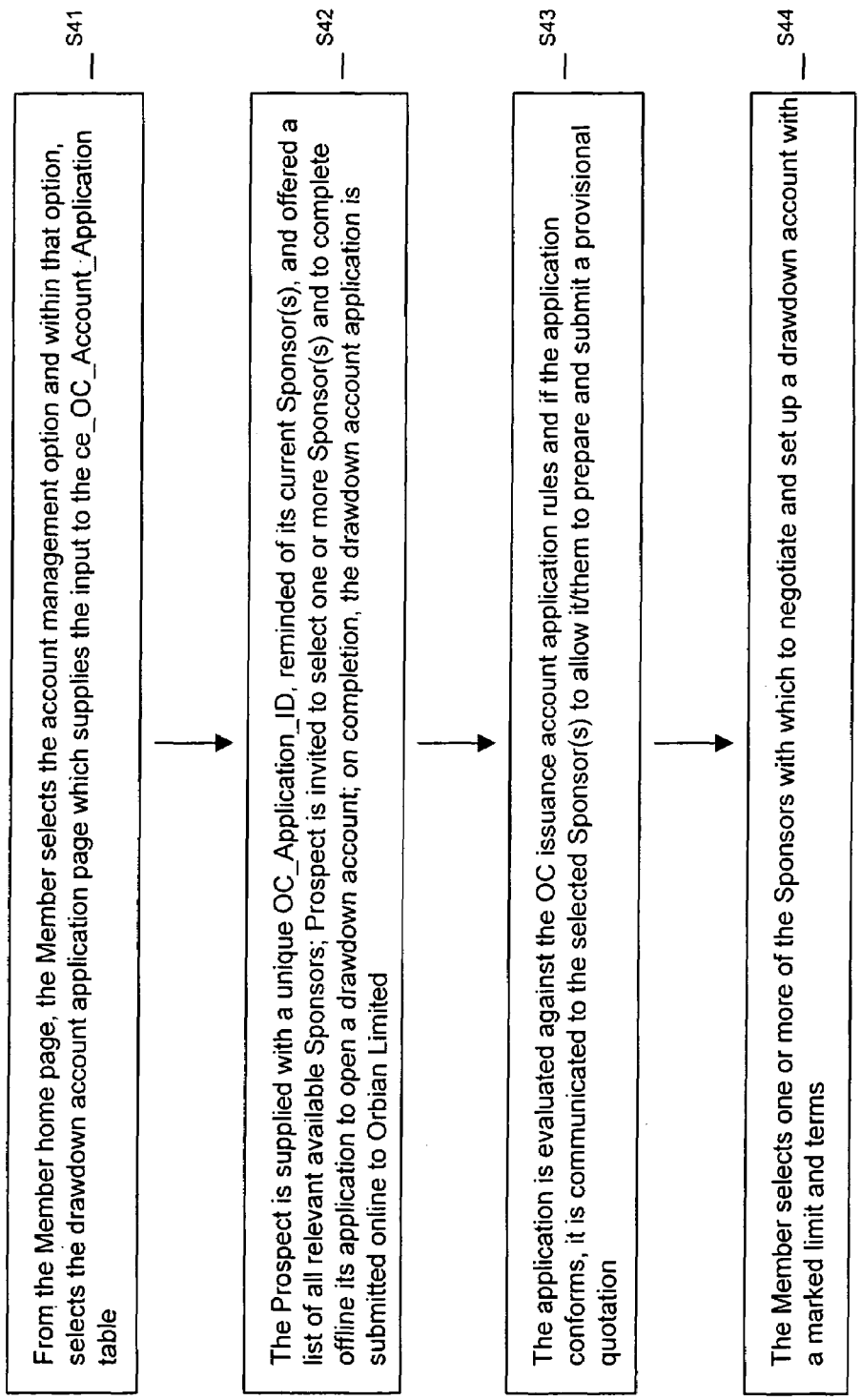
FIG. 6 is a flow chart which illustrates an example of the process of a Member opening a drawdown account for an embodiment of the present invention.

When the operational account for an embodiment of the present invention is opened, the Member 16 is able to apply for a drawdown account. FIG. 6 is a flow chart which illustrates an example of the process of a Member opening a drawdown account for an embodiment of the present invention. The Member 16 will already have an Sponsor 14 responsible for the relationship management of its operational account. From the Member home page, the Member 16 selects the account management option. Within that option, the Member 16 selects the drawdown account application page which states that approval of the application is at absolute discretion of Orbian Limited 10. The page supplies the input to the ce_OC_Account Application table. The Prospect is supplied with a unique OC_Application_ID. The Prospect is reminded of its current Sponsor(s) 14 and offered a list of all relevant available Sponsors 14 in the form of list boxes grouping Sponsors 14 by banks, insurance brokers, trade associations, electronic commerce providers, and other registered Sponsors 14. The Member home page provides hot links to Sponsors' web pages where terms and rates and other promotional material can be viewed. The Prospect is invited to select one or more Sponsor(s) 14 and to complete off-line its application to open a drawdown account. On completion, the drawdown account application is submitted on-line to Orbian Limited 10. The application is evaluated against the OC issuance account application rules. If the application conforms, it is communicated to the selected Sponsor(s) 14 to allow it/them to prepare and submit a provisional quotation. The Member 16 selects one or more of the Sponsors 14 with which to negotiate and set up a drawdown account with a marked limit and terms. The Member 16 can own more than one such account via one or more Sponsors 14.

The rules that apply to the setting-up and opening of a drawdown account for an embodiment of the present invention include, for example, that the account owner must be a Member of Orbian Limited 10 with at least one operational account in the same Orbian Limited process currency. A drawdown account may only be opened if all setting-up and activation procedures are completed. Any Member 16 may have more than one drawdown account within any one Orbian Limited processed currency. Each such account functions as if it were separately owned. A Member 16 may own drawdown accounts managed through more than one Sponsor 14. Any Member 16 may own drawdown accounts in more than one Orbian Limited process currency. Multiple accounts are cross linked by the ac_Index_Accounts table which holds details of all currency accounts by Member 16.

Access by an individual Member 16 to its operational account for an embodiment of the present invention is dependent upon the state of its account, such as application pending, provisional, open, suspended, or closed. Actions by the Member 16 on its drawdown account(s) are driven by actions on its linked operational account(s). Consequently, the Member's access to its drawdown account(s) is restricted to account information only.

In an embodiment of the present invention, a pre-approved Orbian Limited trade links/terms procedure is used by the Prospect and the Member 16 to log its buyer and supplier relationships to pre-authorize and control payments to a list of suppliers, set Orbian Limited trading terms, such as default OC maturity terms and maximum delay between the Member-buyer's receipt of the sales invoice and its issuance of an OC in settlement, and provide Orbian Limited 10 with a means of mapping trading links and identifying Prospects with high linking potential. In order to establish trading links prior to joining as a Member 16, which is optional at the prejoining stage, the Prospect accesses a list of relevant recognized trading entities which is supplied by a tcss_Recognized_Trading_Entity table. The Prospect then selects the trading mode as buyer or supplier or as both buyer and supplier. In each mode, the Prospect checkmarks each entity with which it trades. This completes the entry requirement at this stage, the setting of trading terms being disabled.

In a positioning procedure for an embodiment of the present invention, which at least is required by Orbian Limited 10 to record Member to Member trading terms, the Member 16 accesses the Member home page and selects the account management option and the maintain trading links function. This provides a search function to identify further entities supplied by the tcss_Recognized_Trading_Entity table. The Member 16 selects the trading mode as buyer or supplier or as both buyer and supplier. In each mode, the Member 16 checkmarks each entity with which it trades. The default procedure is that every OC issuance is validated against pre-authorized trading links set up by the Member 16. If this default is deselected, the Member 16 is required to follow a full authorization procedure.

A procedure for setting trading terms for an embodiment of the present invention covers the setting and maintenance of trading terms between any two Members 16. On joining, each Member 16 is offered the opportunity to pre-set OC maturity terms (in days from OC transaction date) in trading modes as a buyer or as a supplier. The pre-set terms may be held in a concealed mode (not disclosed to other Members 16) or in a disclosed mode. The Member 16 is not bound by the pre-set (default) maturity terms whether or not disclosed. A mismatched trading terms procedure applies when the pre-set OC maturity terms of the buyer and supplier do not match. The Member 16 seeking to set the OC's maturity term with its buyer/supplier is offered an Orbian Limited standard messaging message form trading terms message pre-completed with the relevant facts for approval and transmission to the other party. The relevant Members 16 agree off-system to their mutual maturity term(s). The buyer amends the trading terms message to the agreed terms, confirms it by the Gold Card signature procedure and transmits it as a Orbian Limited messaging message back to the other party who, in turn, likewise confirms agreement and transmits the agreed terms to Orbian Limited 10 for registering.

The Orbian system for an embodiment of the present invention provides a means of transferring value between Members 16 using OCs, and POC issuance drives the system. When a duly authorized Member 16 requires to issue a larger value of OCs than its OCs receivable, it may be permitted to issue a POC for the excess to Orbian Limited 10 as collateral, provided it is authorized and is within the set credit limit. Orbian Limited 10 is always in balance as determined by a checksum. OCs are issued by an authorized Member 16 to Orbian Limited 10. OCs are issued on behalf of a Member 16 against either OCs receivable or a POC to the credit of the payee Member's account.

Downline transfer of OC value is effected by the payer Member 16 instructing Orbian Limited 10 to issue the required OCs to the credit of the payee Members' accounts, applying the issue against the Payer's OC receivables and, if insufficient to cover the total OCs payable plus charges, an OC issued by the payer to Orbian Limited 10, if authorized, to cover the balance.

In an embodiment of the present invention, a Member 16 can have one or more OC operational accounts and, subject to authorization, one or more drawdown accounts. Both types of account can be provided through more than one Sponsor 14 and can be linked for the transfer of value in any manner authorized by the Member 16 and the relevant Sponsor 14. A value transfer procedure is called for each batch of OCs (one or more) instructed by the Member 16 for issue. The transaction is fully completed on the operational account of the issuing Member 16 before being written either direct to the operational account of the payee or, in the event of inability to effect an immediate write, then to a pro_Record_TSC_Queue for temporary custody. An initial procedure applies whether or not the value of the batch of OCs requested to be issued (including charges) exceeds the value of the OCs receivable. A basic issuance procedure applies when the value of the batch of OCs requested to be issued (including charges) does not exceed the value of the OCs receivable. The basic issuance procedure results in two lists of OCs. The OCs receivable are assigned a plus value, and the OCs payable and the Member's OC issuance charges are assigned a minus value. The selected OC s receivable, in maturity date order, are merged with the OC s instructed for issue, and the running balance is calculated record by record in Maturity_Date order.

An accelerated maturity discount procedure for an embodiment of the present invention is applied when one or more OCs payable are issued against OCs receivable and the OCs payable have maturity dates earlier than the utilized OCs receivable. This results in cash being liable (but not necessarily being required) to be paid out by Orbian Limited 10 on the maturity of the shorter dated payable(s). The procedure involves a sufficient proportion of the longer dated receivable to fund the shortfall, including discounting costs and other charges. A retro interest computation procedure is applied when one or more OCs payable are issued against OCs receivable and the OCs payable have maturity dates later than the utilized OCs receivable. This results in cash being received by Orbian Limited 10 on maturity of the shorter dated receivables and being accumulating in the Orbian Limited float pending maturity of the longer dated payables. The items comprising the batch are recompiled on the Computation_Date and an interest credit is calculated retrospectively using credit interest rate(s) based on actual rates in the relevant time period. The rates are set with a margin under the actual interest earned by Orbian Limited 10 on the float. A combined POC/OC issuance procedure applies when the value of the batch of OCs requested to be issued (including charges) exceeds the value of the OCs receivable. If the Member 16 has more than one OC account, the Member 16 can set a default sequence for OC drawdown.

In an embodiment of the present invention, charge procedures are applied, depending upon the transaction type, including issuance of OC to a Member 16 in OC mode, issuance of OC for cash (discounting), issuance of OC for FX cash, issuance of OC for FX TSC, receiving an OC, and issuance of POC (excludes CE_Fee computation). An excess OC issuance request procedure applies when a Member 16 requests the issue of OCs which in value exceed its OC receivables and either has no OC issuance authority or the drawdown facility is insufficient to cover the excess. The Member 16 is supplied with the excess OC issuance report. A Member link request procedure applies when the Member 16 restricts OC issuance on a particular account to Members 16 recorded in the tm_Terms_Buyer and tm_Terms_Supplier tables and the Member 16 requests the issuance of a OC to an unauthorized Member 16. An issuance authorization procedure applies when an OC needs to be issued to cover the issuance of a batch of OCs and automatic OC issuance is not authorized on the linked OC issuance account.

An embodiment of the present invention includes a transaction entry method. Regardless of the transaction entry method utilized, the issuance of an OC requires the provision of the data required to complete the fields defined in the pro_Record_OC_Issuer table. An issue OC method involves the issue of an instruction to Orbian Limited 10 to transfer value from one Member 16 to another by issuing an OC for a specified amount and maturity term. The instruction to issue one or more OCs can be effected by any of a number of methods, including completion of a GUI input 'bill of exchange' form (one per OC), transmission in a standard EDI format, transmission in CSV file format, faxed hardcopy form to a Sponsor 14, or telephone instruction to a Sponsor 14. Where the OC issuance instruction is derived from the Member's accounting system, a CSV file is generated as a by-product. Existing third party BACS procedures in the UK can be readily modified so as to enable a data feed direct to Orbian Limited 10 from the Member's accounting system, authorizing the issue of an OC.

An embodiment of the present invention includes a procedure to authorize payment of invoices by OC. This procedure enables a Member 16 to enter individual sales invoices and credit notes (header data and totals) into an Orbian system database for item by item OC payment approval by its Member customer 16. In this procedure, the supplier provides Orbian Limited 10 with the invoice/credit note summary details either by direct entry via a GUI or EDI standard message data feed. The purchaser views a list of invoices awaiting authorization for payment and selects for payment. Invoices comprising the payment batch are summarized by payee Member 16, and the Purchaser authorizes and transmits to Orbian Limited 10 an OC payment batch instruction.

The activity of the Sponsor 14 within the Orbian system for an embodiment of the present invention involves certain business procedures required by the Sponsor 14. In addition to its functions as a Sponsor, the Sponsor 14 is also, of necessity, a Member 16. All Members 16 are recruited and supported by a Sponsor 14. There are no Orbian Limited house accounts. The Orbian system provides for Sponsors 14 to manage the interface between Orbian Limited 10 and the Member 16, enables Sponsors 14 to offer Orbian Limited membership and, where eligible, credit enhanced drawdown account facilities to their own customers, and assists the Sponsor 14 in its task of identifying and recruiting Members 16. A Sponsor 14 may also function as any one or more of Member 16, discounter, FX trading house, and system banker 18. In addition, a Sponsor linked financial institution, acting as a Member 16, can offer to discount OCs to cash by crediting the customer's conventional cash account in its own books. The transfer of value may be by utilizing existing funds transfer systems or by the electronic linking of the customer's operational account to its regular bank account(s).

In an embodiment of the present invention, a Sponsor 14 can be recruited directly by Orbian Limited 10, becoming a Member 16 at the same time. A trading entity anywhere in the world may apply via the Internet to join Orbian Limited 10 as a Member 16. The prospective Sponsor 14 locates the Orbian Limited home page on the Internet. The Orbian Limited home page links to an invitation to apply to become a Sponsor 14. It states that approval of the application is at absolute discretion of Orbian Limited 10. The Orbian Limited Sponsor home page supplies the input to the OCss_Sponsor_Application table. The prospective Sponsor 14 is provided, for example, with electronic Sponsor application form, information/help file, recognized trading entity database for the country, set-up for trading links and terms, dial-out and upload application joining data, and a demonstrator.

Figure 7:
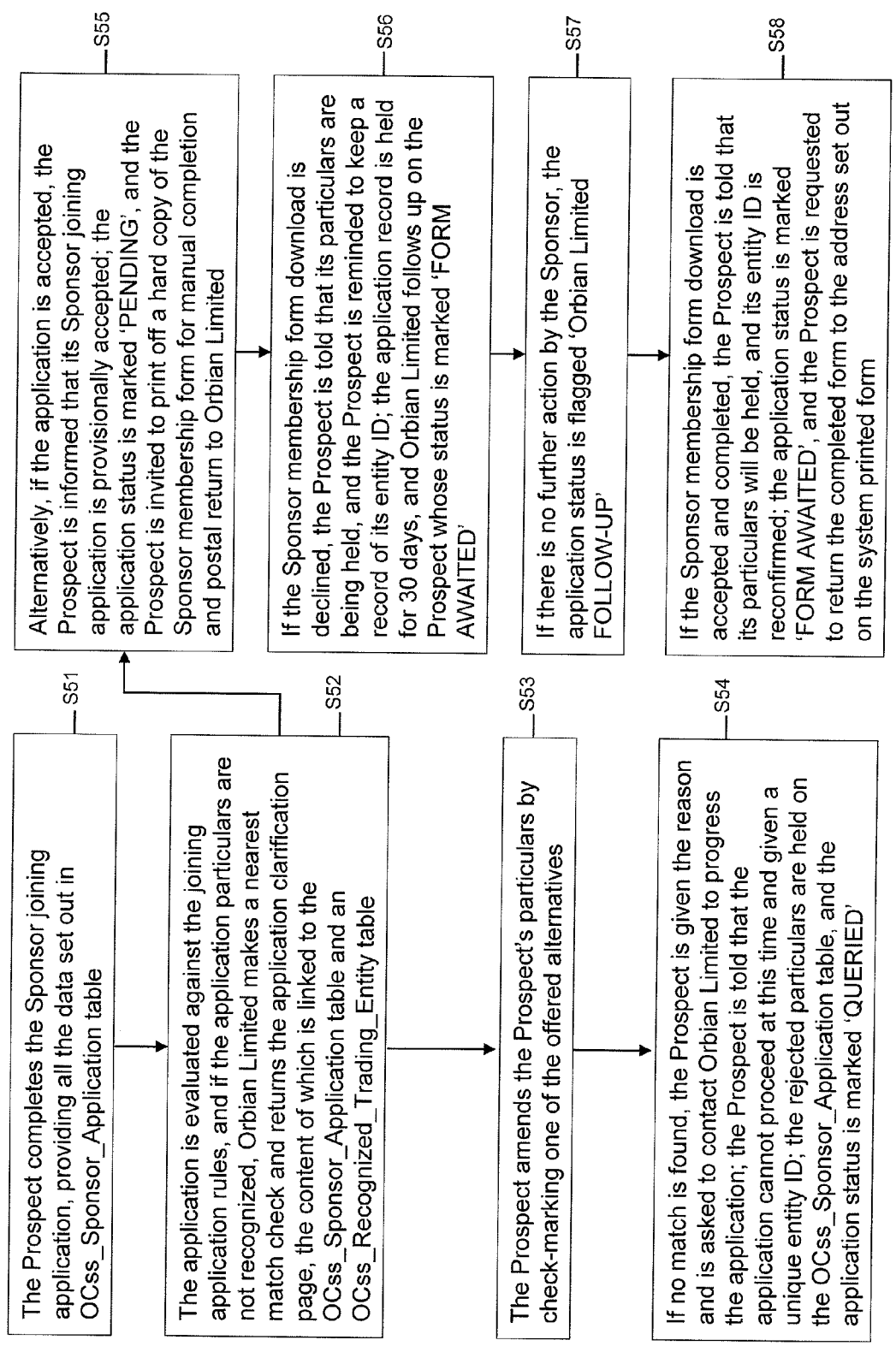
FIG. 7 is a flow chart which illustrates an example of the process of Sponsor registration for an embodiment of the present invention.

FIG. 7 is a flow chart which illustrates an example of the process of Sponsor registration for an embodiment of the present invention. At S51, the Prospect completes the Sponsor joining application for an embodiment of the present invention, providing all the data set out in the OCss_Sponsor_Application table. At S52, the application is evaluated against the joining application rules. If the application particulars are not recognized, Orbian Limited 10 makes a nearest matc check and returns the application clarification page, the content of which is linked to the OCss_Sponsor_Application table and the OCss_Recognized_Trading_Entity table. At S53, the Prospect amends the Prospect's particulars by check-marking one of the offered alternatives. At S54, if no match is found, the Prospect is given the reason and is asked to contact Orbian Limited 10 to progress the application. The Prospect is told that the application cannot proceed at this time. The Prospect is given a unique entity ID. The rejected particulars are held on the OCss_Sponsor_Application table. The application status is marked 'QUERIED'. At S55, if the application is accepted, the Prospect is informed that its Sponsor joining application is provisionally accepted. The application status is marked 'PENDING'.

The Prospect is invited to print off a hard copy of the Sponsor membership form for manual completion and postal return to Orbian Limited 10. The form requests appropriate signatures and contains Orbian Limited terms and conditions. The hard copy return is to cover requirement for handwritten signatures accepting Orbian Limited terms and conditions.

In an embodiment of the present invention, at S56, if the Sponsor membership form download is declined, the Prospect is told that its particulars are being held, and the Prospect is reminded to keep a record of its entity ID. The application record is held for 30 days. Orbian Limited 10 will follow up on the Prospect whose status is marked 'FORM AWAITED'. At S57, if there is no further action by the Sponsor 14, the application status is flagged 'Orbian Limited FOLLOW-UP'. At S58, if the Sponsor membership form download is accepted and completed, the Prospect is told that its particulars will be held, and its entity ID is reconfirmed. The application status is marked 'FORM AWAITED'. The Prospect is requested to return the completed form to the address set out on the system printed form. Rules for accepting applications to join Orbian Limited 10 as a Sponsor 14 include, for example, the prospective Sponsor 14 must satisfy non-system checks and procedures undertaken by Orbian Limited 10 to ensure that all Sponsors 14 are parties of good standing. The Prospect must be a valid trading entity. If the Prospect is not on the valid trading entity index, then Orbian Limited 10 makes a nearest match check and returns the application clarification page to the Prospect to amend its particulars by check-marking one of the recognized alternatives. If the Prospect is not recognized, the application is declined at this time and the particulars are entered into the OCss_Sponsor_Application table.

A module for an embodiment of the present invention permits Orbian Limited 10 to ascertain the current status of a Sponsor's application. It also provides an alert to Orbian Limited 10 if processing is delayed because of non-receipt by Orbian Limited 10 of a hardcopy of the application. The SA sets performance standards for processing Sponsor applications. A Member 16 may register as one or more Sponsors 14. Where the Sponsor 14 operates in association with other third party Members/Sponsors, then the multi-party Sponsor relationships are recorded in the Sponsor_Sponsor_Parties table. The primary registered party, (also known as the Managing Agent), is responsible for the conduct of the Sponsor relationship and for distributing income earned by the multi-party Sponsor 14.

A Sponsor 14 for an embodiment of the present invention can open and operate the same types of account as a Member 16 under the same procedures as a Member 16. The Sponsor 14 can also apply for permission to open a wholesale drawdown account on which a bulk facility limit is marked and which the Sponsor 14 can apportion to its client Members 16, determining its own retail price and terms to its clients. The income generated by the Sponsor 14 from the operation of its clients' accounts will be credited to one or more operational accounts as directed by the Sponsor 14. This is the same procedure as that utilized by Orbian Management Limited 20 for the collection and aggregation of its fees and charges. Access to Orbian Limited 10 by an individual Sponsor 14 is dependent upon its status as provisional, open, suspended, or closed.

In an embodiment of the present invention, all Sponsor revenue is derived as a predetermined share of the relevant charge made by Orbian Finance Limited 12 to the Members 16 who are clients of the Sponsor 14. A Member 16 may have a relationship with more than one Sponsor 14 since it can hold both drawdown accounts and operational accounts set up by more than one Sponsor 14. Income is shared by Orbian Finance Limited 12 with the Sponsor 14 from fees and charges (Sponsor share), such as POC issuance, credit enhancement fee (as commission), value related CE transaction charge, OC issuance, and OC receipt. Charges that do not provide a margin for the Sponsor 14 include, for example, FX transactions and discounting. Each fee and charge is calculated and charged to both the Member 16 and the Sponsor 14 at the same time when the transaction is processed. The charges are accumulated on the Sponsor's designated operational account(s). The Sponsor 14 can obtain a detailed drill-down into the individual fee and charge items which are held, along with the Orbian Finance Limited charges to the Member 16, in related pro_Record_OC and pro_Record_OC_Issuer and pro_Record_OC_Payee tables.

A Sponsor 14 for an embodiment of the present invention has a relationship with a particular Member 16 whom it has introduced to Orbian Limited 10. That relationship is in one of a mode in which the Sponsor 14 has authorized, in its own name, a line of credit on a drawdown account held by the Member 16 or a mode in which the Sponsor 14 has acted as a Member 16 of a Sponsor registration for another party within that Sponsor 14 to arrange a line of credit on a drawdown account held by the Member 16. In either of the above modes, the Member 16 will hold one or more operational accounts introduced by a Sponsor 14. Where the Sponsor 14 is acting in the first mode, then access to the relevant account data will mirror those of a banker to its own customer's account records. The management permissions of the Sponsor 14 vary dependent on which mode applies to the Member 16. The permission states for each Sponsor role are set out in the Sponsor_Permissions_Control table. The relationship between a Sponsor's 'wholesale' drawdown account and the 'retail' drawdown account(s) of a client Member 16 is held on the Sponsor_Sponsor_Member_Linked_Accounts table.

In an embodiment of the present invention, Sponsor 'wholesale' drawdown account control is relevant where a Sponsor 14 has a drawdown account with permission to subdivide and allocate portions of the facility to subordinate drawdown accounts held by its client Members 16. Each OC issuance on a subordinate Member's account results in a matching entry on the Sponsor's linked drawdown account. Orbian Limited 10 maintains a real time control of the limits for Sponsor's linked drawdown account and each Members drawdown account linked to the relevant Sponsor's drawdown account. The degree of access which the Sponsor 14 has to the account details of its client is dependent upon which of the above operational modes apply to that relationship. The reports can be viewed on-line or printed out using the web browser's native printing capabilities. The Member 16 can also choose to download report data in a format suitable for import into spreadsheets or other accounting software. In addition to the Member statements available to the Sponsor 14, if authorized, the Sponsor 14 can obtain Sponsor reports (if user authorized), such as summary by Member, class of Member, business activity, or income, analysis by type of charge, class of Member, region, country, transaction trends, and business trends (general and by Sponsor and Sponsor class). The Member 16 can request reports by Orbian Limited messaging to Orbian Limited fax using either standard Orbian Limited messaging message formats or ad hoc Orbian Limited messaging messages.

Orbian Management Limited 20 for an embodiment of the present invention is a separate legal entity which provides a long-term license to Orbian Limited 10 and Orbian Finance 12. Orbian Limited 10 provides for the proper management of the system and collects all fees and charges and disburses commissions and costs on behalf of Orbian Finance Limited 12.

In an embodiment of the present invention, Orbian Finance Limited 12 is responsible for setting rates and charges which are applied when OCs are issued against OCs receivable. These rates are determined in conjunction with the system bank, taking account of the interest earning potential of the float. The rates are held on the sb_Maturity_Matching_Rates table. The revenue stream is generated as a by-product of all aspects of transaction processing. Each time a transaction is effected, the Orbian Finance Limited charge to the Member 16 is credited to the accrual tables, mc_OC_Accrual and mc_TSC_Accrual. At a pre-set time each day, the accrual account is summarized by type of charge and a total entry for each type of charge is credited to the designated operational accounts. Each element of the Orbian Finance Limited income stream is allocated according to a predefined set of rules. Duly authorized Orbian Limited staff have access to the full range of reports available to all parties who are Members of Orbian Limited 10. The permissions will be set up using standard database permission procedures.

An embodiment of the present invention includes procedures for generating the standard price for FX transactions which are only effected in OCs. The process involves the issue of an OC by the Member 16 to the credit of the FX trading house's operational account. The FX aspects of the system include maintenance of currency tables and status, setting of FX rates per currency pair in both OC to FX cash and OC to FX OC modes, making and effecting OC to FX cash instructions, and making and effecting OC to FX OC instructions. Orbian Limited FX transactions are effected in the OC to FX OC and OC to FX cash modes. The available modes are held in the fx_Transaction_Type table. The OC to FX OC mode involves the issuance by a Member 16 of an OC in the originating currency to the FX trading house's operational account. The FX trading house in turn issues an FX OC to the credit of the payee's operational account maintained in the relevant currency. At its simplest level of implementation, Orbian Limited 10 permits one Member 16 to settle trade indebtedness with another Member 16 in the same currency. This mode has no FX implications or requirements.

The currencies processed by Orbian Limited 10 for an embodiment of the present invention include a wide range of currencies. Subject to Orbian Limited/FX trading house protocols, the Orbian Limited link to the FX trading house(s) permits all Members 16 to instruct an OC to FX cash transaction in any offered currency. The payee need not be a Member 16 of Orbian Limited 10 as the remittance is made in cash to its regular bank account. This option is available at the discretion of both Orbian Limited 10 and the linked FX trading house. An individual Orbian Limited core system is used for each active Orbian Limited traded currency. A Member 16 can open Orbian Limited accounts in more than one currency. An Orbian Limited transaction between any two currencies is effected by via the FX trading house. The linked FX services provided by the FX trading house for Orbian Limited 10 in one aspect include conventional FX trading house services and Orbian Limited automated services. The conventional FX trading house services include, for example, GBP OC to the FX trading house for FX cash in any currency in which it currently deals, USD OC to the FX trading house for FX cash in any currency in which it currently deals, and Euro OC to the FX trading house for FX cash in any currency in which it currently deals. The Orbian Limited automated services include, for example, GBP OC to the FX trading house for conversion into a USD/Euro OC to be credited to the payee's USD/Euro operational account, USD OC to the FX trading house for conversion into GBP/Euro OC, and Euro OC to the FX trading house for conversion into GBP/USD OC.

The currency pairs processed in an aspect of an embodiment of the present invention in the OC to FX OC mode include, for example, GBP to USD, GBP to Euro, USD to GBP, USD to Euro, Euro to GBP, and Euro to USD, and other currencies can be added. Such addition does not require any additional systems or procedures other than the activating of authorized currency pairs and the issuing of FX rates. The currency pairs processed in the aspect in the OC to FX Cash mode are any of the currencies currently dealt in by the FX trading house as the activation of a particular currency does not impact on these procedures. The active currencies and their relevant transaction modes are set out in the fx_Active_Currency_Pair table.

In an embodiment of the present invention, the issuance of an OC, in either the OC to FX OC mode or the OC to FX cash mode results in the making of one or both of charges for OC issuance value related fee and OC issuance transaction charge. These charges are raised by the standard OC issuance procedure, because an FX deal will not always be effected via the FX trading house. Where the FX transaction is effected through the FX trading house, the transaction charge and spread are marked up by Orbian Finance Limited 12. The FX trading house provides an executable foreign exchange rate for various combinations of currency pair and tenor in this mode. The FX pricing model is derived from the FX trading house system.

In one aspect of an embodiment of the present invention, the FX trading house provides the only linked FX service. A Member 16 not wishing to use the service contracts with another FX trading house who is also a Member 16 with whom the FX deal is made and to whom the Member 16 issues an OC in settlement. The basic FX currency rates and transaction charges charged by FX trading house to Orbian Management Limited 20 are marked-up before communication and charge to the Member 16. The rate and price adjustments are held on the Member's relevant ac_Master OC_Account table. The fields are FX_Spread Adjustment Buy, FX_Spread_Adjustment_Sell, and Currency Adjustment An OC to FX OC procedure for an embodiment of the present invention applies when a Member 16 effects an FX settlement in any currency pair by instructing the issue of an FX OC, for example, issuing an OC expressed in GBP to the FX trading house which in turn issues a matching FX OC in USD to the counterparty's USD operational account. This procedure can be set to be completed without prior approval of the FX rate or with the option set for the Member 16 to approve the offered rate before commitment. This procedure can be set up for any Orbian Limited active currency pair. Subject to commercial considerations, an FX transaction results in the making of either one or both of a value related fee and a transaction charge.

In an embodiment of the present invention, a number of Orbian Limited Members 16 are likely to require sample rates from a number of competitive banks/sources to accompany each FX trade. To comply, Orbian Limited 10 receives a feed of indicative prices from a feed, such as Reuters or Bloomberg Select. The feed consists of interbank spot rates, their contributing bank and the time of the quote. The compliance rates are always the spot interbank prices since it is not possible to determine the mark-up applied by the contributing banks. Compliance is achieved by presenting the indicative spot rates with the underlying spot rate for the Member 16. If the transaction is for a cross currency for which there is no compliance rate, no compliance rate is quoted.

The foregoing rate compliance for an embodiment of the present invention is the post-trade form of rate compliance, because the indicative rates are applied to the transaction after the trade has been agreed, and the indicative rates are not part of the consideration to execute the transaction. Orbian Limited 10 maintains a list of a number of compliance updates for each currency pair. This is held within an array within each element of the fx_Rate table. The fx_Currency_Pairs table determines the number of compliance rates stored. Only the spot rates are recorded to save space on the database. The Orbian Limited SA, in conjunction with the system administrator of the FX trading house, maintains the permitted fx_Settlement_Control table. The reports appropriate to the FX trading house are part of the external linked system since Orbian Limited 10 is regarded by that system as one large account.

In an embodiment of the present invention, in addition to its functions as system banker, the system banker 18 is also, of necessity, a Member 16. The system banker 18 provides for cash management instructions from Orbian Limited 10 to the system banker 18 in the modes of collecting amounts due on maturing POCs from the relevant Member 16 on or before the maturity date, paying amounts due on matured OCs on or immediately after the maturity date, and in conjunction with Orbian Finance Limited 12, managing the float, and setting OC maturity matching interest rates so as to yield a net income on the float for both Members 16 and Orbian Limited/Orbian Finance Limited 12. The function of the system banker 18 is to provide linked banking services to Orbian Limited 10 in such a manner as to reduce to the absolute minimum instruction communication risks. The system banker 18 can open and operate the same types of account as a Member 16. The income generated by the system banker 18 from the Orbian Limited operation is credited to one or more of its operational accounts as directed by the system banker 18. This is the same procedure as that utilized by Orbian Finance Limited 12 for the collection and aggregation of its fees and charges.

In an embodiment of the present invention, when a POC record is raised, a settlement date is determined taking account of Transmission_Method_ID from the relevant ac_Master_POC_Account, standard collection delay for the transmission method set in the OCss_Transaction_Delay table, and bank holidays from the OCss_Bank_Holidays table. The settlement date is determined as the Maturity Date less the settlement day. If the settlement thus calculated falls on a non-banking day, the next previous banking day is the settlement day. In the event that collection cannot be effected by the system banker 18 on or before the Maturity Date of the POC, a call (default collection) is to be made by the system banker 18 on the cash liquidity account maintained by Orbian Finance Limited 12 with the system banker 18. It is the responsibility of Orbian Finance Limited 12, to maintain systems for the recovery of the default call from the Facility_Issuer identified on the relevant ac_Master_POC_Account.

In accordance with the above rules for an embodiment of the present invention, when a POC falls due for initiation of collection, it is copied to the sb_Record_POC_Collect table. In the event of a default collection, Orbian Finance Limited 12 and the relevant Sponsor 14 are notified who shall decide whether to suspend or close the relevant Member's drawdown account(s) depending on the type of drawdown account. On confirmation by the system banker 18 of collection from the Member 16, the Type_Fate_POC field in the sb_Record_OC_Collect table is marked 'COLLECTED', which initiates a procedure in which the relevant POC record field Type_Fate_POC is marked as 'COLLECTED' in the pro_Record_POC table, the collection details and amount is credited in the pro_POC_Collected table, the collected amount is debited to the designated Orbian Finance Limited float cash account, and the appropriate POC record in the pro_Record_POC table is transferred to the OCss_Dead_POC table.

In an embodiment of the present invention, when an OC record is raised, a settlement date is determined taking account of Transmission_Method_ID from the relevant ac_Master_OC_Account and bank holidays from the OCss_Bank_Holidays table. The settlement date is the Maturity Date. If the settlement date falls on a non-banking day, the next banking day is the settlement day. On confirmation by the system banker 18 of payment to the Member 16, the Type_Fate-OC field in the sb_Record_OC_Payee table is marked 'CASH PAID', which initiates a procedure in which the relevant OC record field Type_Fate-OC in the pro_Record_OC_Payee table is marked as 'CASH PAID', the payment details and amount are debited in the pro_OC_Paid table, the paid out amount is credited to the designated Orbian Finance Limited float cash account, and the appropriate OC record in the pro_Record OC_Payee table is transferred to the OCss_Dead OC table.

In addition to the conventional Member reports to which the system banker 18 for an embodiment of the present invention is entitled, it also has access to reports based on the sb_Record_POC_Collect and sb_Record_OC_Pay tables. The system banker 18 can request reports by Orbian Limited messaging to Orbian Limited fax using either standard Orbian Limited messaging message formats or ad hoc Orbian Limited messaging messages, and they can be delivered by Orbian Limited/Sponsor by other means such as browser.

An embodiment of the present invention makes use of a number of EDI message formats. A Member communication header EDI message contains the identity of the Member 16 and the type of transaction/message. The incoming message header also contains relevant security information. The header is used in communications to and from the Member 16. An OC issuance request EDI message contains the initial input to the pro_Record_OC_Issuer table. On receipt, each OC issuance request is allocated a unique ID by Orbian Limited 10. An OC issuance Confirmation EDI message confirms acceptance of the Orbian Limited issuance instruction and gives the unique Orbian Limited ID. An OC issuance refusal EDI message notifies refusal of an OC issuance request, giving the original particulars and a standard Orbian Limited message. A POC issuance confirmation EDI message notifies the issue of a POC and gives the unique POC ID. An OC remittance advice EDI message is communicated to the Member payee 16 to confirm that an OC has been issued to the credit of its operational account.

An important aspect for an embodiment of the present invention makes use of an alternative value proposition algorithm, which provides a different way of performing the calculations that are required in the creation and transfer of value of OCs. In this aspect, in performing the calculations, instead of dealing with the selection process based on the maturity date of instruments, the use case deals with a more concise net present value calculation. In such aspect, there is some selection in determining whether a transaction involves the shortening or extension of a maturity date of an instrument, but the calculation is essentially a net present value formula that is applied. This aspect deals primarily with how the actual calculations of the value transfers and creation occurs. Otherwise, the underlying concept is the same.

An embodiment of the present invention includes an enterprise consisting of the three operational entities, Orbian Management Limited 20, Orbian Limited 10, and Orbian Finance Limited 12. Buyers or suppliers who are Members 16 of Orbian Limited 10 enjoy substantial benefits, such as a new source of business finance at dramatically lower cost, an improved liquidity for both buyers and suppliers, an increased certainty for suppliers of timing and amount of payment, reduced back-office costs of reconciling and collecting payments, and avoidance or reduction of the use of higher cost cash-based financing. The Sponsors 14, who are approved distributors of Orbian Limited services, in addition to enjoying Member 16 benefits, also benefit from income derived from the use of the system by their client Members 16, income from providing a line of credit to Members 16, and cross-selling their own services. The enterprise acts as a conduit to settle business-to-business commercial transactions electronically. Referring again to FIG. 2, as soon as the Member-buyer 22 approves payment of an underlying commercial transaction, it requests Orbian Limited 10 (acting as agent for Orbian Finance Limited 12) to issue an OC in favor of the Member-supplier 24 with a maturity date later than the normal cash settlement date. The Member-supplier 24 then receives an investment grade rated, electronic undertaking by Orbian Finance Limited 12 which it can use to settle its own obligations to suppliers by issuing back-to-back OCs, to discount all or part for cash, at near investment grade rates (regardless of its own credit standing), at any time prior to its maturity date, or to hold to maturity and receive cash.

The Member 16 for an embodiment of the present invention can be both a buyer and a supplier and joins Orbian Limited 10 through a Sponsor 14. Orbian Limited 10 provides all support services and technology to Members. Member-buyers 22 issuing OCs against a line of credit ("Obligors") irrevocably and unconditionally undertake to remit cash to Orbian Limited 10 (acting as agent for Orbian Finance Limited 12) on the Maturity Date. Orbian Finance Limited 12 provides credit enhancement for investment grade Obligors raising their commitments to investment grade. It also offers discounting to all Members 16 wishing to discount OCs to cash. Members 16 that are not investment grade or are unrated can be sponsored by an investment grade Obligor. In a typical cash based trade transaction, one party as the buyer purchases goods or services and commits to play the counter-party as the supplier, for example, in 30 days. However, actual payment may not occur until 15 or more days after the due date, forcing the supplier to fund its receivables for 45 days through factors or other channels. Typical terms of factoring may only advance approximately 80% of the receivable at a cost, for example, of Libor two to four percent. This environment creates an opportunity to use advanced technology and structured finance techniques to provide a more efficient settlement process, particularly when the buyer has an investment grade rating.

The business proposition for an embodiment of the present invention is both simple and elegant. As an alternative to traditional cash settlements, a Member-buyer 22 issues a payable to the system 10 and the system 10 issues an offsetting payable to the Member-supplier 24. The Member-buyer 22 settles the claim over a longer term and the Member-supplier 24 is permitted to liquidate its claim on more favorable terms or divide assign it to others. By using the system, both buyers and suppliers gain improved liquidity and access to lower cost funding. The Orbian system is economically viable because it reverses the current anomalous environment in which weaker suppliers finance stronger buyers. It is operationally and commercially feasible because new technologies make the efficient intermediation of a large number of small transactions possible. This alternative settlement process grows and is disseminated by utilizing the distribution strength of many financial institutions as Sponsors 14 who are incented to offer the system to their clients, the Member-buyers 22 and Member-suppliers 24.

The Orbian system for an embodiment of the present invention is developed and managed through the three operational entities, Orbian Management Limited 20, Orbian Finance Limited 12, and Orbian Limited 10. The roles of these entities are carefully designed and coordinated to provide the intended benefits to Sponsors 14 and Members 16 while optimizing tax, regulatory and market exposures. Orbian Management 20 is an entity that develops the operating strategy and technology, systems capabilities and operating infrastructure for the Orbian settlement system. Orbian Limited 10 is an entity whose primary mission is to promote widespread adoption of the settlement system for commercial transactions. Orbian Limited 10 recruits Sponsors 14 and Members 16 into the settlement system and provides Member support services, including acting as the Members' agent and custodian for their transactions with Orbian Finance Limited 12.

Orbian Limited 10 for an embodiment of the present invention has two classes of membership, including Sponsors 14 and Members 16. Sponsors 14 are financial institutions and other organizations who introduce Members 16 to the Orbian system. Subject to Orbian Finance Limited authorization, investment grade Sponsors 14 guarantee lines of credit to their non-investment grade client Members 16 to enable those clients to settle transactions through Orbian Limited 10. Members 16 are buyers and suppliers that meet standards defined by Orbian Limited 10 and unconditionally and irrevocably agree to settle specified underlying transactions through Orbian Limited 10. Orbian Finance Limited 12 is a special purpose vehicle which intermediates and settles transactions between Members 16 by accepting Primary OCs (also referred to herein as "POCs") from buyers and issuing offsetting OCs to suppliers. A POC is an unconditional financial obligation by a buyer to pay a defined principal on a specified date ("Maturity Date") to Orbian Finance Limited 12 in final settlement of the buyer's debt to the supplier. POCs are the primary assets of Orbian Finance Limited 12 and each is exactly matched by an offsetting OC(s) (plus fees and charges) issued by Orbian Finance Limited 12 to the supplier(s) in the underlying transaction.

An OC for an embodiment of the present invention is an unconditional and irrevocable financial obligation issued by Orbian Finance Limited 12 to pay a defined principal on a specified Maturity Date to the supplier, in final settlement of an underlying transaction. OCs are liabilities of Orbian Finance Limited 12. To enhance market acceptance of OCs, Orbian Finance Limited 12 permits OC holders to discount or assign their OCs in whole or part at any time. The underlying transaction is a commercial transaction between any two Members 16, both of whom voluntarily, unconditionally and irrevocably agree to settle the transaction through Orbian Limited 10. Such settlement is accomplished either by the buyer's issuance of a POC to Orbian Finance Limited 12 and Orbian Finance Limited's offsetting issuance of a OC to the supplier or through the assignment of OC value from the buyer to the supplier. Orbian Limited 10, Orbian Management 20 and Orbian Finance Limited 12 act as the buyer's agent in executing the issuance orders, but none of them intermediate disputes between the buyer and the supplier. Disputes do not invalidate, accelerate or defer the terms of a POC or an OC.

Commercial trading transactions between two parties are generally subject to uncertainty over settlement of indebtedness. Trading inefficiencies and delayed payment of invoices are an endemic global problem. For example, UK settlement periods tend to be 50 to 60 days, and the problem appears to be even worse in Europe. A supplier's cash flow problem may be interpreted as efficient cash management by the buyer. Often it is large companies who are able to delay payment to their smaller suppliers, thus exacerbating the problem and, as a corollary, raising the cost of Small to Medium Enterprise ("SME") finance even further. Attempts by governments, for example, in Britain and across Europe, to attack the issue through legislation, which mainly involves the right of suppliers to charge interest on overdue debt, appear to be ineffectual in practice.

While buyers want to maximize credit terms, suppliers need cash from sales as soon as possible. The Orbian system for an embodiment of the present invention reconciles these conflicting demands. Buyers typically require payment of suppliers as late as possible while maintaining continuity of supply, elimination of governmental and supplier pressure to pay earlier, access to lower cost business finance, simple and safe payment procedures, and more efficient foreign exchange settlement services, and minimal change to existing accounting and control systems. Suppliers, in addition to sharing the same requirements as their customers, require early and certain payment without discounts, elimination of risk of upsetting customers when chasing payment or demanding statutory interest, reduced cost of trade credit insurance, reduced cash requirement for working capital, reduced credit control costs and risks, and the ability to pay their own suppliers as late as possible.

One of the results of such trading inefficiencies has been the growth of the factoring and invoice discounting industries. It is said that in Britain alone, factoring has grown to become a GBP 50 billion per annum business, growing at around 20 percent per annum over the last five years. Even so, this represents less than one percent all UK commercial purchases. In most countries, the largest single purchasing agency is the Government and other public sector bodies. In the UK, it is estimated that the public sector expenditure on the equivalent of trade and capital expenditure purchases exceeds GBP 200 billion per year. By adopting the Orbian system for an embodiment of the present invention as a means of payment, the public sector can obtain a further deferral of the cash funding of purchases amounting to at least one and subsequently at least three months additional credit while greatly improving the liquidity of the suppliers. This will reduce the cash-finding requirement for public sector expenditure by between GBP 16 billion and 50 billion with marked social and economic benefits. While the Orbian system presents a significant immediate benefit for corporations, it is also of immense advantage to the public sector.

The Orbian system for an embodiment of the present invention provides a new source of business finance at dramatically lower cost, improves liquidity for both buyers and suppliers throughout the supply chain, reduces back office cost of reconciling and collecting payments, and substantially solves the late payment problem. Electronic commerce is already transforming business processes, but the missing link is integrated financing and settlement. This gap is efficiently filled by the Orbian system, which provides a strong financial reason for businesses of all sizes to join the world of electronic commerce. The Orbian system provides an alternative method of effecting value transfer between buyers and suppliers. It has applications in the commercial, industrial, retail, financial, consumer and public sectors.

In an embodiment of the present invention, in negotiation through their Sponsor 14, Members 16 of sufficient credit standing (investment grade) may obtain a line of credit with Orbian Finance Limited 12 via Orbian Limited 10, priced at the cost of covering their default risk and not at the cost of money. The cost of default cover ("Credit Enhancement") for investment grade corporations is likely to range from approximately two tenths percent to one percent per annum. This substantially undercuts borrowing rates available to participating Members 16 in the present cash based market. Some investment grade Sponsors 14 will negotiate a 'wholesale' line of credit which they will subdivide and make available to their own client Members 16 on a 'retail' basis through Orbian Limited 10. This enables non-investment grade and unrated companies of all sizes to obtain lines of OC credit on attractive terms. The cost of the combined default cover on these facilities to non-investment grade and unrated Members 16 is likely to range from approximately five tenths percent to four percent per annum.

In an embodiment of the present invention, the buyer gains additional liquidity through delaying or avoiding cash settlement of trade debt by issuing OCs against a line of credit on a pre-approved drawdown account. The Member-buyer 22 commits to pay cash to Orbian Limited 10 in settlement of these OCs on a maturity date later than the date on which conventional cash settlement would have been made. Alternatively, the Member-buyer 22 can utilize its own OCs receivable to settle with its suppliers on a back-to-back basis, issuing OCs against the collateral of surrendered OC receivable value. As soon as the Member-buyer 22 approves payment, the Member-supplier 24 gains immediate liquidity, because instead of waiting for delayed cash, it receives a transferable, divisible investment grade rated OC in settlement of sales invoice(s). The Orbian system thus ensures greater certainty of the value and timing of trade settlement. The Orbian system solves the late payment problem by providing the Member-supplier 24 access to the liquid value of its sales ledger at a much earlier date while allowing the buyer to defer cash settlement. The Orbian system can be seamlessly integrated with the accounting and invoice approval systems of Members 16, substantially reducing the back-office costs of both buyers and suppliers in reconciling accounts payable and receivable and obtaining payment.

Members 16 may join the Orbian system for an embodiment of the present invention only through an approved Sponsor 14. Sponsors 14 include, for example, banks, EDI vendors, trade credit insurers and brokers, trade associations, telecoms companies and others registered either singly or in association with still others under approved Orbian system terms and conditions. Selected Sponsors 14 can also be licensed to directly recruit a secondary tier of Sponsors 14. A Member 16 can open Orbian Limited accounts with more than one Sponsor 14. Sponsors 14 set end-user pricing and provide the sales, support and financial resources their customers need. An approved Sponsor 14 arranges, in conjunction with Orbian Finance Limited 12, OC line of credit facilities, unless it wants to assume the credit risk itself.

Sponsors 14 also provide direct or indirect Member 16 support and connectivity, and a minimum number of potential Members 16 from an existing customer base. They must also be of proven integrity and probity. Sponsors 14 undergo a strict selection process to ensure that they can provide an appropriate level of service to Members 16.

In an embodiment of the present invention, the income streams generated by Member activity are shared in such a way with the relevant Sponsor 14 that the Sponsor 14 is provided with a strong incentive and on-going reward for its efforts. In exchange for the income share, the Sponsor 14 is required to provide a range of negotiated services to its Members 16 under its contract terms with Orbian Limited 10, which will be in accordance with agreed performance standards. Sponsor contract terms are individually negotiated by Orbian Limited 10 but are based on generally applicable contract terms. It is up to each Sponsor 14 to determine its operational strategy, including how it intends to recruit Members 16 and which Members 16 it wants to target. The Sponsor 14 also decides the margin by which to mark up Orbian Finance Limited base prices. The combination of products, skills and services offered by the Sponsor 14 to Members 16 is again a matter for Sponsor decision subject to Orbian system performance standards and brand use control. Sponsors 14 can compete to attract Members 16 in the same way as banks compete for customers.

A strategic objective of electronic commerce is to extend market reach throughout the supply chain. Historically, electronic data interchange ("EDI") has been the preserve of larger companies who have often put pressure on their suppliers to connect. The Orbian system for an embodiment of the present invention offers compelling benefits that will persuade businesses of all sizes to use electronic commerce. A key feature of the Orbian system is that the same structure of benefits is available to all Members 16, regardless of size. The Orbian system is a new financial product with a supporting infrastructure that can deliver levels of automation and service unparalleled in the financial markets today. The Orbian processes and systems are designed to allow full customer control and execution ownership, together with a level of self-service supporting a level of efficiency that is reflected in the whole product proposition. The Orbian system includes a custom designed, purpose built application based on the widely used R/3 system. The Orbian system is engineered for high value transaction processing and fully distributed, exhibiting the robust, industrial strength of its parent system. The system is configured on high specification, industry standard platforms to deliver a 24×7, fully resilient and seamless failover capability.

Figure 8:
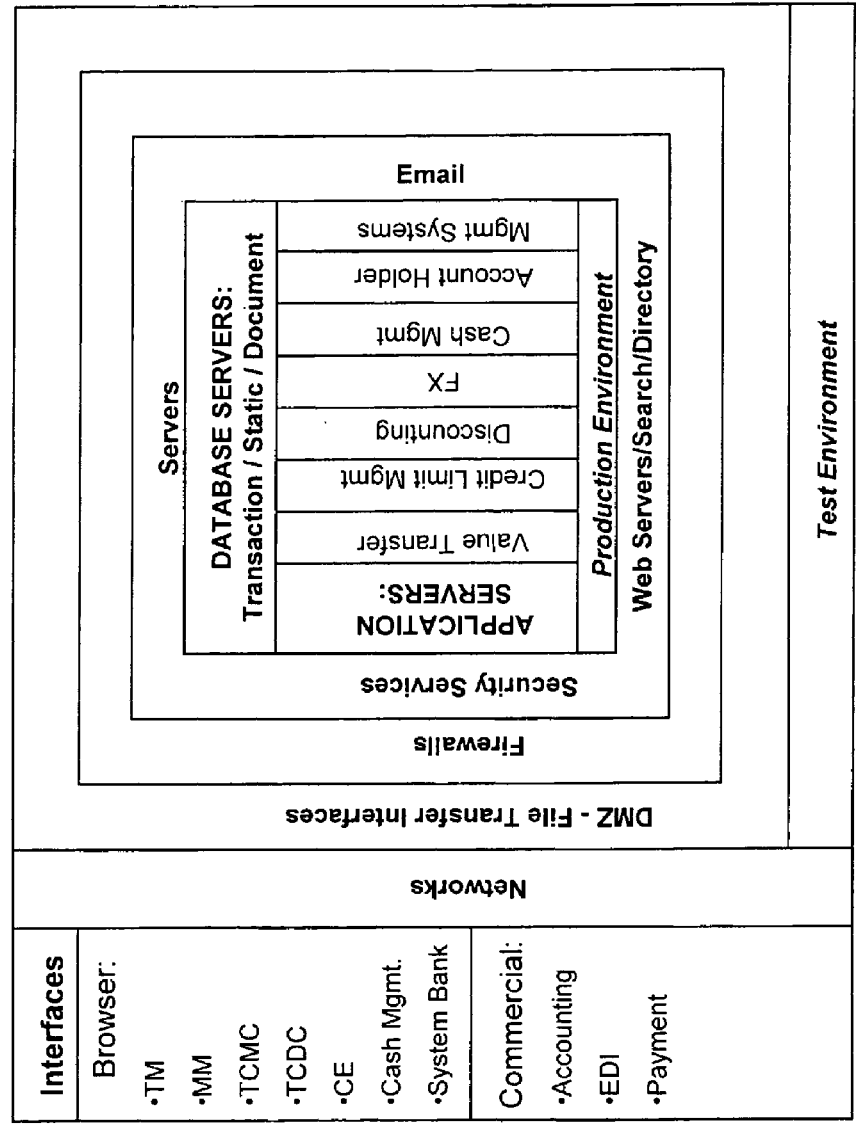
FIG. 8 is a schematic diagram which illustrates an example of the logical architecture for the Orbian system for an embodiment of the present invention.
Figure 9:
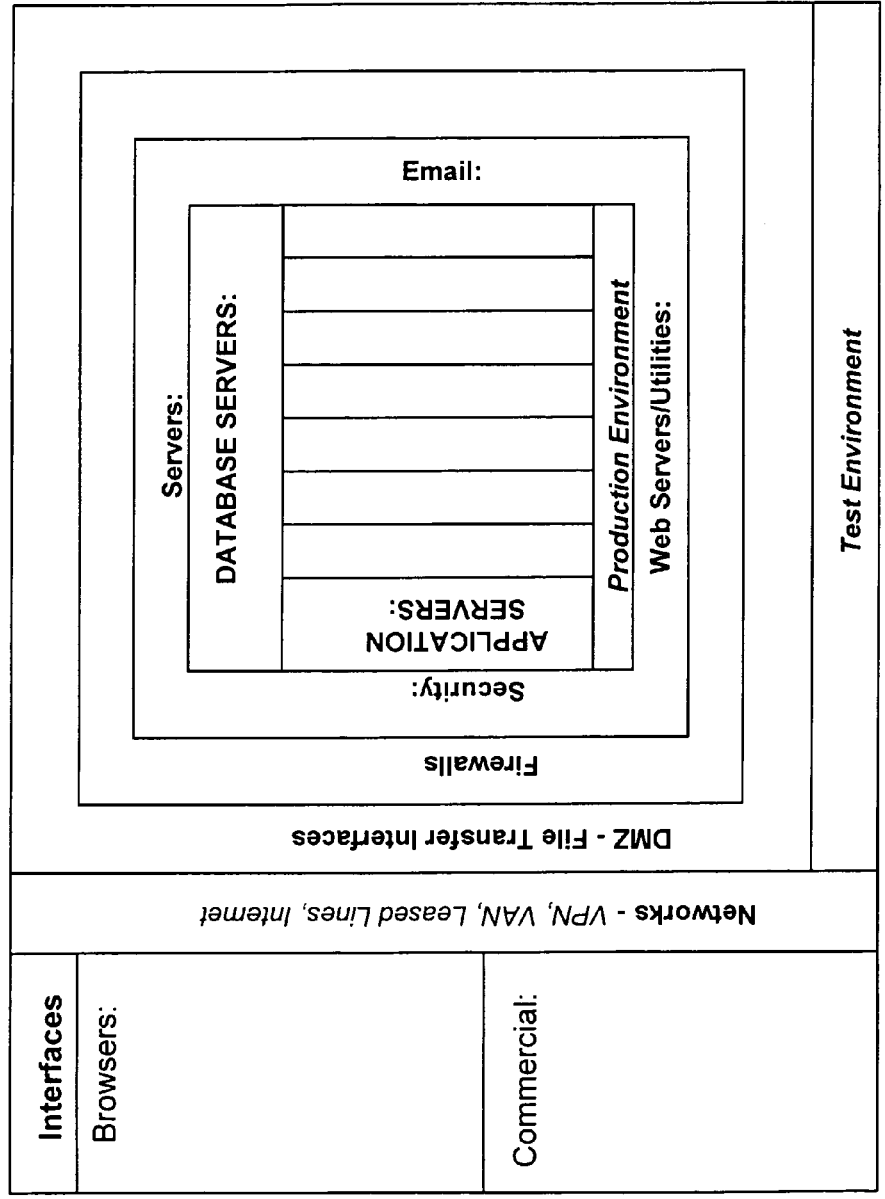
FIG. 9 is a schematic diagram with illustrates an example of the technical architecture for the Orbian system for an embodiment of the present invention.

FIG. 8 is a schematic diagram which illustrates an example of the logical architecture for the Orbian system for an embodiment of the present invention. FIG. 9 is a schematic diagram with illustrates an example of the technical architecture for the Orbian system for an embodiment of the present invention. The security of the Orbian system for an embodiment of the present invention employs the latest smartcard-based authentication package. This easy to use, fully Public Key Encryption (PKI) compliant, strong encryption solution delivers the flexibility of software-only solutions with the advanced security of smartcard technology. The Orbian system security meets the most stringent financial services security standards. The Orbian system includes a three-tier system architecture which is highly scaleable with Java-enabled multi-channel access capability, such as Internet, mobile phone, and the like. Member access to the transaction application for an embodiment of the present invention is from a Member web site through the public web site. The Orbian system utilizes high capacity web servers which are also run on high specification industry standard platforms with seamless transparent failover and have multiple, fully redundant links to the World Wide Web. The Orbian system includes standard messages that enable mass transmission via VAN connectivity, as well as third party software providers to integrate the functionality into major ERP and accounting systems and develop bespoke access software.

An embodiment of the present invention makes use, for example, a facilities manager, SAP R/3 as the basis for the core software engine, DB2 as the Database solution, Brokat's Twister environment as the middleware solution, SUN servers for the hardware solution, Technophobia for the web front-end design in HTML format for the secure site, Active for the security devices, and software integration to allow "call-me" functions and web collaboration. The Orbian system includes a contact (call) center and an operations unit to implement all the non-automated processes that are required for operation. The contact center is specifically focused on customers and serving their immediate needs. These include processes that can be readily described and are dealt with by a specialist group and out-sourced to an appropriate service provider. Operations have responsibility for processes required by the business but are transparent to the customer. These include, reconciliation, interfaces, for example, to Orbian Finance Limited 12 and the system bank, ensuring internal value integrity and providing a further level of support and investigation not provided by the contact center.

In terms of management for an embodiment of the present invention, a process centric structure is preferable to a functional management structure. This means that there is a single responsibility, for example, for inquiries and complaints which has authority across the providers of the service, including contact center, operations and technology. This ensures that the customer perceives a transparent service across functional and out-sourced areas. The Orbian system is designed as a highly automated web-based business, and the support offered to customers and internal processes is automated. For example, Orbian system customers are encouraged to use web based 'self-help' education and diagnostic tools before calling the contact center. The Orbian system contact center also provides a service to the marketing team to field all queries from potential new customers. Interfaces link to chosen fulfillment house(s) for marketing literature and other items, such as security devices.

The mere insertion of Orbian Finance Limited 12 for an embodiment of the present invention into an underlying transaction does not add value to either the Member-buyer 22 or the Member-supplier 24. However, the terms of the transaction and Orbian Finance Limited's flexibility create substantial value for both parties. The Member-buyer 22 benefits from this structure by extending trade credit maturities at a cost below alternative sources. Moreover, by using the Orbian system, rather than traditional processes, the Member-buyer 22 can preserve its bank lines and CP issuance capacity for other purposes. For the Member-supplier 24, a number of major advantages accrue in accepting an OC rather than awaiting conventional cash settlement. The Member-supplier 24 accepts credit exposure to a bankruptcy-remote vehicle rather than its Member-buyer 22, thereby diversifying and reducing its credit risk. The Member-supplier 24 obtains improved liquidity at relatively low cost by accelerating receipt of its sales income. The Member-supplier 24 as well as the Member-buyer 22 realize significant back office cost reductions, and the Member-supplier 24 gains a range of options for disposition of the OC:

In an embodiment of the present invention, the Members 16 can hold the OC until maturity, albeit an unlikely option. Alternatively, the Members 16 holding the OC can discount it with Orbian Finance Limited 12, which commits to purchase any OC amount at any time without recourse to the Member 16. Thus, by transacting with Orbian Limited 10 and Orbian Finance Limited 12, a Member 16 can instantly liquidate up to 100% of its OC holdings at lower all-in costs with no residual credit exposure. In contrast, factors might only advance 80% against a trade receivable, often with recourse to the supplier, and apply substantially higher discount rates. Another alternative for the Member 16 is that since OC value is fully transferable, Members 16 may assign the OCs they hold (in whole or part) to other Orbian Limited Members to settle their obligations. The transfer can be for any term, and the transferee Member then has the same options to hold, discount or transfer the OC value that the Member 16 receives. Members whose transfers extend the term of their OC value share in Orbian Finance Limited's earnings on such extensions, while Members whose transfers shorten the term of their OC value pay Orbian Finance Limited 12 the equivalent of a discounting charge. With these attributes, OCs are a highly efficient and attractive alternative unit of value among Members of Orbian Limited 10.

The transaction intermediation process of the system for an embodiment of the present invention begins when a Sponsor 14 recruits its clients to membership in Orbian Limited 10. While its objective is to promote the growth of the system for commercial transactions, Orbian Limited 10 only recruits Members 16 through duly appointed Sponsors 14. Orbian Limited 10 enters into a long term contract with Orbian Management 20 for the administration of Orbian Limited's daily operations. Orbian Limited 10 has a limited balance sheet comprising only operating assets and liabilities and the rights to act as the primary franchising agent for the system. After Membership is established with Orbian Limited 10, Orbian Finance Limited 12 establishes a credit or drawdown line for investment grade buyers. Member-buyers 22 can then settle underlying transactions by issuing POCs to Orbian Finance Limited 12 against that line, and Orbian Finance Limited 12 issues offsetting OCs to Member-suppliers 24. Member-suppliers 24 can then choose to hold, discount or transfer the OC. Orbian Finance Limited 12 is independently owned and is managed in a way that does not create a consolidation risk for any owner of Orbian Management or Orbian Limited 10.

In an embodiment of the present invention, Orbian Finance Limited 12 has several primary functions, including providing a balance sheet that holds the POCs and OCs originated by and issued to Orbian Limited Members 16, making trade settlements more efficient by providing credit enhancement and a bridge to the broader commercial paper and securities markets, making OCs liquid by providing an OC discounting service at a defined spread to a benchmark market, making OCs liquid by providing an OC discounting service at a defined spread to a benchmark market rate such as LIBOR or commercial paper, and permitting the transfer of OC value from Member to Member as an alternative settlement process.

Orbian Finance Limited 12 for an embodiment of the present invention is a special purpose vehicle similar to many existing "conduit" programs that purchase short-term receivables and fund them through a tiered liability structure. A major difference between Orbian Finance Limited 12 and other conduit programs is that its average asset is far smaller, which means that Orbian Finance Limited 12 has far more transactions flowing through Orbian Finance Limited 12, with sophisticated and highly automated transaction and risk management systems. Typically, Orbian Finance Limited 12 has several billions of U.S. dollars of steady state outstandings with an average original term of 60 days. Its assets consist of POCs and cash equivalents that Orbian Finance Limited 12 holds to protect its liquidity. Cash holdings vary with CP issuance and maturities. Liabilities include commercial paper, term debt, subordinated debt and a small amount of equity. To gain market acceptance, Orbian Finance Limited 12 is structured such that its commercial paper is rated investment grade by Standard and, Poor's and Moody's, respectively. This is effected by using securitization techniques, maintaining broad asset diversification, securing sufficient liquidity and issuing sufficient "first loss" subordinated debt. Orbian Finance Limited 12 also retains some earnings in reserves. Orbian Finance Limited's small transaction size prevents match funding at the transaction level. Instead, funding is done in aggregate, resulting in the residual maturity and interest rate mismatches. This likely requires additional subordination in order to secure the desired debt ratings.

In an embodiment of the present invention, both Orbian Limited 10 and Orbian Finance Limited 12 rely on a network of professional service providers to effect their responsibilities. Orbian Limited 10 utilizes Sponsors 14 such as banks, financial firms and others, such as trade associations, and IT companies, to recruit Members 16, who settle transactions through Orbian Limited 10 and Orbian Finance Limited 12. Most of Orbian Limited's day-to-day activities is managed by Orbian Management 20. Orbian Finance Limited 12 is a special purpose entity that delegates various functions to third parties. Most important among these are Orbian Limited 10, which recruits Sponsors 14 and Members 16, and Orbian Management 20, which provides systems and technology support. Orbian Finance Limited 12 also contracts for the management of its treasury, credit and market risk management processes with a firm or firms with expertise in the management of special purpose vehicles. Finally, Orbian Finance Limited 12 also contracts with commercial paper dealers and investment banks for the distribution of its notes and securities and with commercial banks for liquidity backstops.

Figure 10:
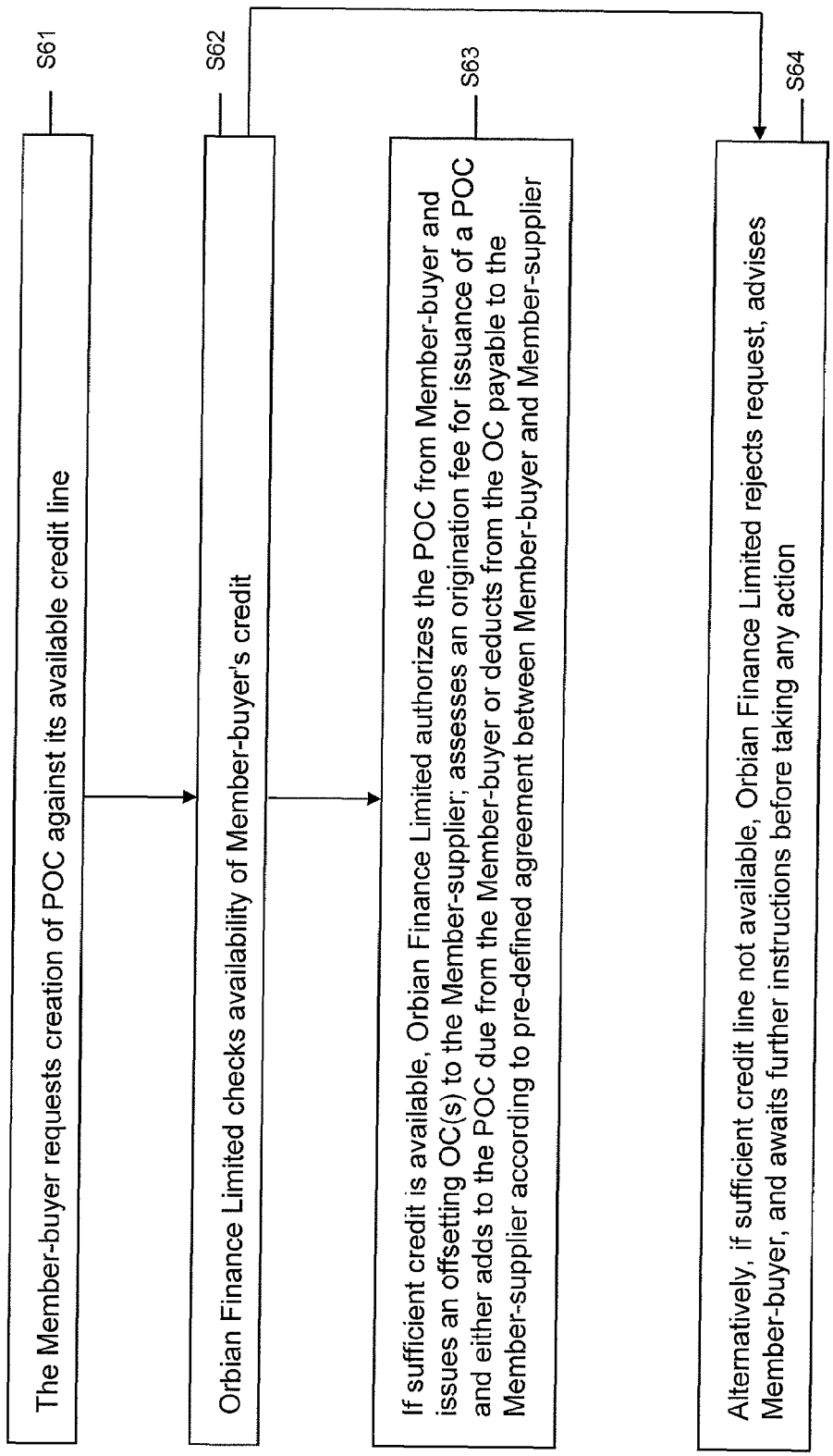
FIG. 10 is a flow chart which illustrates an example of settlement of a transaction for a Member-buyer by drawing on its existing credit line for an embodiment of the present invention.

FIG. 10 is a flow chart which illustrates an example of settlement of a transaction for a Member-buyer by drawing on its existing credit line for an embodiment of the present invention. Assume a Member-buyer 22 wishes to settle a transaction with a Member-supplier 24 by drawing on its available Orbian Finance Limited credit line. At S61, the Member-buyer 22 requests the creation of a POC against its available credit line, and at S62, Orbian Finance Limited 12 checks the availability of the Member-buyer's credit. At S63, after confirming sufficient credit availability, Orbian Finance Limited 12 authorizes the POC from the Member-buyer 22 and issues an offsetting OC(s) to the Member-supplier(s) 24. Alternatively, at S64, if sufficient credit line is not available, Orbian Finance Limited 12 rejects the request and advises the Member-buyer 22 and awaits further instructions before taking any action. Orbian Finance Limited 12 also assesses an origination fee for the issuance of a POC which can either be added to the POC due from the Member-buyer 22 or deducted from the OC payable to the Member-supplier 24, based upon the previously defined agreement between the Member-buyer 22 and the Member-supplier 24. This fee is set in advance, based upon the Member-buyer's creditworthiness and the value and the maturity term of the transaction.

Figure 11:
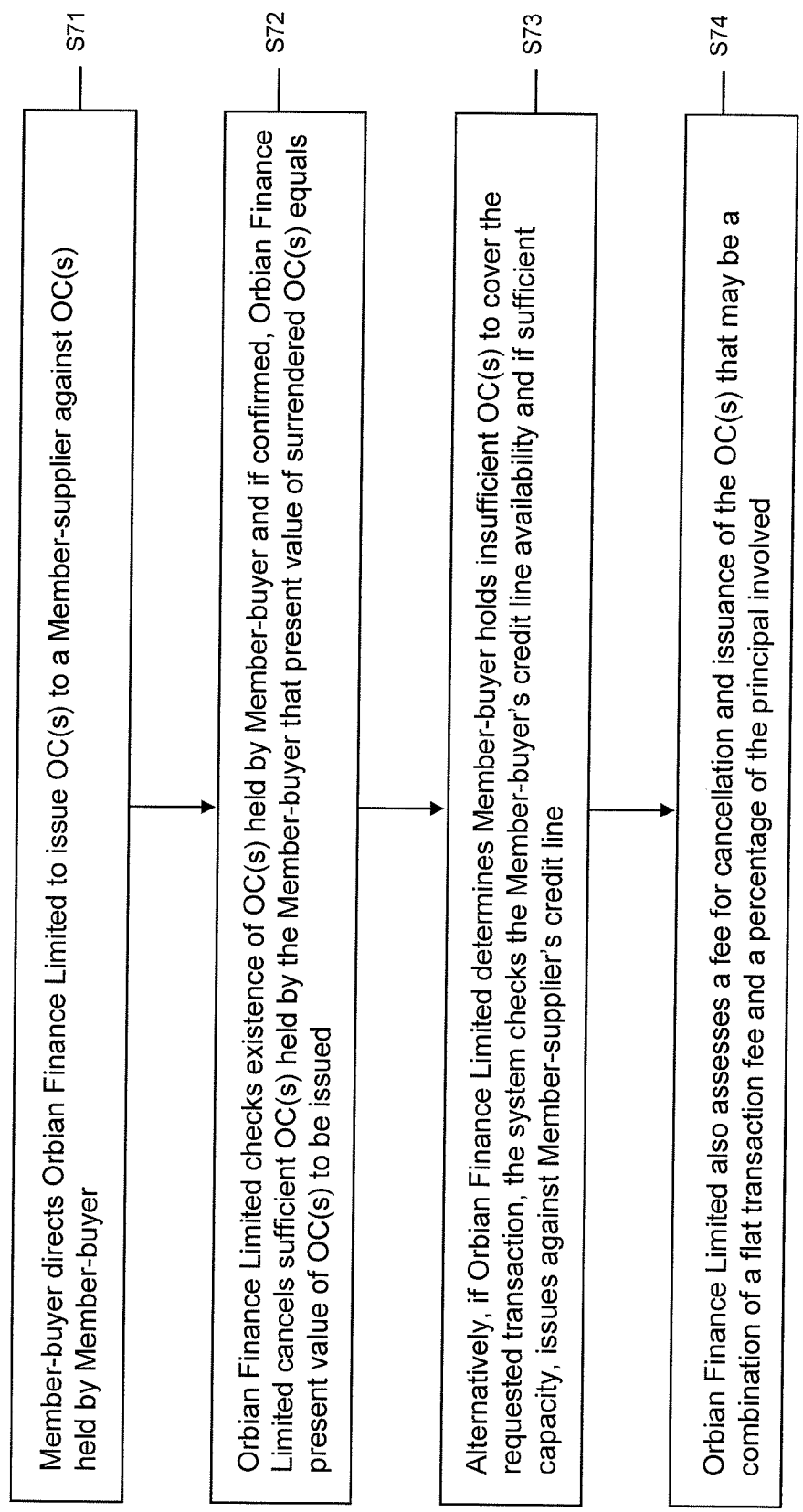
FIG. 11 is a flow chart which illustrates an example of the process of a Member-buyer settling a transaction with a Member-supplier by drawing on its existing OC(s) for an embodiment of the present invention.

FIG. 11 is a flow chart which illustrates an example a Member-buyer settling a transaction with a Member-supplier 24 by drawing on its existing OC(s) for an embodiment of the present invention. At S71, the Member-buyer 22 directs Orbian Finance Limited 12 to issue OC(s) to Member-supplier(s) 24 against the OC(s) it holds. At S72, Orbian Finance Limited 12 confirms the existence of OC(s) held by the Member-buyer 22. Orbian Finance Limited 12 also cancels sufficient OC(s) held by the Member-buyer 22, so that the present value of the surrendered OC(s) equals the present value of the OC(s) to be issued. Orbian Finance Limited's default rule is to cancel OC(s) in maturity order, but the Member-buyer 22 can override this and specify which OC(s) should be canceled. If the OC(s) issued are for a longer term than those surrendered, Orbian Finance Limited 12 earns "float revenue" on the extension and shares that revenue with the Member-buyer 22. At S73, if Orbian Finance Limited's records indicate that the Member-buyer 22 holds insufficient OC(s) to cover the requested transaction, the system checks the Member-buyer's credit line availability and issues against that if there is sufficient capacity. At S74, Orbian Finance Limited 12 also assesses a fee for the cancellation and issuance of OCs that may be a combination of a flat transaction fee and a percentage of the principal involved. Origination fees for the transaction are either subtracted from the OC(s) surrendered by the Member-buyer 22 or those issued to the Member-supplier(s) 24 based upon the previously defined agreement between the Member-buyer 22 and the Member-supplier 24. Transaction fees for transfers are lower than for POC transactions because Orbian Finance Limited 12 assumes no incremental credit risk. A Member-buyer 22 may also use a combination of its available credit line and existing OCs to settle transactions through Orbian Finance Limited 12.

In an embodiment of the present invention, Orbian Finance Limited 12 can discount OCs in whole or part at any time. When a Member 16 issues a liquidation instruction, Orbian Finance Limited 12 discounts and redeems the OC by applying the appropriate term discount rate plus the contractually defined spread. Higher spreads are applied for spot and one day forward liquidations than for two day or longer forward liquidations. The net amount due after discount is credited to the Member's designated bank account. Orbian Finance Limited 12 funds OC liquidations through reducing cash balances or issuing commercial paper. Discounting by Orbian Finance Limited 12 provides several critical advantages over traditional settlement procedures, particularly for smaller suppliers. In a traditional settlement, a small supplier waits for an indeterminate period to be paid by the buyer and uses a factoring firm if it wants or needs faster payments. Factors typically lend only a portion of the face value of the receivable, and the supplier may remain liable if the buyer ultimately defaults. In addition, a factor may charge discount rates that are substantially higher than Orbian Finance Limited 12, partially because the factor may have higher funding costs. Thus, Orbian Finance Limited 12 offers critical advantages to the Member-supplier 24, including 100% funding, no recourse, and lower discount charges. In addition, Member-suppliers 24 can elect automatic discounting to minimize their administrative burden and further accelerate their collection cycle.

In an embodiment of the present invention, while many Members 16 who receive OCs may discount them, the advantages that accrue to a Member-buyer 22 and Member-supplier 24 in settling transactions through the Orbian system carry on down the supply chain. As a result, a Member-supplier 24 who receives an OC may find it advantageous to transfer it to its own vendors. Transferring OCs also enables non-investment grade Members 16 to use OCs without paying guarantee fees to Sponsors 14 and/or enables them to use the system in greater volumes. When a Member 16 transfers the OC value it holds to another Member 16, the transferred OC may be for the same, longer or shorter maturity. Operationally, a transfer is treated as the cancellation of the existing OC and the issuance of a new one. For valuation purposes, the transfer is treated as if the existing OC is being discounted and the new OC is credited with "float earnings."

In an embodiment of the present invention, float creates value for Orbian Finance Limited 12, and it arises when an OC is transferred with an extension of its maturity. For example, assume that a Member-buyer 22 issues a 60 day POC to Orbian Finance Limited 12, and Orbian Finance Limited 12 issues a 60 day OC to the Member-supplier 24. The Member-supplier 24 then transfers that 60 day OC to its vendor to be paid in 90 days. On day 60, the Member-buyer's POC will mature and Orbian Finance Limited 12 will receive a cash payment from the Member-buyer 22. That cash can be invested or used in lieu of commercial paper (CP) issuance until day 90, when the transferred OC matures. The funds available between days 60 and 90 are known as "float" and the investment earnings or reduced CP interest costs are known as "float earnings." Member-holders who create float by transferring and extending their OCs to other Members share in Orbian Finance Limited's float earnings. The opportunity to earn revenue by transferring OCs is a significant incentive to Members 16 to keep OCs in circulation and to increase the attractiveness of the Orbian system over traditional cash based settlements. The opposite occurs when a transfer shortens an OCs maturity. In this case, Orbian Finance Limited 12 must use available cash or issue commercial paper earlier than expected and incurs increased funding costs that are passed to the Member 16 requesting the transfer.

At the maturity of a POC for an embodiment of the present invention, the issuing Member 16 is expected to make payment to Orbian Finance Limited 12 or be declared in default. A penalty fee of a percentage of the unpaid balance is assessed and a default interest rate of interest is charged on the balance until it is settled. The defaulting obligor is also liable for all collection costs, and its credit line is reduced to current outstandings. Obligations arising on POCs issued by non-investment grade Members 16 are due from the authorizing Sponsor 14 at maturity. Collections on maturity are made in bulk by a charge of Orbian Finance Limited 12 to the Sponsor's designated bank account. The Sponsor-banker is supplied with a list of the individual POC maturity collections for it to make from its individual Members 16. While a default may occur for various reasons, Orbian Finance Limited 12 must still settle its maturing OCs on a timely basis. To protect against defaults, Orbian Finance Limited 12 issues subordinated and term debt and regularly finds reserves from cash flow. Orbian Finance Limited 12 works with its guarantor to resolve any POC defaults and provides good funds on the OC maturity date. The preferred method is an automated credit by Orbian Finance Limited 12 to an account designated by the Member-payee.

In an embodiment of the present invention, when Orbian Finance Limited 12 accepts a POC from a Member-buyer 22, it issues one or more matching OCs to Member-supplier(s) 24. If the holder(s) of the OC(s) do not discount or change the maturity date in a transfer of its value, Orbian Finance Limited 12 incurs no liquidity risk and the only cash flow occurs at the maturity of the POC. At that time, the cash it receives from the Member-buyer 22, less fees collected, is offset by an identical payment(s) to the Member-supplier(s) 24 on their maturing OC(s). If the Member-buyer 22 does not default, Orbian Finance Limited 12 has perfectly matched liquidity exposures. Liquidity exposure may arise when Members 16 discount or transfer OCs. When a Member 16 discounts an OC, Orbian Finance Limited 12 must immediately pay out the discounted value of the OC, disrupting the original asset-liability match. Similarly, transferring an OC with a different maturity also creates liquidity risks. An extension of OC maturity effectively provides funding to Orbian Finance Limited 12 and improves it liquidity while a shortening of the maturity uses funds sooner than anticipated potential but does not necessarily diminish Orbian Finance Limited's liquidity. Orbian Finance Limited 12 manages its liquidity exposure, for example, by issuing long-term debt and holds substantial cash balances. Generally, Orbian Finance Limited 12 maintains a "long" cash position by holding liquid assets equal to several days expected outflows. In addition, it creates a CP issuance program supported by syndicated liquidity backstops. Finally, Orbian Finance Limited 12 operates under strict liquidity limits that govern the maximum liquidity exposure it can assume at any time.

As with liquidity risk, in an embodiment of the present invention, Orbian Finance Limited's acceptance of each POC and offsetting issuance of an OC creates no interest rate exposure. Interest risk arises when Members 16 either discount or transfer OC value for different maturities. These exposures are controlled by an "earnings-at-risk" limit system, such as a financial institution applies to its own non-trading portfolios. In this system, re-pricing mismatches ("gaps") are calculated and an instantaneous, permanent rate shock, usually a two standard deviation rate change, is applied to the gaps. The cost impact of this change on a passive liquidation of the balance sheet is calculated and deemed the earnings at risk ("EAR"). The absolute value of EAR is subject to a defined limit and the compliance with the limit is controlled by managing maturities of the cash account and the CP issued. Term and subordinated debt re-pricings can also be staggered to reduce EAR. Orbian Limited 10 offers OC functionality in various currencies, but Orbian Finance Limited 12 assumes no currency risk through the intermediation of trade transactions, as each matched POC and OC is issued in the same currency. For example, when a non-U.S. dollar OC is discounted or transferred, Orbian Finance Limited 12 enters into a hedge to eliminate any currency risk that the discount or transfer creates.

In an embodiment of the present invention, Orbian Limited manages the record keeping by creating both drawdown and operational accounts for Members 16. The drawdown account is used to control the Member's usage of its Orbian Finance Limited credit line. As and when necessary, POCs are automatically issued to transfer value to the linked operational account against and within the credit limit set on the drawdown account. The drawdown account is analogous to a banking loan account in the cash world and the aggregate balance of the drawdown account is limited by the Member's credit line. The operational account is an account on which a Member 16 receives OCs from other Members 16 and from which it issues OCs to other Members 16. The balance on the account is not permitted to be less than zero in any circumstance. The operational account is analogous to a banking current (checking) account in the cash world. Each Sponsor 14 holds one or more operational accounts in the same manner as Members 16 and in effect holds a Member registration, as do all service providers to the system. All Orbian Finance Limited commissions, charges, and the like are collected and remitted in OC mode via operational accounts. Where the Member 16 holds a drawdown account, it executes appropriate agreements with Orbian Finance Limited 12 and/or its Sponsor 14, defining its payment responsibilities for any drawn portion of its credit line.

The Orbian Limited/Orbian Finance Limited system for an embodiment of the present invention is highly automated and tightly integrated with the Members' information systems using an open, published interface. All third party systems providers are supported by Orbian Limited 10 in linking Members 16 and their own 'packaged' products to the Orbian Limited system. Orbian Limited/Orbian Finance Limited also receive a continuous flow of detailed information to facilitate their credit management and funding processes. A request for issuance of an OC is initiated by one of several methods, including direct entry via a browser/GUI in a manner similar to the creation of an electronic check. A request for issuance of an OC can also be initiated, for example, as output from a standard A/P payment run with the Member's conventional bank sort codes replaced by a Orbian Limited dummy code and the conventional bank account number replaced by the Member's operational account number. An adapter/interface splits out the Orbian Limited instructions from the conventional bank instructions, permitting a mixed environment of cash and Orbian Limited instructions. Other methods of initiating a request for issuance of an OC are as output from an Orbian Limited/Sponsor provided data feed to the Member-buyer 22 with summary Member-supplier invoice information whereby the Member-buyer 22 can selectively approve Member-supplier invoices for payment via Orbian Limited 10 or as output from other vertical market systems, such as bureau payments issued on behalf of very small trading entities, mobile telephone related systems and in fact any system that is capable of sending an approved payment instruction via the standard messaging infrastructure on behalf of a Member 16.

In an embodiment of the present invention, a foreign exchange (FX) request results in a pre-process which determines the FX conversion rate and fees and delivers the required value of OC to be issued to effect the conversion and delivery of the required FX to the Member-supplier 24. This OC request, if confirmed, is posted to the operational account of the FX house. The FX transaction is in either OC to FX OC mode or OC to FX Cash mode. The OC required to initiate the transaction, in either case, is a standard OC issuance instruction. In an embodiment of the present invention, a discounting request results in a pre-process which determines the discounting rate and fees and delivers the required value of OC to be issued to fund the discounting transaction. This OC, if confirmed, is posted to the operational account of the discounter (Orbian Finance Limited 12). The discounting transaction results in a standard OC issuance instruction.

Figure 12:
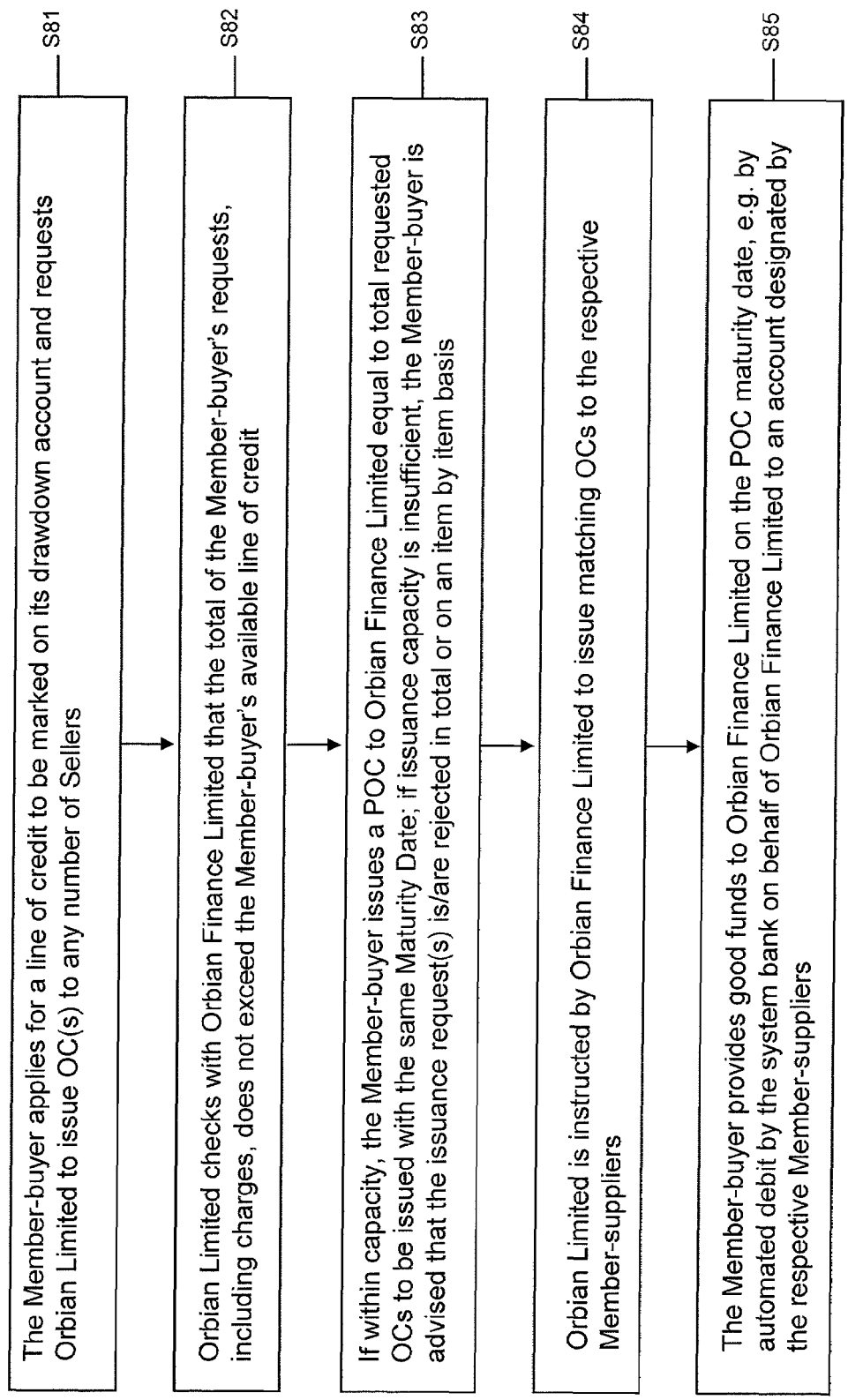
FIG. 12 is a flow chart which illustrates an example of the process of a cash collection event for an embodiment of the present invention.

FIG. 12 is a flow chart which illustrates an example of the process of a cash collection event for an embodiment of the present invention. At S81, a Member-buyer 22 applies for a line of credit to be marked on its drawdown account. The Member-buyer 22 requests Orbian Limited 10 to issue OC(s) to any number of Sellers. At S82, Orbian Limited 10 checks with Orbian Finance Limited 12 that the total of the Member-buyer's requests, including charges, does not exceed the Member-buyer's unutilized line of credit. If within capacity, at S83, the Member-buyer 22 issues a POC to Orbian Finance Limited 12 equal to the total requested OCs to be issued with the same Maturity Date. Alternatively, if issuance capacity is insufficient, the Member-buyer 22 is advised that the issuance request(s) is/are rejected in total or on an item by item basis. At S84, Orbian Limited 10 is instructed by Orbian Finance Limited 12 to issue the matching OCs to the respective Member-suppliers 24. This is a cash collection event which occurs regardless of any back-to-back downstream events affecting any OC(s) created on issuance of the POC. The Orbian Finance Limited 12 part of the total system keeps track of POC cash collection events. At S85, the Member-buyer 22 provides good funds to Orbian Finance Limited 12 on the POC maturity date. The preferred method is an automated debit by the system bank on behalf of Orbian Finance Limited 12 to an account designated by the Member-obligor.

Another important aspect of an embodiment of the present invention addresses securities law issues which may arise in certain jurisdictions. In this aspect, OCs are issued solely for the purpose of settling a current trade transaction between the buyer and the supplier. At the time of each transaction, the Member 16 is required to represent and certify that the requested OC is being used to settle a bona fide current trade transaction, as opposed to repaying a loan or entering into another financial type of transaction. Systems are instituted by the settlement system that allow it to monitor suspicious looking transactions. In this aspect, OCs may not be used in financial transactions, such as the repayment of a loan, the making of an investment, or an inter-company transfer of funds. They are used only in commercial transactions, are issued directly from Orbian Finance 12 to suppliers, and are not issued to Members 16 for the Members 16 to transfer to their suppliers. No one but a Member 16 may direct the issuance of an OC to settle an underlying trade transaction. Each Member 16 will agree that the receipt of an OC in the amount of its invoice will constitute full and final payment and settlement of that invoice. Orbian Finance 12 will not play any role in the actual transfer of the goods or services between the buyer and the supplier.

Importantly, in the aspect that addresses securities law issues, the OC is not transferable. A Member 16 that receives an OC cannot transfer or assign that OC or engage in any form of arbitrage or secondary market activities with that OC. Each OC is personal to the recipient Member 16. The Member 16 can hold the OC to maturity or liquidate the OC. The Member 16 can liquidate the OC either to cash or to a credit on its account. It can then use the credit on its account (which occurs in real time) to request that Orbian Finance 12 issue a new OC to its own supplier. Thus, the same functionality is achieved, but there is an important legal difference in terms of the characteristics of the instrument, which is a new OC issued to the Member-supplier 24. An OC which is liquidated prior to its maturity date is discounted at the appropriate discount rate and paid to the Member 16 in cash or credit, depending on the instructions. A Member-buyer 24 may use any value in its OC account, in lieu of issuing a POC, as the basis for its request that Orbian Finance 12 issue an OC to its own suppliers to settle another current trade transaction. Sponsors 14 are not able to arbitrage or accept transfers or assignments of OC. Sponsors 14 receive only a commission based on the volume of OCs issued for current transactions of their customers and/or discounters. Thus, Orbian Finance 12 is always the other party in receiving the fees from the transaction, and it pays the Sponsor 14 a commission.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method of settling a transaction using trade credit value, comprising:
   storing trade credit value for a first user that is a divisible, continuously available, transferable, discountable, and credit enhanced to investment grade status promissory obligation;
   receiving a request from the first user to transfer a pre-determined amount of the stored trade credit value to a second user in settlement of the transaction;
   confirming an availability of the requested amount of trade credit value stored for the first user for settlement of the transaction;
   transferring the requested amount of trade credit value from the first user to the second user; and
   allowing the transferred amount of trade credit value to be used by the second user in any of settlement of another transaction for the second user, discounting for cash before a pre-defined maturity of the trade credit value, and holding through to the pre-defined maturity of the trade credit value.

2. The method of claim 1, wherein storing the trade credit value further comprises storing the trade credit value in an operational account of the first user.

3. The method of claim 2, wherein storing the trade credit value in the operational account of the first user further comprises establishing the operational account for the first user in a trade credit settlement system.

4. The method of claim 3, wherein establishing the operational account for the first user further comprises allowing the first user to register for membership in the trade credit settlement system.

5. The method of claim 4, wherein allowing the first user to register for membership in the trade credit settlement system further comprises receiving an approval of a sponsor-member of the trade credit settlement system for the first user's registration for membership.

6. The method of claim 5, wherein receiving the approval for the first user's registration for membership further comprises allowing the sponsor-member to register for sponsor-membership in the trade credit settlement system.

7. The method of claim 6, wherein allowing the sponsor-member to register for sponsor-membership further comprises recognizing the sponsor-member as a valid trading entity by the trade credit settlement system.

8. The method of claim 1, wherein storing the trade credit value further comprises storing the trade credit value in the form of a trade credit.

9. The method of claim 8, wherein storing trade credit value in the form of the trade credit further comprises storing the trade credit as an electronic promissory obligation.

10. The method of claim 1, wherein receiving the request further comprises receiving the request to transfer the pre-determined amount of the trade credit value from at least one of an operational account and a drawdown account of the first user to an operational account of the second user.

11. The method of claim 10, wherein receiving the request to transfer the pre-determined amount of the trade credit value from the operational account of the first user further comprises establishing the operational account for the first user in a trade credit settlement system.

12. The method of claim 11, wherein establishing the operational account for the first user further comprises allowing the first user to register for membership in the trade credit settlement system.

13. The method of claim 12, wherein allowing the first user to register for membership further comprises receiving an approval of a sponsor-member of the trade credit settlement system for the first user's registration for membership.

14. The method of claim 13, wherein receiving the approval for the first user's registration for membership further comprises allowing the sponsor-member to register for sponsor-membership in the trade credit settlement system.

15. The method of claim 14, wherein allowing the sponsor-member to register for sponsor-membership in the trade credit settlement system further comprises recognizing the sponsor-member as a valid trading entity by the trade credit settlement system.

16. The method of claim 10, wherein receiving the request to transfer the pre-determined amount of the trade credit value from the drawdown account of the first user further comprises establishing the drawdown account for the first user.

17. The method of claim 16, wherein establishing the drawdown account for the first user further comprises allowing the first user to register for membership in a trade credit settlement system.

18. The method of claim 17, wherein establishing the drawdown account for the first user further comprises receiving an approval of a sponsor-member of the trade credit settlement system of a request by the first user for the drawdown account.

19. The method of claim 1, wherein confirming the availability further comprises confirming the availability of the requested amount of trade credit value in at least one of an operational account and a drawdown account of the first user.

20. The method of claim 19, wherein confirming the availability of the requested amount of trade credit value in the operational account further comprises establishing the operational account for the first user in a trade credit settlement system.

21. The method of claim 20, wherein establishing the operational account for the first user further comprises allowing the first user to register for membership in the trade credit settlement system.

22. The method of claim 19, wherein confirming the availability further comprises confirming the availability of the requested amount of trade credit value in the operational account of the first user and, if required and available, in the drawdown account of the first user.

23. The method of claim 19, wherein confirming the availability of the requested amount of trade credit value in the drawdown account further comprises establishing the drawdown account for the first user.

24. The method of claim 23, wherein establishing the drawdown account for the first user further comprises allowing the first user to register for membership in a trade credit settlement system.

25. The method of claim 24, wherein establishing the drawdown account for the first user further comprises receiving an approval of a sponsor-member of the trade credit settlement system of a request by the first user for the drawdown account.

26. The method of claim 1, wherein transferring the requested amount of trade credit value further comprises transferring the requested amount of trade credit value from at least one of an operational account of the first user and a drawdown account of the first user to an operational account of the second user.

27. The method of claim 26, wherein transferring the requested amount of trade credit value further comprises transferring the requested amount of trade credit value from the operational account of the first user and, if required and available, from the drawdown account of the first user, to the operational account of the second user.

28. The method of claim 26, wherein transferring the requested amount of trade credit value from the operational account of the first user further comprises issuing the requested amount of trade credit value to the operational account of the second user and canceling trade credit value in the operational account of the first user having a present value equal to a present value of the issued trade credit value.

29. The method of claim 26, wherein transferring the requested amount of trade credit value to the operational account of the second user further comprises establishing the operational account for the second user in a trade credit settlement system.

30. The method of claim 29, wherein establishing the operational account for the second user further comprises allowing the second user to register for membership in the trade credit settlement system.

31. The method of claim 26, wherein transferring the requested amount of trade credit value from the drawdown account of the first user further comprises issuing the requested amount of trade credit value to the operational account of the first user and issuing an offsetting amount of trade credit value to the operational account of the second user.

32. The method of claim 1, wherein transferring the requested amount of trade credit value further comprises transferring the requested amount of trade credit value in the form of a trade credit.

33. The method of claim 32, wherein transferring the requested amount of trade credit value in the form of the trade credit further comprises transferring the trade credit as an electronic promissory obligation.

34. The method of claim 1, wherein allowing the transferred amount of trade credit value to be used by the second member in settlement of another transaction for the second user further comprises allowing the second user to liquidate the trade credit value to a credit on the second user's account.

35. The method of claim 1, wherein allowing the transferred amount of trade credit value to be used by the second member in discounting for cash before a pre-defined maturity of the trade credit value further comprises allowing the second user to liquidate the trade credit value for cash at a pre-determined discount rate prior to the pre-defined maturity.

36. The method of claim 1, allowing the transferred amount of trade credit value to be used by the second member in holding through to the pre-defined maturity of the trade credit value further comprises debiting a predesignated account of the first user for the balance due on the trade credit value at the pre-defined maturity.

37. A system for settling a transaction using trade credit value, comprising:
   means for storing trade credit value for a first user that is a divisible, continuously available, transferable, discountable, and credit enhanced to investment grade status promissory obligation;

means for receiving a request from the first user to transfer a pre-determined amount of the trade credit value from the first user to a second user in settlement of the transaction;

means for confirming an availability of the requested amount of trade credit value stored for the first user for settlement of the transaction;

means for transferring the requested amount of trade credit value from the first user to the second user; and means for allowing the transferred amount of trade credit value to be used by the second user in any of settlement of another transaction for the second user, discounting for cash before a pre-defined maturity of the trade credit value, and holding through to the pre-defined maturity of the trade credit value.

38. The system of claim 37, wherein the means for storing the trade credit value further comprises an operational account for the first user residing on a transaction credit settlement system server.

39. The system of claim 38, further comprising means for establishing the operational account for the first user on the trade credit settlement system server.

40. The system of claim 39, wherein the means for establishing the operational account for the first user further comprises means for allowing the first user to register for membership in a trade credit settlement system.

41. The system of claim 40, wherein the means for allowing the first user to register for membership in the trade credit settlement system further comprises means for receiving an approval of a sponsor-member of the trade credit settlement system for the first user's registration for membership.

42. The system of claim 41, wherein the means for receiving the approval for the first user's registration for membership further comprises means for allowing the sponsor-member to register for sponsor-membership in the trade credit settlement system.

43. The system of claim 42, wherein the means for allowing the sponsor-member to register for sponsor-membership further comprises means for recognizing the sponsor-member as a valid trading entity by the trade credit settlement system.

44. The system of claim 37, wherein the means for storing the trade credit value further comprises means for storing trade credit value in the form of a trade credit.

45. The system of claim 44, wherein the means for storing trade credit value in the form of the trade credit further comprises means for storing the trade credit as an electronic promissory obligation.

46. The system of claim 37, wherein the means for storing trade credit value further comprises means for storing the trade credit value as at least one of a divisible trade credit value, a continuously available trade credit value, a transferable trade credit value, a discountable trade credit value, a credit enhanced trade credit value, and an investment grade trade credit value.

47. The system of claim 37, wherein the means for receiving the request to transfer the pre-determined amount of the trade credit value from the operational account of the first user further comprises means for establishing the operational account for the first user in a trade credit settlement system.

48. The system of claim 47, wherein the means for establishing the operational account for the first user further comprises means for allowing the first user to register for membership in the trade credit settlement system.

49. The system of claim 48, wherein the means for allowing the first user to register for membership further comprises means for receiving an approval of a sponsor-member of the trade credit settlement system for the first user's registration for membership.

50. The system of claim 49, wherein the means for receiving the approval for the first user's registration for membership further comprises means for allowing the sponsor-member to register for sponsor-membership in the trade credit settlement system.

51. The system of claim 50, wherein the means for allowing the sponsor-member to register for sponsor-membership in the trade credit settlement system further comprises means for recognizing the sponsor-member as a valid trading entity by the trade credit settlement system.

52. The system of claim 37, wherein the means for receiving the request to transfer the pre-determined amount of the trade credit value from the drawdown account of the first user further comprises means for establishing the drawdown account for the first user.

53. The system of claim 52, wherein the means for establishing the drawdown account for the first user further comprises means for allowing the first user to register for membership in a trade credit settlement system.

54. The system of claim 53, wherein the means for establishing the drawdown account for the first user further comprises means for receiving an approval of a sponsor-member of the trade credit settlement system of a request by the first user for the drawdown account.

55. The system of claim 37, wherein the means for confirming the availability further comprises means for confirming the availability of the requested amount of trade credit value in at least one of an operational account and a drawdown account of the first user.

56. The system of claim 55, wherein the means for confirming the availability of the requested amount of trade credit value in the operational account further comprises means for establishing the operational account for the first user in a trade credit settlement system.

57. The system of claim 56, wherein the means for establishing the operational account for the first user further comprises means for allowing the first user to register for membership in the trade credit settlement system.

58. The system of claim 55, wherein the means for confirming the availability further comprises means for confirming the availability of the requested amount of trade credit value in the operational account of the first user and, if required and available, in the drawdown account of the first user.

59. The system of claim 55, wherein the means for confirming the availability of the requested amount of trade credit value in the drawdown account further comprises means for establishing the drawdown account for the first user.

60. The system of claim 59, wherein the means for establishing the drawdown account for the first user further comprises means for allowing the first user to register for membership in a trade credit settlement system.

61. The method of claim 60, wherein the means for establishing the drawdown account for the first user further comprises means for receiving an approval of a sponsor-member of the trade credit settlement system of a request by the first user for the drawdown account.

62. The system of claim 37, wherein the means for transferring the requested amount of trade credit value further comprises means for transferring the requested amount of trade credit value from at least one of an operational account of the first user and a drawdown account of the first user to an operational account of the second user.

63. The system of claim 62, wherein the means for transferring the requested amount of trade credit value further comprises means for transferring the requested amount of trade credit value from the operational account of the first user and, if required and available, from the drawdown account of the first user, to an operational account of the second user.

64. The system of claim 62, wherein the means for transferring the requested amount of trade credit value from the operational account of the first user further comprises means for issuing the requested amount of trade credit value to the operational account of the second user and canceling trade credit value in the operational account of the first user having a present value equal to a present value of the issued trade credit value.

65. The system of claim 62, wherein the means for transferring the requested amount of trade credit value from the drawdown account of the first user further comprises means for issuing the requested amount of trade credit value to the operational account of the first user and issuing an offsetting amount of trade credit value to the operational account of the second user.

66. The system of claim 62, wherein the means for transferring the requested amount of trade credit value to the operational account of the second user further comprises means for establishing the operational account for the second user in a trade credit settlement system.

67. The system of claim 66, wherein the means for establishing the operational account for the second user further comprises means for allowing the second user to register for membership in the trade credit settlement system.

68. The system of claim 37, wherein the means for transferring the requested amount of trade credit value further comprises means for transferring the requested amount of trade credit value in the form of a trade credit.

69. The system of claim 68, wherein the means for transferring the requested amount of trade credit value in the form of the trade credit further comprises means for transferring the trade credit as an electronic promissory obligation.

70. The system of claim 37, wherein the means for allowing the transferred amount of trade credit value to be used by the second member in settlement of another transaction for the second user further comprises means for allowing the second user to liquidate the trade credit value to a credit on the second user's account.

71. The system of claim 37, wherein the means for allowing the transferred amount of trade credit value to be used by the second member in discounting for cash before a pre-defined maturity of the trade credit value further comprises means for allowing the second user to liquidate the trade credit value for cash at a pre-determined discount rate prior to the pre-defined maturity.

72. The system of claim 37, wherein the means for allowing the transferred amount of trade credit value to be used by the second member in holding through to the pre-defined maturity of the trade credit value further comprises means for debiting a predesignated account of the first user for the balance due on the trade credit value at the pre-defined maturity.

73. A financing and payment method incorporating a new use of at least one trade credit, which is utilized by a Buyer, a Seller, and a Financial Intermediary, said method including the following steps:

concluding an membership agreement by the Buyer, the Seller, and the Financial Intermediary, which defines rights and obligations of each party to the other that include the use of at least one trade credit that is a divisible, continuously available, transferable, discountable, and credit enhanced to investment grade status promissory obligation;

entering an agreement by the Buyer for a transaction with the Seller;

optionally modifying the transaction agreement to extend payment terms of the transaction agreement through negotiation between the Buyer and the Seller;

issuing a trade credit to the Seller in payment of the transaction, the trade credit having payment terms according to one of the transaction agreement and the modification of the transaction agreement, and simultaneously accepting an obligation by the Buyer to pay an amount equal to the transaction payment; and allowing the Seller to realize payment of the trade credit by either of presenting the trade credit for immediate payment of its face amount, less a discount amount, and receiving the face value of the trade credit at maturity.

74. The method of claim 73, wherein simultaneously accepting an obligation by the Buyer to pay an amount equal to the transaction payment further comprises simultaneously accepting an obligation by the Buyer to pay an amount equal to the transaction payment plus a cost to the Buyer determined by a credit-worthiness of the Buyer.

75. The method of claim 73, wherein allowing the Seller to realize payment of the trade credit by presenting the trade credit for immediate payment of its face amount, less a discount amount, further comprises allowing the Seller to realize payment of the trade credit by presenting the trade credit for immediate payment of its face amount, less a discount amount based on an investment grade rating of the trade credit.

76. The method of claim 73, wherein the Financial Intermediary provides an Active and a Reserve Account for the Buyer, the Active Account showing current trade credits receivable, as well as transaction details and history, including fees and charges, and the Reserve Account showing current trade credits payable, as well as credit available to be issued, and transaction details and history, including fees and charges.

77. The system of claim 73, wherein the Financial Intermediary provides an Active and a Reserve Account for the Seller, the Active Account showing current trade credits receivable, as well as transaction details and history, including fees and charges, and the Reserve Account showing current trade credits payable, as well as credit available to be issued, and transaction details and history, including fees and charges.

78. The system of claim 73, wherein a Sponsor, as a further intermediary, works with the Financial Intermediary to introduce parties to enter membership agreements.

* * * * *